(12) United States Patent
Daly et al.

(10) Patent No.: US 8,883,193 B2
(45) Date of Patent: Nov. 11, 2014

(54) CELLULOSIC BIOCOMPOSITES AS MOLECULAR SCAFFOLDS FOR NANO-ARCHITECTURES

(75) Inventors: Daniel T. Daly, Tuscaloosa, AL (US);
Scott K. Spear, Bankston, AL (US);
Megan B. Turner, Tuscaloosa, AL (US);
Whitney Lauren Hough, Albertville, AL (US); Robin D. Rogers, Tuscaloosa, AL (US)

(73) Assignee: The University of Alabama, Tuscaloosa, AL (US)

( * ) Notice: Subject to any disclaimer, the term of this patent is extended or adjusted under 35 U.S.C. 154(b) by 1954 days.

(21) Appl. No.: 11/810,602

(22) Filed: Jun. 5, 2007

(65) Prior Publication Data
US 2012/0122691 A1 May 17, 2012

Related U.S. Application Data

(63) Continuation-in-part of application No. 11/475,630, filed on Jun. 27, 2006, now abandoned.

(60) Provisional application No. 60/694,902, filed on Jun. 29, 2005.

(51) Int. Cl.
| | | |
|---|---|---|
| A61F 13/00 | (2006.01) |
| A61K 9/70 | (2006.01) |
| C08L 1/02 | (2006.01) |
| C08L 79/02 | (2006.01) |
| C08B 15/06 | (2006.01) |
| C08B 16/00 | (2006.01) |
| C08L 89/00 | (2006.01) |

(52) U.S. Cl.
CPC . *C08L 1/02* (2013.01); *C08L 79/02* (2013.01); *C08B 15/06* (2013.01); *C08B 16/00* (2013.01); *C08B 71/02* (2013.01); *C08L 89/00* (2013.01)
USPC ........................................................ 424/443

(58) Field of Classification Search
USPC ........................................................ 424/443
See application file for complete search history.

(56) References Cited

U.S. PATENT DOCUMENTS

| | | | | |
|---|---|---|---|---|
| 1,943,176 | A | 1/1934 | Graenacher | 260/100 |
| 4,063,017 | A | 12/1977 | Tsao et al. | |
| 4,097,666 | A | 6/1978 | Johnson et al. | |
| 4,188,263 | A | 2/1980 | Hulsmann et al. | 435/179 |

(Continued)

FOREIGN PATENT DOCUMENTS

| | | |
|---|---|---|
| CA | 2479941 | 10/2003 |
| CH | 153446 | 6/1932 |

(Continued)

OTHER PUBLICATIONS

Sfan et al (Poly(amidoamine) (PAMAM) dendrimers: from biomimicry to drug delivery and biomedical applications, DDT vol. 6, No. Apr. 8, 2001 427-436).*

(Continued)

*Primary Examiner* — Benjamin Packard
(74) *Attorney, Agent, or Firm* — Meuiner Carlin & Curfman, LLC

(57) ABSTRACT

Disclosed are composites that comprise regenerated cellulose, a first active substance, a second active substance, and a linker. Methods for preparing the composites that involve the use of ionic liquids are also disclosed. Articles prepared from the disclosed composites and methods of using them are further disclosed.

16 Claims, 10 Drawing Sheets

(56) References Cited

U.S. PATENT DOCUMENTS

| | | | |
|---|---|---|---|
| 4,520,105 A | 5/1985 | Sinner et al. | |
| 4,522,934 A | 6/1985 | Shum et al. | |
| 4,970,156 A | 11/1990 | Avrameas et al. | |
| 5,679,146 A | 10/1997 | Kalt et al. | 106/166.01 |
| 5,683,832 A | 11/1997 | Bonhote et al. | 429/111 |
| 5,714,536 A | 2/1998 | Ziolo et al. | |
| 5,747,125 A | 5/1998 | Markulin | 428/348 |
| 5,792,399 A | 8/1998 | Meister et al. | 264/101 |
| 5,827,602 A | 10/1998 | Koch et al. | 429/194 |
| 5,856,513 A | 1/1999 | Ue et al. | |
| 6,001,342 A * | 12/1999 | Forestier et al. | 424/76.1 |
| 6,376,712 B2 | 4/2002 | Narizuka et al. | 564/385 |
| 6,451,220 B1 | 9/2002 | Ziolo et al. | |
| 6,613,310 B1 | 9/2003 | Campbell et al. | 424/54 |
| 6,808,557 B2 | 10/2004 | Holbrey et al. | 106/163.01 |
| 6,824,599 B2 | 11/2004 | Swatloski et al. | 106/163.01 |
| 2002/0010291 A1 | 1/2002 | Murphy | 526/133 |
| 2003/0059604 A1 | 3/2003 | Hattori et al. | |
| 2003/0157351 A1 | 8/2003 | Swatloski et al. | |
| 2003/0165445 A1 | 9/2003 | Malnou et al. | 424/61 |
| 2003/0233742 A1 | 12/2003 | Jones et al. | 28/118 |
| 2004/0038031 A1* | 2/2004 | Holbrey et al. | 428/402.24 |
| 2005/0123851 A1 | 6/2005 | Shinbori et al. | 430/270.1 |
| 2005/0194561 A1 | 9/2005 | Davis | |
| 2005/0196671 A1 | 9/2005 | Paonessa et al. | |
| 2005/0285073 A1 | 12/2005 | Singh et al. | |
| 2006/0118755 A1 | 6/2006 | Fujioka et al. | |
| 2006/0128996 A1 | 6/2006 | Vaultier et al. | |
| 2006/0194197 A1 | 8/2006 | Spangler et al. | 435/5 |
| 2007/0006774 A1 | 1/2007 | Rogers et al. | |
| 2007/0215300 A1 | 9/2007 | Upfal et al. | |
| 2008/0023162 A1 | 1/2008 | Myllymaki et al. | |
| 2008/0190013 A1 | 8/2008 | Argyropoulos | |

FOREIGN PATENT DOCUMENTS

| | | |
|---|---|---|
| CN | 1380110 | 4/2002 |
| DE | 77-2703703 | 1/1977 |
| DE | 93-4308410 | 3/1993 |
| EP | 0780391 | 6/1997 |
| EP | 1222918 | 7/2002 |
| EP | 1854786 | 11/2007 |
| JP | 58183601 | 10/1983 |
| JP | 86-199569 | 8/1986 |
| JP | 63056501 | 3/1988 |
| JP | 64017649 | 1/1989 |
| JP | 80089796 | 4/1996 |
| JP | 10265674 | 10/1998 |
| JP | 2003335887 | 5/2002 |
| JP | 2002290011 | 10/2002 |
| JP | 2003171144 | 6/2003 |
| WO | WO94/20521 | 9/1994 |
| WO | WO 95/21871 | 8/1995 |
| WO | WO 96/06593 | 3/1996 |
| WO | WO 00/32658 | 6/2000 |
| WO | WO 01/81436 | 11/2001 |
| WO | WO 02/079269 | 10/2002 |
| WO | WO 02/100360 | 12/2002 |
| WO | WO 02/102586 | 12/2002 |
| WO | WO 03/074031 | 3/2003 |
| WO | WO 03/029329 | 4/2003 |
| WO | WO 03/041692 | 5/2003 |
| WO | WO2004027897 | 4/2004 |
| WO | WO2005017252 | 2/2005 |
| WO | WO2007005388 | 1/2007 |
| WO | WO2007/063327 | 6/2007 |
| WO | WO2009/105236 | 8/2009 |
| WO | WO2010/056790 | 5/2010 |

OTHER PUBLICATIONS

Dykes (J Chem Tchnol Biotechnol 76:903-918 (2001)).*
Bardeletti, Enzyme Immobilization on Polyethyleneimine-coated Magnetite Particles, Methodsin Biotech. I. Immobilization of Enzymes and Cells, pp. 133-141 (1997).
Deus et al., Partiell acetylierte Cellulose—Synthese und Bestimmung der Substituentenverteilung mit Hilfe der 1H NMR-Spektroskopie, Makromol. Chem., 192(1):75-83 (1991).
Extended European Search Report for Application No. 101778231.1 issued May 11, 2011.
Fischer et al, The behaviour of cellulose in hydrated melts of the composition LiX-nH2O (X=I-, NO-3, CH3COO-, ClO-4), Cellulose, 6:213-219 (1999).
Hudson et al., The Solubility of Unmodified Cellulose: A Crtique of the Literature, J. Macromol. Sci. Rev. Macromol. Chem., 18(1):1-82 (1980).
Husemann et al., N-Athyl-pyridinium-chlorid als Losungmittel und Reaktionsmedium fur Cellulose, Die Makromolekulare Chemie, 128:288-291 (1969).
Martin et al., Anisotropic magnetism in field-structured composites, Phys. Rev. E., 61(3):2818-2830 (2000).
Turner, Immobilization of Biocatalysts Using Novel IL-Reconstituted Cellulosic Support Materials, presentation on Apr. 19, 2005.
Fisher et al., "Structural Changes of Cellulose Dissolved in Molten Salt Hydrates," 219th ACS National Meeting, San Francisco, CA, 2000.
International Search Report and Written Opinion for PCT/US2006/020941 filed May 30, 2006.
Ren et al., "Synthesis of 1-Allyl-3-Methylimidazolium-Based Room Temperature Ionic Liquid and Preliminary Study of its Dissolving Cellulose," Acta Polymerica Sinica, 448-51, 2003 (Abstract).
Abdulkareem et al., "Immobilization of Modified Cellulose and Acrylic on Wood-Rotting Fungi Swelling Carriers," *J Process Biochemistry*, 37:1387-94, 2002.
Ast et al., "Efficient Assembly of Peptomers on Continuous Surfaces," *Tetrahedron Lett*, 40:4317, 1999.
BlankeMeyer-Menge et al., "Simultaneous Multiple Synthesis of Protected Peptide Fragments on Allyl-Functionalized Cellulose Disc Supports," *Tetrahedron Lett*, 29:5871, 1988.
Bonhöte et al., "Hydrophobic, Highly Conductive Ambient-Temperature Molten Salts," *Inorg Chem*, 35:1168-78, 1996.
Bora et al., A Simple Method for Functionalization of Cellulose Membrane for Covalent Immobilization of Biomolecules, *J Membr Sci*, 250:215-22, 2005.
Chesney et al., "Amino-Derivatised Beaded Cellulose Gels. Novel Accessible and Biodegradable Scavenger Resins for Solution Phase Combinatorial Synthesis," *Green Chem*, 2:57-62, 2000.
Fannin et al., "Properties of 1,3-Dialkylimidazolium Chloride-Aluminum Chloride Ionic Liquids. 2. Phase Transitions, Densities, Electrical Conductivities, and Viscosities," *J Phys Chem*, 88:2614-21, 1984.
Fisher et al., "Structural Changes of Cellulose Dissolved in Molten Salt Hydrates," 219th ACS National Meeting, San Francisco, CA, 2000 (Abstract Only).
Froehner and Eriksson, "Properties of the Glycoprotein Laccase Imobilised by Two Methods," *Acta Chem Scand B*, 29:691, 1975.
Gelbrich, "Colloidal Structures Based on Topochemically Modified Cellulose," *Papier* (Heidelberg), 52:755, 1998 (German/Untranslated into English).
Gemeiner, in Enzyme Engineering, Gemeiner, Ed., Ellis Horwood Series in *Biochemistry and Biotechnology*, Ellis Horwood Limited: West Sussex, England, pp. 158-179, 1992.
Gordon al., "Fused Organic Salts. 8. Properties of Molten Straight-Chain Isomers of Tetra-N—Pentylammonium Salts," *J Amer Chem Soc*, 100(24):7445- 54.1878.
Harkin and Obst, "Lignification in Trees: Indication of Exclusive Peroxidase Participation," *Science*, 180:296-98, 1973.
Heinze et al., "Unconventional Methods in Cellulose Functionalization," *Prog Polym Sci*, 26:1689-1762, 2001.
Hirayama, "Rapid Confirmation and Revision of the Primary Structure of Bovine Serum Albumin by ESIMS and Frit-FAB LC/MS," *Biochem Biophys Comm*, 173:639-646, 1990.
Holbrey et al., "The Phase Behaviour of 1-Alkyl-3-Methlimidazolium Tetrafluoroborates; Ionic Liquids and Ionic Liquid Crystals," *J Chem Soc Dalton Trans*, 2133-39, 1999.
Huddleston et al., "Characterization and Comparison of Hydrophilic and Hydrophobic Room Temperature Ionic Liquids Incorporating the Imidazolium Cation," *Green Chem*, 3:156-164, 2001.

(56) References Cited

OTHER PUBLICATIONS

Husemann et al., "Homogeneous Acetylation of Cellulose," *Buletinul Institutului Politehnic Din Lasi*, 1(1-2):47-51, 1970 (Abstract Only).
Illanes et al., "Immobilization of Lactase and Invertase on Crosslinked Chitin," in Bioreactor Immobilized Enzymes and Cells, Moo-Young, Ed., *Elsevier Applied Science*: London, 233-49, 1998.
Illanes, "Stability of Biocatalysts," *Elec J Biotechnol*, 2(1):1-9, 1999.
International Search Report and Written Opinion, PCT/US06/24863, filed Jun. 27, 2006.
Kirk-Othmer, Encyclopedia of Chemical Technology, 4$^{th}$ Ed., 5:476-563, 1993.
Krajewska, "Application of Chitin- and Chitosan-based Materials for Enzyme Immobilizations: A Review," *Enz Microb Technol*, 35:126-39, 2004.
Lau et al., "Dissolution of *Candida antarctica* Lipase B in Ionic Liquids: Effects on Structure and Activity," *Green Chem*, 6:483-87, 2004.
Leipner et al., "Structural Changes of Cellulose Dissolved in Molten Salt Hydrates," *Macromol Chem Phys*, 201(15):2041-49, 2000.
Liebert and Heinze, "Tailored Cellulose Esters: Synthesis and Structure Determination," *Biomacromolecules*, 6:333-40, 2005.
Linko et al., "Cellulose Bead Entrapped Microbial Cells for Biotechnical Applications," *Enzyme Microb Technol* 1:26-30, 1979.
Maia et al., "Cellulose Organic Solvents. I. The Structure of Anhydrous N-Methylmorpholine N-Oxide Monohydrate," *Acta Cryst*, B37:1858-62, 1981.
Mais et al., "Modification of Cellulose Using Cellulose P-Toluenesulfonates as Intermediates," *Zeszyty Naukowe Politechniki Slaskiej Chemm*, 140:121-1999.
Marson et al., "A Novel, Efficient Procedure for Acylation of Cellulose Under Homogeneous Solution Conditions," *J Appl Polymer Sci*, 74:1355-60, 1999.
Mazurkiewicz et al., "Conducting Polymer Electrochemistry in Ionic Liquids," *Synthetic Metals*, 135:31-2, 2003.
Ngo et al., "Thermal Properties of Imidazolium Ionic Liquids," *Thermochimica Acta*, 357-358:97-102, 2000.
Ohno et al., "A New Type of Polymer Gel Electrolyte: Zwitterionic Liquid/Polar Polymer Mixture," *Electrochimica Acta*, 48(14-16):2079-83, 2003.
Okamoto and Shimakawa, "Synthesis, Spectra, and Reactions of N-Triphenylmethylpyridinium Salts. Reactions of Triphenylmethyl Chloride with Pyridine Under High Pressure," *J Org Chem*, 35(11):3752-56, 1970.
Perrier et al., Reversible Addition—Fragmentation Chain Transfer Polymerization of Methacrylate, Acrylate and Styrene Monomers in 1-Alkyl-3-Methylimidazolium Hexfluorophosphate, *European Polymer J*, 39(3):417-22, 2003.
Ren et al., "Synthesis of 1-Allyl-3-Methylimidazolium-Based Room Temperature Ionic Liquid and Preliminary Study of its Dissolving Cellulose," *Acta Polymerica Sinica*, 448-51, 2003.
Sakai, "Determination of Pore Size and Pore Size Distribution," *J Membr Sci*, 96:91-130, 1994.
Shriver et al., *Inorganic Chemistry*, W.H. Freeman & Co., New York, 406-7, 1990.
Snedden et al., "Cross-Linked Polymer-Ionic Liquid Composite Materials," *Macromolecules*, 36(12):4549-56, 2003.
Stöllner et al., "Activation of Cellulose Membranes With 1,1'-Carbonyldiimidazole or 1-Cyano-4-Dimethylaminopyridinium Tetrafluoroborate as a Basis for the Development of Immunosensors," *Anal Biochem*, 304:157-65, 2001.
Suarez et al., "Synthesis and Physical-Chemical Properties of Ionic Liquids Based on 1-n-Butyl-3-Methylimidazolium Cation," *J Chim Phys*, 95:1626-39, 1998.
Swatloski et al., "Dissolution of Cellulose with Ionic Liquids," *J Am Chem Soc*, 124:4974-5, 2002.
Swatloski et al., "Ionic Liquids for the Dissolution and Regeneration of Cellulose," In *Molten Salts XIII: Proceedings of the International Symposium*, Trulove, P.C., DeLong, H.C., Mantz, R.A., Stafford, G.R., Matsunaga, M., Eds., The Electrochemical Society: Pennington, NJ, 19:155, 2002.
Tiller et al., "A Novel Efficient Enzyme-Immobilization Reaction on NH$_2$ Polymers by Means of L-Ascorbic Acid," *Biotechnol Appl Biochem*, 30:155-62, 1999.
Turner et al., "Production of Bioactive Cellulose Films Reconstituted from Ionic Liquids," *Biomacromolecules*, 5:1379-84, 2004.
Weckstrom et al., in *Food Engineering in Food Processing*, vol. 2, *Applied Science Publishers Ltd.*, 148-51, 1979.
Wilkes et al., "Air and Water Stable 1-Ethyl-3-methyfimidazolium Based Ionic Liquids," *J Chem Soc, Chem Commun*, 965-7, 1992.
Wu et al., "Homogeneous Acetylation of Cellulose in a New Ionic Liquid," *Biomacromol*, 5:266-68, 2004.
Earle et al., "Ionic liquids. Green Solvents for the future," Pure Appl. Chem., 72(7):1391-1398 (2000).
Huddleston et al., "Room Temperature Ionic Liquids as Novel Media for Clean Liquid-Liquid Extraction," Chem. Commun., 1765-1756 (1998).
International Search Report and Written Opinion for PCT/2009/01066, issued Jun. 22, 2009.
Liebert et al., "Tailored Cellulose Esters: Synthesis and Structure Determination," *Biomacromolecules*, 6:333-40 (2005).
Padhye et al., "Cellulose Degradation in Xanthate Process," *J. App. Polymer Sci.* 36:1475-1478 (1988).
Sun et al. "Magnetite-Embedded Cellulose Fibers Prepared From Ionic Liquid," *J. Materials Chem.*, 18:283-290 (2008).
Supplemental Search Report for EP4757863, issued May 12, 2009.
Visser et al. "Task Specific Ionic Liquids for the Extraction of Metal Ions from Aqueous Solutions," *Chem. Commun.*, 135-136 (2001).
Benton and Brazel, "Ionic Liquids," (2002) 818:125-133.
Biedron and Kubisa, "Ionic Liquids as Reaction Media for Polymerization Processes: Atom Transfer Radical Polymerization (ATRP) of Acrylates in Ionic Liquids," Polymer International (2003) 52(10):1584-1588.
Endres, Frank, "Ionic Liquids: Solvents for the Electrodeposition of Metals and Semiconductors," ChemPhysChem, 2002, 3, 2:144-154.
Ma et al., "Reverse Atom Transfer Radical Polymerization of Methyl Methacrylate in Room-Temperature Ionic Liquids," J. Polymer Sci. Pt. A-Polymer Chem. (2003) 41:143-151.
Nara et al., "Compositions Consisting of Cationic Polymers Comprising Amidinium Groups and Ionic Liquids," Tetrahedron Lett. (2003) 44:1371-1373.
Written Opinion for PCT/US05/010235 filed Jan. 3, 2007.
Axegård, The Future Pulp Mill-A Biorefinery? Presentation at 1st International Biorefinery Workshop, Washington, DC., Jul. 20-21, 2005.
Cateto et al., Monitoring of lignin-based polyurethane synthesis by FTIR-ATR, Ind. Crops Prod., 27(2):168-174 (2008).
El Seoud et al., Applications of ionic liquids in carbohydrate chemistry: A window of opportunities, Biomacromol, 8 (9):2629-2647 (2007).
Fort et al., Can ionic liquids dissolve wood? Processing and analysis of lignocellulosic materials with 1-n-butyl-3-methylimidazolium chloride, Green Chem., 9:63-69 (2007).
Fukaya et al., Cellulose dissolution with polar ionic liquids under mild conditions: required factors for anions, Green Chem., 10:44-46 (2008).
Gallezot, Process options for converting renewable feedstocks to bioproducts, Green Chem., 9:295-302 (2007).
International Search Report and Written Opinion for PCT/US2009/64105 issued Jan. 13, 2010.
Kilpeläinen et al., Dissolution of wood in ionic liquids, J. Agric. Food Chem., 55:9142-9148 (2007).
Lee et al., Ionic Liquid-Mediated Selective Extraction of Lignin from wood leading to enhanced enzymatic cellulose hydrolysis, Biotech. and Bioeng., 102(5):1368-1376 (2009).
Manangeeswaran et al., Degradation of indulin, a kraft pine lignin, by *Serratia marcescens*, J. Environ. Sci. Health, Part B: Pesticides, Food Contaminants, and Agricultural Wastes, 42(3):321-327 (2007).
Pu et al., Ionic liquid as a green solvent for lignin, J. Wood Chem. Technol, 27:23-3 (2007).

(56) References Cited

OTHER PUBLICATIONS

Rogers et al., Ionic Liquids—Solvents of the Future? Science, 302:792-793 (2003).

Willauer et al., Investigation of aqueous biphasic systems for the separation of lignins from cellulose in paper pulping process, J. Chromatogr. B: Biomed. Sci. Applic., 743(1-2):127-135 (2000).

Extended European Search Report for Application No. 06774039.9 dated Jul. 8, 2011.

Office Action for AU Patent Application No. 2006266151 dated Oct. 28, 2010.

Office Action for CA Application No. 2,614,117 dated May 27, 2011.

Office Action for EA Application No. 200800160 dated Jul. 30, 2010.

Office Action for EA Application No. 200800160 dated Mar. 23, 2011.

Office Action for U.S. Appl. No. 111475,630 dated Aug. 9, 2010.

Okutucu et al., Covalent Attachment of Oligonucleotides to Cellulose Acetate Membranes, Artificial Cells, Blood Substitutes, and Biotechnology, 32(4):599-608 (2004).

Stöllner et al., Activation of Cellulose Membranes with 1,1'-Carbonyldiimidazole or 1-Cyano-4-dimethylaminopyridinium tetrafluoroborate as a Basis for the Development of Immunosensors, Analytical Biochemistry, 304:157-165 (2002).

* cited by examiner

CELLULOSIC BIOCOMPOSITES AS MOLECULAR SCAFFOLDS FOR NANO-ARCHITECTURES

CROSS-REFERENCE TO RELATED APPLICATIONS

This application is a continuation-in-part of U.S. Utility application Ser. No. 11/475,630, filed Jun. 27, 2006, which claims the benefit of priority to U.S. Provisional Application No. 60/694,902, filed on Jun. 29, 2005, both of which are incorporated by reference herein in their entireties.

FIELD

The subject matter disclosed herein generally relates to cellulose composites and to methods of preparing such composites using ionic liquids. Also disclosed are methods of using the cellulose compositions described herein.

BACKGROUND

Entrapped materials are substances that have some restriction in their ability to freely move (e.g., dissociate, dissolve, or diffuse) in an environment. A few examples of entrapped materials are a bioactive agent encapsulated in a microcapsule, a reactive agent coated onto a substrate, an enzyme covalently attached to a bead, or a macromolecule entangled in a gel or fiber matrix. Having a wide number of uses, such as controlled release systems, structural modifiers, and sensor or reactive materials, entrapped materials and methods for their preparation are an important field of research.

Typically, entrapped materials are formulated as membranes, coatings, or capsules. Current methods for forming such materials include emulsion polymerization, interfacial polymerization, dissolution, emulsification, gelation, spray-drying, vacuum coating, and adsorption onto porous particles. Common materials used in these methods include polymers, hydrocolloids, sugars, waxes, fats, metals, and metal oxides.

For the controlled release of entrapped liquid materials, the use of membranes, coatings, capsules, etc., is well known. For example, controlled-release materials have been used in the preparation of graphic arts materials, pharmaceuticals, food, and pesticide formulations. In agriculture, controlled-release techniques have improved the efficiency of herbicides, insecticides, fungicides, bactericides, and fertilizers. Non-agricultural uses include encapsulated dyes, inks, pharmaceuticals, flavoring agents, and fragrances.

The most common forms of controlled-release materials are coated droplets or microcapsules, coated solids, including both porous and non-porous particles, and coated aggregates of solid particles. In some instances, a water-soluble encapsulating film is desired, which releases the encapsulated material when the capsule is placed in contact with water. Other coatings are designed to release the entrapped material when the capsule is ruptured or degraded by external force. Still further coatings are porous in nature and release the entrapped material to the surrounding medium at a slow rate by diffusion through the pores.

Other materials have been formulated as emulsifiable concentrates by dissolving the materials in an organic solvent mixed with a surface-active agent or as an oily agent. In solid form, insecticides have been formulated as a wettable powder in which the insecticide is adsorbed onto finely powdered mineral matter or diatomaceous earth, as a dust or as granules.

Enzymes and proteins have become popular materials for entrapment. For example, enzyme entrapment on a solid support has been studied extensively as a simple means of protein stabilization and catalyst separation and recovery from reaction systems (Gemeiner, In *Enzyme Engineering*, Gemeiner, Ed., Ellis Horwood Series in Biochemistry and Biotechnology, Ellis Horwood Limited: West Sussex, England, 1992, pp 158-179; Mulder, *Basic Principles of Membrane Technology*, Kluwer Academic Publishers: Dordrecht, 1991). Entrapment of enzymes on solid supports can result in improved stability to pH and temperature and aid in separation of the enzyme from the reaction mixture, and also for formation of enzyme electrodes for sensor applications.

There are four principal methods available for immobilizing enzymes and other proteins: adsorption, covalent binding, entrapment, and membrane confinement. Typical materials used for these purposes include silica, polyaniline, acrylics, chitin, and cellulose (Gemeiner, In *Enzyme Engineering*, Gemeiner, Ed., Ellis Horwood Series in Biochemistry and Biotechnology, Ellis Horwood Limited: West Sussex, England, 1992, pp 158-179; Krajewska, *Enz Microb Technol* 2004, 35:126-139). Entrapment of enzymes within gels or fibers is typically used in processes involving low molecular weight substrates and products. Entrapment in calcium alginate is also used for immobilization of microbial, animal, and plant cells.

For entrapping proteins and other biomolecules, the use of cellulose, which is hydrophilic and wettable, can be desirable because it helps create a compatible environment as compared to hydrophobic materials (Tiller et al., *Biotechnol Appl Biochem* 1999, 30:155-162; Sakai, *J Membr Sci* 1994, 96:91-130). In addition, cellulose is robust, chemically inert under physiological conditions, and non-toxic, all of which are important for protein survival and advantageous for industrial processing. One method for enzyme immobilization uses polysaccharide activation in which cellulose beads are reacted under alkali conditions with cyanogen bromide. The intermediate produced is then covalently coupled with soluble enzymes. Enzymes can also be entrapped in cellulose acetate fibers by formulation of an emulsion of the enzyme plus cellulose acetate in dichloromethane, followed by extrusion of fibers.

In other examples, materials can be entrapped by dissolving and reconstituting cellulose. However, traditional cellulose dissolution processes, including the cuprammonium and xanthate processes, are often cumbersome or expensive and require the use of unusual solvents, typically with a high ionic strength and are used under relatively harsh conditions. (Kirk-Othmer, *Encyclopedia of Chemical Technology*, Fourth Edition 1993, Vol. 5, p. 476-563.) Such solvents include carbon disulfide, N-methylmorpholine-N-oxide (NMMNO), mixtures of N,N-dimethylacetamide and lithium chloride (DMAC/LiCl), dimethylimidazolone/LiCl, concentrated aqueous inorganic salt solutions (e.g., $ZnCl/H_2O$, $Ca(SCN)_2/H_2O$), concentrated mineral acids (e.g., $H_2SO_4$/$H_3PO_4$), or molten salt hydrates (e.g., $LiC_4.3H_2O$, NaSCN/KSCN/LiSCN/$H_2O$). These cellulose dissolution processes break the cellulose polymer backbone, resulting in regenerated products that contain an average of about 500 to about 600 glucose units per molecule rather than the native larger number of about 1500 or more glucose units per molecule. In addition, processes such as that used in rayon formation proceed via xanthate intermediates and tend to leave some residual derivatized (substituent groups bonded to) glucose residues, as in xanthate group-containing cellulose.

U.S. Pat. No. 5,792,399 discloses the use of N-methylmorpholine-N-oxide (NMMNO) solutions of cellulose to prepare regenerated cellulose that contained polyethyleneimine (PEI). That patent discloses that one should utilize a pretreatment with the enzyme cellulase to lessen the molecular weight of the cellulose prior to dissolution. In addition, it discloses that NMMNO decomposes at the temperatures used for dissolution to provide N-methylmorpholine as a degradation product that could be steam distilled away from the cellulose solution. The presence of PEI is said to lessen the decomposition of the NMMNO.

Other processes that can provide a solubilized cellulose do so by forming a substituent that is intended to remain bonded to the cellulose, such as where cellulose esters like the acetate and butyrate esters are prepared, or where a carboxymethyl, methyl, ethyl, $C_2$-$C_3$ 2-hydroxyalkyl (hydroxyethyl or hydroxypropyl), or the like group is added to the cellulose polymer. Such derivative (substituent) formation also usually leads to a lessening of the degree of cellulose polymerization so that the resulting product contains fewer glucose units per molecule than the cellulose from which it was prepared.

Against this background, many formulations of entrapped materials pose a variety of problems, such as the pollution of the environment caused by organic solvents used in the emulsions and by dust resulting from the wettable powders, and the costs associated with the removal of unwanted byproducts. Also, the use of cellulose in such compositions is generally associated with a number of drawbacks, most notably, the need for extensive chemical activation and functionalization necessary in order to attach biomolecules to the surface (Klemm et al., *Comprehensive Cellulose Chemistry*, Wiley VCH: Chichester, 1998; Vol. 2.; Chesney et al., *Green Chem* 2000, 2:57-62; Stöllner et al., *Anal Biochem* 2001, 304:157-165). Methods that involve cellulose solubilization can suffer from a break-down of the cellulose backbone, the requirement of exotic solvents and additional steps, and unwanted derivatization of the cellulose. Furthermore, for these formulations to have long-term residual effectiveness, an amount of entrapped material much higher than that used in normal applications can be required, and this increased amount can affect the environment or cause problems of safety.

Because the preparation of such entrapped materials can be technically difficult and environmentally harmful, there is a strong demand for methodologies that can reduce or simplify the entrapment process. There is also a need for superior formulations that can effectively replace the emulsifiable concentrates, interfacially-polymerized or wettable powders, and are safer to use. Also, the need for processes and formulations that allow for the utilization of cellulosic materials is highly desirable for a formulation that maintains a high degree of efficacy over long periods. Disclosed herein are compositions and methods that meet these and other needs.

SUMMARY

In accordance with the purposes of the disclosed materials, compounds, compositions, articles, devices, and methods, as embodied and broadly described herein, the disclosed subject matter, in one aspect, relates to compounds and compositions and methods for preparing and using such compounds and compositions. In a further aspect, the disclosed subject matter relates to cellulose/active substance composites. Methods for making the disclosed composites involving the use of ionic liquids are also disclosed. In a still further aspect, the disclosed subject matter relates to articles prepared from the disclosed composites.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
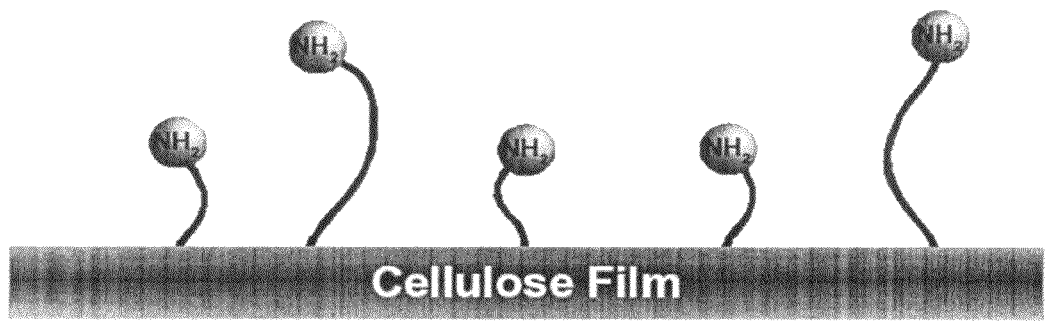
FIG. 1 is as schematic representation of a cellulose-polyamine film with protruding primary amines.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such component, and the like.

"Optional" or "optionally" means that the subsequently described event or circumstance can or cannot occur, and that the description includes instances where the event or circumstance occurs and instances where it does not. For example, the phrase "L is an optional linker" means that L may or may not be present in the composite and that the description includes both composites where L is present (e.g., linking a first active substance to a second active substance) and composites where L is not present, in which case the first and second active substances are directly bonded together.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

By "entrapped" or other forms of the word, such as "entrap" or "entrapment," is meant a permanent or temporary restriction in the free movement of a molecule. These terms are not meant to imply a particular mode or method of movement restriction, e.g., an entrapped molecule can be chemically bonded or tethered to a bead, physically encased or entangled in a matrix, ionically or electrostaticly attracted to a particle, entrapped through hydrogen bonding, or magnetically hindered in its free range of movement. Also, these terms are not meant to imply a particular degree movement restriction. For example, an entrapped compound can be only slightly limited in its range of movement or ability to diffuse or it can be substantially hindered in its ability to move. As used herein, entrapped is synonymous with encapsulated, attached, bonded, adhered, adsorbed, absorbed, immobilized, confined, distributed within, embedded, and entangled.

Chemical Definitions

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —OA$^1$ where A$^1$ is alkyl as defined above.

The term alkoxylalkyl as used herein is an alkyl group that contains an alkoxy substituent and can be defined as -A$^1$-O-A$^2$, where A$^1$ and A$^2$ are alkyl groups.

The term "alkenyl" as used herein is a hydrocarbon group of from 2 to 24 carbon atoms with a structural formula containing at least one carbon-carbon double bond. Asymmetric structures such as (A$^1$A$^2$)C=C(A$^3$A$^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O$^-$.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —NO$_2$.

The term "silyl" as used herein is represented by the formula —Si$A^1A^2A^3$, where $A^1$, $A^2$, and $A^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfo-oxo" as used herein is represented by the formulas —S(O)$A^1$, —S(O)$_2A^1$, —OS(O)$_2A^1$, or —OS(O)$_2$O$A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above. Throughout this specification "S(O)" is a short hand notation for S═O The term "sulfonyl" is used herein to refer to the sulfo-oxo group represented by the formula —S(O)$_2A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "sulfone" as used herein is represented by the formula $A^1S(O)_2A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfoxide" as used herein is represented by the formula $A^1S(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "thiol" as used herein is represented by the formula —SH.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

Materials and Compositions

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In one aspect, disclosed herein are cellulose/active substance composites that comprise a regenerated cellulose matrix, a first active substance substantially homogeneously distributed within the matrix of regenerated cellulose, a linker, and a second active substance. In the disclosed composites, the linker can be bonded to the first and second active substances, thus linking them together. In this way, the second active substance can be attached to or associated with the regenerated cellulose. Also, disclosed herein are cellulose/active substance composites that comprise a regenerated cellulose matrix, a first active substance substantially homogeneously distributed within the matrix of regenerated cellulose and a second active substance. In this alternative embodiment, the second active substance is bound directly to the first active substance without the use of a linker. Such composites can have a wide variety of uses, as are described herein. For example, depending on the particular active substances, the disclosed composites can be used in protective clothing, bandages, paper, polymeric coatings, slow release therapeutics, wetting agents, and any other application where functionalized cellulose is needed or desired.

Regenerated Cellulose

The regenerated cellulose component of the disclosed composites can be prepared by methods described below. In general, the regenerated cellulose can be prepared by dissolving a starting cellulose in an ionic liquid and then adding to the solution a liquid non-solvent (i.e., a liquid that does not substantially dissolve the starting cellulose but is miscible with the ionic liquid). The starting cellulose can be any cellulosic material. Examples of suitable starting cellulose include, but are not limited to, fibrous cellulose, wood pulp, paper, linters, cotton, and the like, including mixtures thereof. This produces regenerated cellulose, which, in many cases, has substantially the same molecular weight as the starting cellulose from which it was prepared. By "substantially the same molecular weight" is meant that the difference in molecular weight between the starting cellulose and the regenerated cellulose is less than about 25%, 20%, 15%, 10%, 5%, 1%, or 0% of the molecular weight of the starting cellulose. Further, the regenerated cellulose can be substantially free of an increased amount of substituent groups relative to the starting cellulose. By "substantially free of an increased amount of substituent groups" is meant that the number of substituent groups on the regenerated cellulose (e.g., functionalization of the hydroxyl groups present on cellulose by esterification or alkylation), commonly referred to as the degree of substitution or "D.S.," is less than, equal to, or 0.1, 0.5, 1, 5, 10, 15, 20, 25, 30, or 35% greater than that of the starting cellulose. Also, the regenerated cellulose component of the disclosed composites can be substantially free of entrapped ionic liquid degradation products. By "substantially free of entrapped ionic liquid degradation products" is meant that the regenerated cellulose can contain less than about 25%, less than about 20%, less than about 15%, less than about 10%, less than about 5%, less than about 3%, less than about 2%, less than about 1%, less than about 0.5%, or about 0% by weight of the regenerated cellulose of entrapped ionic liquid degradation products. In many examples, the regenerated cellulose is in the form of a bead(s). It is noted that cellulose is not digestible, unlike current drug delivery matrixes. As such the cellulose composites disclosed herein can be expected, in certain applications, to be excreted from a body substantially unchanged, except for the release of the second active substance.

First Active Substance

The first active substance component of the disclosed cellulose/active substance composites can be substantially homogeneously distributed within the matrix of the regenerated cellulose. By "substantially homogeneously" is meant averaged over a volume of regenerated cellulose of at least one cubic inch; on a microscopic scale there can be volumes having a first active substance distributed therein and other volumes within the regenerated cellulose that do not have a first active substance. Suitable methods for distributing or entrapping the first active substance substantially homogeneously within the matrix of the regenerated cellulose are described herein. It is also contemplated that more than one kind of first active substance, as are described herein, can be used in the disclosed composites and methods.

Also the first active substance can be reacted with crosslinking agents to increase its size, such that it does not leave the cellulose beads in which it is embedded. In this sense, it is said that the first active substance is crosslinked with a linker. Suitable examples of linkers are disclosed elsewhere herein.

Generally, the first active substance can be any substance that can be distributed within the matrix of regenerated cellulose and that can be coupled (e.g., bonded or attached) to a linker, examples of which are described herein. Coupling the first active substance to the linker can be accomplished by any reaction that can form a bond between the first active substance and the linker. For example, the first active substance can have one or more electrophilic functional groups that can react with one or more nucleophilic functional groups on the linker to form a bond. Alternatively, the first active substance can have one or more nucleophilic functional groups that can react with one or more electrophilic functional groups on the linker to form a bond. By "nucleophilic functional group" is meant any moiety that contains or can be made to contain an electron rich atom; examples of nucleophilic functional groups are disclosed herein. By "electrophilic functional group" is meant any moiety that contains or can be made to contain an electron deficient atom; examples of electrophilic functional groups are also disclosed herein. Specific examples of first active substances, second active substances, and linkers, as well as methods for coupling them together are disclosed herein.

Nucleophilic Functional Groups

In a particular example, the first active substance can be a polymeric compound that comprises one or more nucleophilic functional groups, which can react with an electrophilic group on a linker to form a bond. It is understood that when a nucleophilic functional group is reacted with an electrophilic functional group, the nucleophilic functional group may no longer be nucleophilic. In this sense, the disclosed composites can, in some examples, be without a nucleophilic functional group on the first active substance; that is, the nucleophilic functional group has been coupled to an electrophilic functional group on the linker and is no longer nucleophilic or as nucleophilic as before. However, for the purposes of this disclosure, various functional groups are identified by referring to them prior to bond formation. For example, in a composites disclosed herein a first active substance can be referred to as having an amine and a linker can be referred to as having an aldehyde, even though in the disclosed composites, the amine functional group of the first active substance is not present due to having formed a bond with the aldehyde functional group of the linker to result in an imine. This practice is used throughout when referring to active substances and linkers.

Examples of nucleophilic functional groups that can be present on a first active substance include, but are not limited to, an amine, amide, and hydroxyl group. In some aspects, one or more different nucleophilic groups can be present on the first active substance.

Polymeric Amines

In one specific example, the first active substance can be a polymeric amine (i.e., a polymer that comprises one or more amine groups). In this instance, the amine acts as a nucleophilic functional group that can react with an electrophilic moiety on the linker (e.g., reacting with an aldehyde or ester to form an imine or amide bond, respectively).

In another example, the polymeric amine can be an amino acid based polymer. As used herein "amino acid" means the typically encountered twenty amino acids which make up polypeptides. In addition, it further includes less typical constituents which are both naturally occurring, such as, but not limited to formylmethionine and selenocysteine, analogs of typically found amino acids, and mimetics of amino acids or amino acid functionalities. Non-limiting examples of these and other molecules are discussed herein.

Suitable amino acid based polymers are "peptides," which are a class of compounds composed of amino acids chemically bound together. In general, the amino acids are chemically bound together via amide linkages (CONH); however, the amino acids may be bound together by other chemical bonds known in the art. For example, the amino acids can be bound by amine linkages. "Peptide" as used herein includes oligomers of amino acids and small and large peptides (e.g., proteins).

It is understood that there are numerous amino acid based polymers that are suitable for use as the first active substance. For example, there are numerous D-amino acids or L-amino acids that have a different functional substituent than the typically encountered amino acids. The opposite stereoisomers of naturally occurring peptides are also suitable, as well as the stereo isomers of peptide analogs. Additionally, the first active substances can be produced to resemble peptides, but which are not connected via a natural peptide linkage. For example, linkages for amino acids or amino acid analogs can include —CH$_2$NH—, —CH$_2$CH$_2$—, —CH=CH— (cis and trans), —COCH$_2$—, —CH(OH)CH$_2$—, and —CH$_2$SO—. These and others can be found in Spatola, Chemistry and Biochemistry of Amino Acids, Peptides, and Proteins, B. Weinstein, eds., Marcel Dekker, NY, p. 267, 1983; Spatola, Vega Data, Peptide Backbone Modifications Vol. 1, Issue 3, 1983 (general review); Morley, *Trends Pharm Sci* 1980, 463-68,; Hudson et al., *Int J Pept Prot Res* 1979, 14:177-185 (—CH$_2$NH—, —CH$_2$CH$_2$—); Spatola et al., *Life Sci* 1986, 38:1243-1249 (—CH$_2$S—); Hann, *J Chem Soc Perkin Trans I* 1982, 307-314 (—CH=CH—, cis and trans); Almquist et al., *J Med Chem* 1980, 23:1392-1398 (—C(O)CH$_2$—); Jennings-White et al., *Tetrahedron Lett* 1982, 23:2533 (—C(O) CH$_2$—); Szelke et al., European App. No. EP 45665 CA (—CH(OH)CH$_2$—); Holladay et al., *Tetrahedron Lett* 1983, 24:4401-4404 (—C(OH)CH$_2$—); and Hruby, *Life Sci* 1982, 31:189-199 (—CH$_2$S—); each of which is incorporated herein by reference herein for at least their teachings of amino acid analogs. It is understood that peptide analogs can have more than one atom between the bonding amine and acid functionality, such as beta-alanine, gama-aminobutyric acid, and the like. Such analogs are contemplated within the meaning of the terms polymeric amine and peptide.

In addition, the disclosed first active substance can be a derivative or variant of a peptide. Peptide variants and derivatives are well understood to those of skill in the art and can involve amino acid sequence modifications. For example, amino acid sequence modifications typically fall into one or more of three classes: substitutional, insertional, and deletional variants. Insertions include amino and/or carboxyl terminal fusions as well as intrasequence insertions of single or multiple amino acid residues. Deletions are characterized by the removal of one or more amino acid residues from the protein sequence. Substitutions, deletions, insertions, or any combination thereof can be combined to arrive at a final construct.

Also, a suitable first active substance can be a peptide that has certain post-translational derivatizations. For example, acetylation of the N-terminal amine or amidation of the C-terminal carboxyl. It is also possible to use peptides and proteins linked to other molecules (e.g., conjugates). For example, carbohydrates (e.g., glycoproteins) can be linked to the protein or peptide. Such derivatives, variants, and analogs of peptides and proteins are contemplated herein within the meaning of the terms polymeric amine, amino acid based polymer, and peptide, and are all suitable for use as the first active substance.

Some specific examples of amino acid based polymers that are suitable for use a first active substance include, but are not limited to, polylysine, proteins (e.g., enzymes), and peptides, including mixtures thereof. Some particular examples include, but are not limited to, bovine serum albumin (BSA), lactase, haloamine, amylase, propolis, whey protein, dioxychlor, lactoferrin, and Melissa officinalis.

Methods for producing such amino acid based polymers, peptides, and proteins are well known. One method is to link two or more peptides or polypeptides together by protein chemistry techniques. For example, peptides or polypeptides can be chemically synthesized using currently available laboratory equipment using either Fmoc (9-fluorenylmethyloxycarbonyl) or Boc (tert-butyloxycarbonyl) chemistry. (Applied Biosystems, Inc., Foster City, Calif.). One skilled in the art can readily appreciate that a peptide or polypeptide corresponding to the disclosed first active substances can be synthesized by standard chemical reactions. For example, a peptide or polypeptide can be synthesized and not cleaved from its synthesis resin whereas the other fragment of a peptide or protein can be synthesized and subsequently cleaved from the resin, thereby exposing a terminal group which is functionally blocked on the other fragment. By peptide condensation reactions, these two fragments can be covalently joined via a peptide bond at their carboxyl and amino termini, respectively, to form an antibody, or fragment thereof. (Grant, Synthetic Peptides: A User Guide. W.H. Freeman and Co., NY, 1992; Bodansky and Trost, Ed. Principles of Peptide Synthesis. Springer-Verlag Inc., NY, 1993, which are incorporated by reference herein at least for material related to peptide synthesis). Alternatively, a peptide or polypeptide first active substance can be independently synthesized in vivo.

Once isolated, independent peptides or polypeptides can be linked, if desired, to form a peptide or fragment thereof via similar peptide condensation reactions. For example, enzymatic ligation of cloned or synthetic peptide segments allow relatively short peptide fragments to be joined to produce larger peptide fragments, polypeptides or whole protein domains (Abrahmsen et al., *Biochemistry* 1991, 30:4151, which is incorporated by reference herein at least for its teachings of peptide and protein synthesis). Alternatively, native chemical ligation of synthetic peptides can be utilized to synthetically construct large peptides or polypeptides from shorter peptide fragments. (See e.g., Dawson et al., *Science* 1994, 266:776-9; Baggiolini et al., *FEBS Lett* 1992, 307:97-101; Clark-Lewis et al., *J Biol Chem* 1994, 269:16075; Clark-Lewis et al., *Biochemistry* 1991, 30:3128; Rajarathnam et al., *Biochemistry* 1994, 33:6623-6630, which are all incorporated by reference herein at least for their teachings of peptide and protein synthesis). Alternatively, unprotected peptide segments can be chemically linked where the bond formed between the peptide segments as a result of the chemical ligation is an unnatural (non-peptide) bond (Schnolzer et al., *Science* 1992, 256:221, which is incorporated by reference herein at least for its teachings of peptide and protein synthesis). This technique has been used to synthesize analogs of protein domains as well as large amounts of relatively pure proteins with full biological activity (deLisle Milton et al., Techniques in Protein Chemistry IV. Academic Press, NY, pp. 257-67, 1992, which is incorporated by reference herein at least for its teachings of peptide and protein synthesis). Commercially available amino acid based polymers, peptides, and proteins are also suitable for use as the first active substance in the composites disclosed herein. Further, amino acid based polymers that have been isolated from various systems and subjects can also be used.

Other suitable examples of polymeric amines are olefin based polymers that contain one or more amine functional group. Many such polyamines can be obtained commercially or can be prepared by methods known in the art. Suitable examples of polyamines that can used as a first active substance in the disclosed cellulose/active substance composites include, but are not limited to, polyvinyl amine, polyetheramine and polyalkyleneimines like polyethyleneimine.

Still further examples of polymeric amines are polyamides that are prepared by the condensation of a diamine monomer with a diacid or diester monomer. Such polyamides are well known in the art and can be obtained commercially. Alternatively, polyamides can be prepared by self condensation of a monomer containing an amine and an acid or ester functional group, or through a ring opening reaction of a cyclic amide (i.e., lactam) such as caprolactam. Nylons are common examples of such polyamides.

Yet another example of a suitable polymeric amine is a polyether amine. Polyether amines contain primary amino groups attached to the terminus of a polyether backbone. The polyether backbone is typically based either on propylene oxide (PO), ethylene oxide (EO), or mixed EO/PO/BO. In one aspect, the polyether amine can be a polyoxyalkyleneamines. Such polyether amines can be obtained commercially from Huntsman Performance Products (Salt Lake City, Utah) under the name JEFFAMINE™ (e.g., JEFFAMINE D230). JEFFAMINES can have monoamines, diamines, and triamines, and are available in a variety of molecular weights, ranging up to 5,000.

A still further example of a suitable polymeric amine is a dendrimeric polyamine. Such dendrimers, in one example, have a macromolecular architecture called "dense star" polymers. Unlike classical polymers, these dendrimers have a high degree of molecular uniformity, narrow molecular weight distribution, specific size, and shape characteristics, and a highly-functionalized terminal surface.

An example of dendrimeric polyamines are the PAMAM™ dendrimers, which are poly(amidoamine) dendrimers. The manufacturing process for these dendrimers is a series of repetitive steps starting with a central initiator core (e.g., ethylenediamine-cores). Each subsequent growth step represents a new "generation" of polymer with a larger molecular diameter, twice the number of reactive surface sites, and approximately double the molecular weight of the preceding generation. The table below shows the calculated (theoretical) properties of amine surface functional PAMAM™ dendrimers by generation.

| Generation | Molecular Weight | Measured Diameter (Å) | Surface Groups |
|---|---|---|---|
| 0 | 517 | 15 | 4 |
| 1 | 1,430 | 22 | 8 |
| 2 | 3,256 | 29 | 16 |
| 3 | 6,909 | 36 | 32 |
| 4 | 14,215 | 45 | 64 |
| 5 | 28,826 | 54 | 128 |
| 6 | 58,048 | 67 | 256 |
| 7 | 116,493 | 81 | 512 |
| 8 | 233,383 | 97 | 1024 |
| 9 | 467,162 | 114 | 2048 |
| 10 | 934,720 | 135 | 4096 |

There are many suitable PAMAM™ dendrimers that are commercially available, such as from Sigma Aldrich (Milwaukee, Wis.). Further, PAMAM™ dendrimers can be coupled with 1,3-phenylene diisocyanate. This coupled product can prevent the dendrimer from leaching out of the cellulose.

Other Nucleophilic Functional Group Containing Polymers

In yet another suitable example of a first active substance comprising a nucleophilic functional group, the first active substance can be a polymeric alcohol (i.e., a polymer that comprises one or more hydroxyl groups). Such hydroxy groups can react with electrophilic groups on a linker (or second active substance) to form a bond (e.g., react with a halogen, aldehyde, epoxides, or ester). A suitable polymeric alcohol is polyvinyl alcohol, which is commercially available or can be prepared by the hydrolysis of polyvinyl acetate. Other suitable polymeric alcohols include, but are not limited to, 1,1,1-tris(hydroxymethyl)propane (TMP), diglycerol, hyperbranched polyglycerol, saccharides, polysaccharides, and the like. It is also contemplated that the polymeric alcohols can be coupled with 1,3-phenylene-diisocyanate for the same reason above to form a large crosslinked complex to prevent leaching.

Electrophilic Functional Groups

In another aspect of the disclosed cellulose/active substance composites, the first active substance can be a polymeric compound that comprises one or more electrophilic functional groups that can react with a nucleophilic group on a linker to form a bond. Examples of suitable electrophilic functional groups that can be used include, but are not limited to, ester, aldehyde, ethers, ketal, enals, anhydride, and halogen groups. It is contemplated that one or more different electrophilic groups can be present on the first active substance.

In one example of a first active substance comprising an electrophilic functional group, the first active substance can be a polyester or a polyacid (i.e., a polymer that comprises one or more ester or acid groups, respectively). Polyesters and polyacids are well known and can be obtained commercially or by methods known in the art. Suitable examples of polyesters include, but are not limited to, polyalkylene terephthalates. Suitable examples of polymeric acids include, but are not limited to, poly(meth)acrylates and polymaleic acids, including mixtures and copolymers thereof.

Second active Substance

The disclosed cellulose/active substance composites also comprise a second active substance. The second active substance can be linked to the first active substance through a linker. Alternatively, the second active substance can be linked directly to the first active substance. In this way, the disclosed composites have the second active substance associated with or attached to the regenerated cellulose matrix via the first active substance, which is distributed within the regenerated cellulose.

As described above for the first active substance, the second active substance can be any compound that can be coupled (e.g., bonded or attached) to a linker, which are described herein. Coupling the second active substance to the linker can be accomplished by any reaction that can form a bond between the second active substance and the linker. For example, the second active substance can have one or more electrophilic functional groups that can react with one or more nucleophilic functional groups on the linker to form a bond. Alternatively, the second active substance can have one or more nucleophilic functional groups that can react with one or more electrophilic functional groups on the linker to form a bond. Specific examples of first active substances (and second active substances) and linkers, as well as methods for coupling them together are disclosed herein.

Second active substance with nucleophilic functional groups can be any compound described above for the first active substance. For example, the second active substance can be a polymeric amine, an amino acid based polymer, peptide, protein, polyamide, polymeric alcohol, and the like, including mixtures thereof. Such molecules contain nucleophilic amine or alcohol groups that can react with an electrophilic group on a linker. Alternatively, the second active substance can comprise an electrophilic group as described above for the first active substance. For example, the second active can contain an ester or aldehyde or halogen than can react with a nucleophilic group on the linker. Thus, any of the first active substances disclosed herein are suitable as second active substances. Also, in some cases, the second active substance is the same compound as the first active substance. In other cases, the second and first active substances are different compounds.

Further, the second active substance can be any substance whose particular characteristics or properties are desired to be associated with the composite (i.e., via the first active substance and linker). In many, though not all cases, the second active substance can have certain desirable biological or chemical properties, which can be evident in the disclosed composites where the second active substance is linked to the first active substance entrapped in the regenerated cellulose matrix. While not wishing to be bound by theory, it is believed that because the second active substance is attached to the first active substance via the linker, it is some distance away from the regenerated cellulose matrix. This can allow the second active substance more freedom of movement, thus facilitating its ability to interact with additional substances.

In certain specific examples, if a cellulose/active substance composite is desired to have antibacterial properties, then a second active substance that is antibacterial can be used. In another example, if the cellulose/active substance composite is desired to have antiviral properties, then a second active substance that is antiviral can be used. It is also possible to used different types (e.g., two or more kinds) of second active substances to impart a variety of properties to the disclosed composites. An example of this is when an antibacterial and an antiviral second active substance are present in the disclosed composites. Also, it is contemplated that the first active substance can also have desired properties (e.g., biological or chemical properties) that complement the second active substance.

Some examples of suitable second active substances include, but are not limited to, an antibacterial, an antiviral, herbicide, an insecticide, a fungicide, a microbial cell, a repellent for an animal or insect, a plant growth regulator, a fertilizer, a flavor or odor composition, a catalyst, a photoactive agent, an indicator, a dye, and an UV adsorbent, or a mixture thereof.

In one particular example, the second active substance can be an antibacterial agent. Suitable examples of antibacterial agents include, but are not limited to, acedapsone; acetosulfone sodium; alamecin; alexidine; amdinocillin; amdinocillin pivoxil; amicycline; amifloxacin; amifloxacin mesylate; amikacin; amikacin sulfate; aminosalicylic acid; aminosalicylate sodium; amoxicillin; amphomycin; ampicillin; ampicillin sodium; apalcillin sodium; apramycin; aspartocin; astromicin sulfate; avilamycin; avoparcin; azithromycin; azlocillin; azlocillin sodium; bacampicillin HCl; bacitracin; bacitracin methylene disalicylate; bacitracin zinc; bambermycins; benzoylpas calcium; berythromycin; betamicin sulfate; biapenem; biniramycin; biphenamine HCl; bispyrithione magsulfex; butikacin; butirosin sulfate; capreomycin sulfate; carbadox; carbenicillin disodium; carbenicillin indanyl sodium; carbenicillin phenyl sodium; carbenicillin potassium; carumonam sodium; cefaclor; cefadroxil; cefamandole; cefamandole nafate; cefamandole sodium; cefaparole; cefatrizine; cefazaflur sodium; cefazolin; cefazolin sodium; cefbuperazone; cefdinir; cefepime; cefepime HCl; cefetecol; cefixime; cefmenoxime HCl; cefinetazole; cenetazole sodium; cefonicid monosodium; cefonicid sodium; cefoperazone sodium; ceforanide; cefotaxime sodium; cefotetan; cefotetan disodium; cefotiam HCl; cefoxitin; cefoxitin sodium; cefpimizole; cefpimizole sodium; cefpiramide; cefpiramide sodium; cefpirome sulfate; cefpodoxime proxetil; cefprozil; cefroxadine; cefsulodin sodium; ceftazidime; ceftibuten; ceftizoxime sodium; ceftriaxone sodium; cefuroxime; cefuroxime axetil; cefuroxime pivoxetil; cefuroxime sodium; cephacetrile sodium; cephalexin; cephalexin HCl; cephaloglycin; cephaloridine; cephalothin sodium; cephapirin sodium; cephradine; cetocycline HCl; cetophenicol; chloramphenicol; chloramphenicol palmitate; chloramphenicol pantothenate complex; chloramphenicol sodium succinate; chlorhexidine phosphanilate; chloroxylenol; chlortetracycline bisulfate; chlortetracycline HCl; cinoxacin; ciprofloxacin; ciprofloxacin HCl; cirolemycin; clarithromycin; clinafloxacin HCl; clindamycin; clindamycin HCl; clindamycin palmitate HCl; clindamycin phosphate; clofazimine; cloxacillin benzathine; cloxacillin sodium; cloxyquin; colistimethate sodium; colistin sulfate; coumermycin; coumermycin sodium; cyclacillin; cycloserine; dalfopristin; dapsone; daptomycin; demeclocycline; demeclocycline HCl; demecycline; denofungin; diaveridine; dicloxacillin; dicloxacillin sodium; dihydrostreptomycin sulfate; dipyrithione; dirithromycin; doxycycline; doxycycline calcium; doxycycline fosfatex; doxycycline hyclate; droxacin sodium; enoxacin; epicillin; epitetracycline HCl; erythromycin; erythromycin acistrate; erythromycin estolate; erythromycin ethylsuccinate; erythromycin gluceptate; erythromycin lactobionate; erythromycin propionate; erythromycin stearate; ethambutol HCl; ethionamide; fleroxacin; floxacillin; fludalanine; flumequine; fosfomycin; fosfomycin tromethamine; fumoxicillin; furazolium chloride; furazolium tartrate; fusidate sodium; fusidic acid; gentamicin sulfate; gloximonam; gramicidin; haloprogin; hetacillin; hetacillin potassium; hexedine; ibafloxacin; imipenem; isoconazole; isepamicin; isoniazid; josamycin; kanamycin sulfate; kitasamycin; levofuraltadone; levopropylcillin potassium; lexithromycin; lincomycin; lincomycin HCl; lomefloxacin; lomefloxacin HCl; lomefloxacin mesylate; loracarbef; mafenide; meclocycline; meclocycline sulfosalicylate; megalomicin potassium phosphate; mequidox; meropenem; methacycline; methacycline HCl; methenamine; methenamine hippurate; methenamine mandelate; methicillin sodium; metioprim; metronidazole HCl; metronidazole phosphate; mezlocillin; mezlocillin sodium; minocycline; minocycline HCl; mirincamycin HCl; monensin; monensin sodiumr; nafcillin sodium; nalidixate sodium; nalidixic acid; natainycin; nebramycin; neomycin palmitate; neomycin sulfate; neomycin undecylenate; netilmicin sulfate; neutramycin; nifuiradene; nifuraldezone; nifuratel; nifuratrone; nifurdazil; nifurimide; nifiupirinol; nifurquinazol; nifurthiazole; nitrocycline; nitrofurantoin; nitromide; norfloxacin; novobiocin sodium; ofloxacin; onnetoprim; oxacillin sodium; oximonam; oximonam sodium; oxolinic acid; oxytetracycline; oxytetracycline calcium; oxytetracycline HCl; paldimycin; parachlorophenol; paulomycin; pefloxacin; pefloxacin mesylate; penamecillin; penicillin g benzathine; penicillin g potassium; penicillin g procaine; penicillin g sodium; penicillin v; penicillin v benzathine; penicillin v hydrabamine; penicillin v potassium; pentizidone sodium; phenyl aminosalicylate; piperacillin sodium; pirbenicillin sodium; piridicillin sodium; pirlimycin HCl; pivampicillin HCl; pivampicillin pamoate; pivampicillin probenate; polymyxin b sulfate; porfiromycin; propikacin; pyrazinamide; pyrithione zinc; quindecamine acetate; quinupristin; racephenicol; ramoplanin; ranimycin; relomycin; repromicin; rifabutin; rifametane; rifamexil; rifamide; rifampin; rifapentine; rifaximin; rolitetracycline; rolitetracycline nitrate; rosaramicin; rosaramicin butyrate; rosaramicin propionate; rosaramicin sodium phosphate; rosaramicin stearate; rosoxacin; roxarsone; roxithromycin; sancycline; sanfetrinem sodium; sarmoxicillin; sarpicillin; scopafungin; sisomicin; sisomicin sulfate; sparfloxacin; spectinomycin HCl; spiramycin; stallimycin HCl; steffimycin; streptomycin sulfate; streptonicozid; sulfabenz; sulfabenzamide; sulfacetamide; sulfacetamide sodium; sulfacytine; sulfadiazine; sulfadiazine sodium; sulfadoxine; sulfalene; sulfamerazine; sulfameter; sulfamethazine; sulfamethizole; sulfamethoxazole; sulfamonomethoxine; sulfamoxole; sulfanilate zinc; sulfanitran; sulfasalazine; sulfasomizole; sulfathiazole; sulfazamet; sulfisoxazole; sulfisoxazole acetyl; sulfisboxazole diolamine; sulfomyxin; sulopenem; sultamricillin; suncillin sodium; talampicillin HCl; teicoplanin; temafloxacin HCl; temocillin; tetracycline; tetracycline HCl; tetracycline phosphate complex; tetroxoprim; thiamphenicol; thiphencillin potassium; ticarcillin cresyl sodium; ticarcillin disodium; ticarcillin monosodium; ticlatone; tiodonium chloride; tobramycin; tobramycin sulfate; tosufloxacin; trimethoprim; trimethoprim sulfate; trisulfapyrimidines; troleandomycin; trospectomycin sulfate; tyrothricin; vancomycin; vancomycin HCl; virginiamycin; zorbamycin.

In another particular example, the second active substance can be an antiviral agent. Suitable examples of antiviral agents include, but are not limited to, acemannan; acyclovir; acyclovir sodium; adefovir; alovudine; alvircept sudotox; amantadine HCl; aranotin; arildone; atevirdine mesylate; avridine; cidofovir; cipamfylline; cytarabine HCl; delavirdine mesylate; desciclovir; didanosine; disoxaril; edoxudine; enviradene; enviroxime; famciclovir; famotine HCl; fiacitabine; fialuridine; fosarilate; foscarnet sodium; fosfonet sodium; ganciclovir; ganciclovir sodium; idoxuridine; kethoxal; lamivudine; lobucavir; memotine HCl; methisazone; nevirapine; penciclovir; pirodavir; ribavirin; rimantadine HCl; saquinavir mesylate; somantadine HCl; sorivudine; statolon; stavudine; tilorone HCl; trifluridine; valacyclovir HCl; vidarabine; vidarabine phosphate; vidarabine sodium phosphate; viroxime; zalcitabine; zidovudine; zinviroxime.

In another particular example, the second active substance can be a cardiovascular therapeutic. Suitable examples of cardiovascular therapeutics include, but are not limited to, nifedipine, lovastatin, diltiazem, clonidine HCl, verapamil HCl, isradipine, propanolol, propanolol HCl fluvastatin sodium, nitroglycerin, nicotinic acid, felodipine, propafenone HCl metoprolol, and avorvastatin (LLPITOR™).

In still another particular example, the second active substance can be an anti-cancer therapeutic. Suitable examples of anti-cancer therapeutics include, but are not limited to, cytarabine liposome, poliferprosan 20, carmustine, luprolide acetate, morphine sulphate, octreotide acetate, ondansetron, and goserelin acetate.

In a further particular example, the second active substance can be a central nervous system (CNS) therapeutic. Suitable examples of CNS therapeutics include, but are not limited to, dextroamphetamine sulphate, dextroamphetamine saccharate, amphetamine aspartate monohydrate, amphetamine sulphate, methylphenidate HCl, pemoline, duloxetine HCl venlafaxine HCl, lamotrigine, orphenadrine citrate, hyoscyamine sulphate, paroxetine HCl, promethazine HCl, mirtazapine, carbidopa, levodopa, carbamazepine, chlorpromazine, bupropion HCl, and olanzapine.

In a further particular example, the second active substance can be a hypoglycemic agent. Suitable examples of hypoglycemic agents include, but are not limited to, metformin HCl, metformin, and glipizide.

In yet a further particular example, the second active substance can be a fertility/contraception or woman's health therapeutic. Suitable examples of fertility/contraception or woman's health therapeutics include, but are not limited to, estradiol, levonorgestrel, 17β-estradiol, norethindrone acetate, medroxyprogesterone acetate, estradiol cypionate, calcitonin-salmon, etonogestrel, and ethinyl estradiol.

In a further particular example, the second active substance can be an infectious disease therapeutic. Suitable examples of infectious disease therapeutics include, but are not limited to, amoxicillin, clavulanate potassium, clarithromycin, ciprofloxacin, erythromycin, thiabendazole, mebendazole, doxycycline hyclate, didanosine, and ribavirin.

In a further particular example, the second active substance can be a pulmonary disease therapeutic. Suitable examples of pulmonary disease therapeutics include, but are not limited to, albuterol, albuterol sulphate, fluticasone propionate, salmeterol, flunisolide, fexofenadine HCl metaproterenol sulphate, ipratropium bromide, triamcinolone acetonide, loratidine, pseudoephedrine sulphate, chlorpheniramine, formoterol fumarate, pirbuterol acetate, hyscyamine sulphate, budesonide, dornase-α, beclomethasone dipropionate, salmeterol xinafoate, montelukast sodium, tiotropium bromide, tobramycin, pancrelipase, levalbuterol, cetirizine HCl, and guaifenesin.

In still other particular examples, the second active substance can be a chemically or biologically specific neutralizing agent. For example, agents that can react with, scavenge, and/or neutralize chemical agents such as nerve gas or superoxide radicals are suitable. An example of such a neutralizing agent is a polyoxometallate, superoxide dismutase, ascorbic acid, and gluathione. Also agents that can deactivate biological agents (e.g., anthrax) can be used.

In further examples, the second active substance can be a biomolecule. Examples of biomolecules include, but are not limited to, a small molecule (e.g., a ligand, a drug, a lipid, a carbohydrate, a steroid, a hormone, a vitamin, etc.), a nucleic acid (e.g., an oligonucleotide, DNA, RNA, a primer, a probe, a ribozyme, etc.), a peptide, a protein, an enzyme (e.g., a kinase, a phosphatase, a methylating agent, a protease, a transcriptase, an endonuclease, a ligase, etc.), or an antibody and/or fragment thereof. "Small molecule" as used herein, is meant to refer to a composition, which has a molecular weight of less than about 5 kD, for example, less than about 4 kD. Small molecules can be nucleic acids (e.g., DNA, RNA), peptides, polypeptides, peptidomimetics, carbohydrates, lipids, factors, cofactors, hormones, vitamins, steroids, trace elements, pharmaceutical drugs, or other organic (carbon containing) or inorganic molecules.

A cellulose/active substance composite where the second active substance is an antibody can be used, for example, as a filter for isolating specific antigens. Thus, in one instance, the second active substance can comprise an antibody or fragment thereof. The term "antibody" is used herein in a broad sense and includes both polyclonal and monoclonal antibodies. In addition to intact immunoglobulin molecules, also included in the term "antibody" are fragments of immunoglobulin molecules and multimers of immunoglobulin molecules (e.g., diabodies, triabodies, and bi-specific and tri-specific antibodies, as are known in the art; see, e.g., Hudson and Kortt, *J Immunol Methods* 1999, 231:177-189), fusion proteins containing an antibody or antibody fragment, which are produced using standard molecular biology techniques, single chain antibodies, and human or humanized versions of immunoglobulin molecules or fragments thereof.

Antibodies useful in the disclosed composites can be purchased from commercial sources, such as Chemicon International (Temecula, Calif.). Antibodies can also be generated using well-known methods (see Harlow and Lane. *Antibodies, A Laboratory Manual*, Cold Spring Harbor Publications, New York, 1988). The skilled artisan will understand that either full-length antigens or fragments thereof can be used to generate the antibodies suitable for use in the disclosed composites. A polypeptide to be used for generating a suitable antibody can be partially or fully purified from a natural source, or can be produced using recombinant DNA techniques. For example, for antigens that are peptides or polypeptides, a cDNA encoding an antigen, or a fragment thereof, can be expressed in prokaryotic cells (e.g., bacteria) or eukaryotic cells (e.g., yeast, insect, or mammalian cells), after which the recombinant protein can be purified and used to generate a monoclonal or polyclonal antibody preparation that specifically binds the targeted antigen.

One of skill in the art will know how to choose an antigenic peptide for the generation of monoclonal or polyclonal antibodies that specifically bind the appropriate antigens. Antigenic peptides for use in generating the antibodies of the disclosed conjugates and methods are chosen from non-helical regions of the protein that are hydrophilic. The Predict-Protein Server or an analogous program can be used to select antigenic peptides to generate the antibodies of the disclosed conjugates and methods. In one example, a peptide of about fifteen amino acids can be chosen and a peptide-antibody package can be obtained from a commercial source such as AnaSpec, Inc. (San Jose, Calif.). One of skill in the art will know that the generation of two or more different sets of monoclonal or polyclonal antibodies maximizes the likelihood of obtaining an antibody with the specificity and affinity required for its intended use. The antibodies can be tested for their desired activity by known methods (e.g., but not limited to, ELISA and/or immunocytochemistry). For additional guidance regarding the generation and testing of antibodies, see e.g., Harlow and Lane, Antibodies: *A Laboratory Manual*, Cold Spring Harbor Laboratory Press, Cold Spring Harbor, N.Y., 1988, which is incorporated by reference herein at least for methods of making antibodies.

In other aspects, the second active substance can be a nucleic acid based compound. Thus, as used herein, "nucleic acid" means a molecule made up of, for example, nucleotides, nucleotide analogs, or nucleotide substitutes. Non-limiting examples of these and other molecules are discussed herein. A nucleic acid can be double stranded or single stranded. Nucleic acid is also meant to include oliognucleotides. Any nucleic acid molecule that can be bonded to the linker, and thus the first active substance and regenerated cellulose can be used herein.

The term "nucleotide" means a molecule that contains a base moiety, a sugar moiety and a phosphate moiety. Nucleotides can be linked together through their phosphate moieties and sugar moieties creating an internucleoside linkage. The base moiety of a nucleotide can be adenine-9-yl (A), cytosine-1-yl (C), guanine-9-yl (G), uracil-1-yl (U), and thymin-1-yl (T). The sugar moiety of a nucleotide is a ribose or a deoxyribose. The phosphate moiety of a nucleotide is pentavalent phosphate. A non-limiting example of a nucleotide would be 3'-AMP (3'-adenosine monophosphate) or 5'-GMP (5'-guanosine monophosphate). "Nucleotide analog," as used herein, is a nucleotide which contains some type of modification to either the base, sugar, or phosphate moieties. Modifications to nucleotides are well known in the art and would include for example, 5-methylcytosine (5-me-C), 5-hydroxymethyl cytosine, xanthine, hypoxanthine, and 2-aminoadenine as well as modifications at the sugar or phosphate moieties. "Nucleotide substitutes," as used herein, are molecules having similar functional properties to nucleotides, but which do not contain a phosphate moiety, such as peptide nucleic acid (PNA). Nucleotide substitutes are molecules that will recognize nucleic acids in a Watson-Crick or Hoogsteen manner, but which are linked together through a moiety other than a phosphate moiety. Nucleotide substitutes are able to conform to a double helix type structure when interacting with the appropriate target nucleic acid.

It is also possible to link other types of molecules to nucleotides or nucleotide analogs to make conjugates. Conjugates can be chemically linked to the nucleotide or nucleotide analogs. Such conjugates include but are not limited to lipid moieties such as a cholesterol moiety (Letsinger et al., *Proc Natl Acad Sci USA* 1989, 86:6553-6, which is incorporated by reference herein at least for its teachings of nucleic acid conjugates). As used herein, the term nucleic acid includes such conjugates, analogs, and variants of nucleic acids.

Nucleic acids, such as those described herein, can be made using standard chemical synthetic methods or can be produced using enzymatic methods or any other known method. Such methods can range from standard enzymatic digestion followed by nucleotide fragment isolation (see for example, Sambrook et al., *Molecular Cloning: A Laboratory Manual*, 3d Edition (Cold Spring Harbor Laboratory Press, Cold Spring Harbor, N.Y., 2001, Chapters 5, 6) to purely synthetic methods, for example, by the cyanoethyl phosphoramidite method using a Milligen or Beckman System 1Plus DNA synthesizer (for example, Model 8700 automated synthesizer of Milligen-Biosearch, Burlington, Mass. or ABI Model 380B). Synthetic methods useful for making oligonucleotides are also described by Ikuta et al., *Ann Rev Biochem*

1984, 53:323-56 (phosphotriester and phosphite-triester methods), and Narang, et al., *Methods Enzymol* 1980, 65:610-20 (phosphotriester method). Protein nucleic acid molecules can be made using known methods such as those described by Nielsen et al., *Bioconjug Chem.* 1994, 5:3-7. (Each of these references is incorporated by reference herein at least for their teachings of nucleic acid synthesis.)

"Aptamers" are nucleic acid molecules that can interact with a target molecule. These are also suitable for use as the second active substance. Typically aptamers are small nucleic acids ranging from 15-50 bases in length that fold into defined secondary and tertiary structures, such as stem-loops or G-quartets. Aptamers can bind small molecules, such as ATP (U.S. Pat. No. 5,631,146) and theophiline (U.S. Pat. No. 5,580,737), as well as large molecules, such as reverse transcriptase (U.S. Pat. No. 5,786,462) and thrombin (U.S. Pat. No. 5,543,293). Representative examples of how to make and use aptamers to bind a variety of different target molecules can be found in the following non-limiting list of U.S. Pat. Nos. 5,476,766, 5,503,978, 5,631,146, 5,731,424, 5,780,228, 5,792,613, 5,795,721, 5,846,713, 5,858,660, 5,861,254, 5,864,026, 5,869,641, 5,958,691, 6,001,988, 6,011,020, 6,013,443, 6,020,130, 6,028,186, 6,030,776, and 6,051,698, which are incorporated by reference herein for at least their teachings of aptamers.

Further nucleic acid molecules include "ribozymes," which are nucleic acid molecules that are capable of catalyzing a chemical reaction, either intramolecularly or intermolecularly. Ribozymes are thus catalytic nucleic acids. There are a number of different types of ribozymes that catalyze nuclease or nucleic acid polymerase type reactions which are based on ribozymes found in natural systems, such as hammerhead ribozymes, (for example, but not limited to the following U.S. Pat. Nos. 5,334,711, 5,436,330, 5,616,466, 5,633,133, 5,646,020, 5,652,094, 5,712,384, 5,770,715, 5,856,463, 5,861,288, 5,891,683, 5,891,684, 5,985,621, 5,989,908, 5,998,193, 5,998,203, WO 9858058 by Ludwig and Sproat, WO 9858057 by Ludwig and Sproat, and WO 9718312 by Ludwig and Sproat) hairpin ribozymes (for example, but not limited to the following U.S. Pat. Nos. 5,631,115, 5,646,031, 5,683,902, 5,712,384, 5,856,188, 5,866,701, 5,869,339, and 6,022,962), and tetrahymena ribozymes (for example, but not limited to the following U.S. Pat. Nos. 5,595,873 and 5,652,107). There are also a number of ribozymes that are not found in natural systems, but which have been engineered to catalyze specific reactions de novo (for example, but not limited to the following U.S. Pat. Nos. 5,580,967, 5,688,670, 5,807,718, and 5,910,408). Ribozymes typically cleave nucleic acid substrates through recognition and binding of the target substrate with subsequent cleavage. This recognition is often based mostly on canonical or non-canonical base pair interactions. This property makes ribozymes particularly good candidates for target specific cleavage of nucleic acids because recognition of the target substrate is based on the target substrates sequence. Representative examples of how to make and use ribozymes to catalyze a variety of different reactions can be found in the following non-limiting list of U.S. Pat. Nos. 5,646,042, 5,693,535, 5,731,295, 5,811,300, 5,837,855, 5,869,253, 5,877,021, 5,877,022, 5,972,699, 5,972,704, 5,989,906, and 6,017,756. These patents are all incorporated by reference herein at least for their teachings of ribozymes.

In still further examples, the second active substance can be a thermoplastic. When a thermoplastic is coupled directly or via a linker to the first active substance, which is substantially homogeneously distributed in regenerated cellulose, these result is a natural fiber reinforced thermoplastic composites.

In recent years, interests in natural fiber reinforced thermoplastic composites have grown in several industries due to their renewable character, acceptable specific strength, low costs, enhanced energy recovery, and biodegradability. But the challenge stems from the inherent differences in the source of the two major components in these bio-based thermoplastic composites. On the one hand, cellulose is from the carbohydrate family with glucose as the major building block, while polypropylenes are from petroleum products in which the building blocks are based in olefins of hydrocarbons. Glucose is hydrophilic whereas polyolefins are composed of only carbon and hydrogen and are hydrophobic in nature. This arises in an incompatibility. Further, processing of virgin cellulose has been hindered because cellulose cannot be melt processed, and it is not soluble in usual solvents due to cellulose's extensive hydrogen bonding and crystalline structure. These obstacles are overcome in the composites disclosed herein. Here, pulp based cellulose films can be processed with various polymeric and branched amines and alcohols concentrations through an ionic liquid route. These regenerated cellulose composites can be used for manufacturing cellulose polypropylene laminated composites. The effects of polymeric and branched amines and alcohol concentrations is observed in the increase in stress transfer between the cellulose fibers and the polypropylene matrix. Stress transfer is the ability of the fiber to add mechanical strength to the fibers and films by absorbing the stress placed on the thermoplastic compound. The efficiency in which this stress is transferred is crucial to the performance of the plastic.

Some specific examples of thermoplastic polymers that are suitable second active substances include, but are not limited to, polyethylene, polypropylene, polyethylene-propylene copolymers, polyethylene-vinyl acetate copolymers, polyethylene-vinyl alcohol copolymers, polytetrafluoroethylene, polylactic acid, polylactic acid-glycolic acid copolymers, polylactic acid-succinic acid copolymers, polyanhydrides, polyvinyl chloride, polystyrene, polyterephthalate, polymethacrylate, polymethylmethacrylate, or mixtures thereof.

In another example the second active substance can be a wetting agent. A wetting agent is a subcategory of the chemical class of surfactants, which are chemicals that cause a physical change at the surface of liquids. These changes can take place at the interface between two liquids, between a liquid and a gas, or between a liquid and a solid. A common characteristic of surfactants is a water-soluble, hydrophilic, group attached to a long, oil-soluble (lipophilic) hydrocarbon chain, where these two groups can be linked together by an intervening group. Some specific examples of wetting agents that can be suitable second active substances in the disclosed composites include, but are not limited to, oleyl alcohol ($CH_3(CH_2)_7CH=CH(CH_2)_7CH_2OH$) and cetyl alcohol ($CH_3(CH_2)_{14}CH_2OH$). The purpose of a wetting agent is to overcome water repellence in soils, where sandy soils, soils high in organic matter, and potting mixes are the most likely to become hydrophobic. These wetting agents help to overcome the effects of waxy organic coatings on the surface of the soil and the surface of organic matter, thus allowing the water to penetrate and be absorbed. They reduce the surface tension of the water and allow it to wet the waxy surface of the soil particles, which allows the water to move into the soil through the pores. Therefore, these wetting agents have application in not only soil wetting, but also herbicides, fungicides, and fertilizers, where the wetting agent is used to spread out over the leaf blade of the plant and increase the absorption of the pesticides by the leaf tissue. As such, disclosed herein are methods of treating a soil and/or plant by contacting the soil and/or plant with the composites disclosed herein.

But soil wetting agents have problems with longevity, as they can be easily washed away by rain or other liquids. Therefore, these products must be reapplied several times to achieve the desired effect. By attaching the wetting agent to the cellulose bead, it is possible to achieve a slow delivery effect of the wetting agent over a longer period of time. This would be cost effective and time saving for both agriculture and horticulture industries. Demand for surfactants, finishing agents, and assistants were estimated to be $31.2 billion in 2006 and are expected to grow to over $38 billion in 2011 (Parker, The 2006-2011 World Outlook for Surfactants, Finishing Agents, and Assistants, Icon Group International). The majority of the demand (86.72%) is comprised of the following nations: Asia & Middle East, North America and the Caribbean, and Europe.

In yet another example, the second active substance can comprise an ionic species which can form an ionic liquid with a third active species that is complementary charged. In other words, the second active substance can be a cation that forms an ionic liquid when combined with an appropriate anionic third active species. Alternatively, the second active substance can be an anion that forms an ionic liquid when combined with a cationic third active species. It is preferred that these second active substances have a therapeutic property in addition to their ability to form an ionic liquid. Further, it is also preferred that the counterion of the second active substance (i.e., the third active species) also has a therapeutic property. Examples of such second and third active substances are organic molecules that contain a cationic nitrogen (e.g., quaternary ammonium compounds). Anionic examples are organic molecules that contain hydroxyl, thiol, and carboxylate moieties. Further examples of ionic liquid forming compounds that have therapeutic activity are disclosed in US application Ser. No. 11/545,938, which is incorporated by reference herein in its entirety.

The ionic liquid forming second active substances can be attached to the regenerated cellulose/first active substance compositions as a method to control drug delivery. In this way sensitive drugs, such as the β-lactam drugs can be administered orally. Successive generation β-lactam drugs have been developed to address the problem of antibacterial resistance but have been associated with problems related to lackluster bioavailability, chemical instability and unwanted side effects.

In several examples, one ion of the second or third, ionic liquid forming, active substances can have antibacterial properties and it can be attached to the cellulose. The corresponding counterion can comprise a drug used to combat a particular side effect (e.g., diarrhea) or increases the bioavailability of the antibacterial agent (e.g., a fatty acid).

Linker

The linker component of the disclosed cellulose/active substance composites can be any compound that can form a bond to the first and second active substances, linking them together. Also, the linker can be any compound that forms a bond between the first active substance and itself, i.e., a crosslinker. After reacting with the first active substance, residual though still reactive crosslinker can be used to link the first active substance to the second active substance and/or to the cellulose. Thus a linker typically contains at least two functional groups, e.g., one functional group that can be used to form a bond with the first active substance and another functional group that can be used to form a bond with another part of the first active substance (as in a crosslinker), the second active substance, and/or the cellulose. Typically, though not necessarily, the functional group on the linker that is used to form a bond with the first active substance is at one end of the linker and the functional group that is used to form a bond with another part of the first active substance, the second active substance, and/or the cellulose is at the other end of the linker.

In some aspects, the linker can comprise nucleophilic functional groups that can react with electrophilic functional groups on the first and/or second active substances and/or cellulose, forming a bond. Alternatively, the linker can comprise electrophilic functional groups that can react with nucleophilic functional groups on the first and/or second active substances and/or cellulose, forming a bond. Still further, the linker can comprise nucleophilic and electrophilic functional groups that can react with electrophilic and nucleophilic functional groups on the first and/or second active substances and/or cellulose, forming a bond. The various arrangements are illustrated in the following table.

| Functional Group on the First Active Substance | Functional Groups on the Linker | Functional Groups on the Second Active Substance |
|---|---|---|
| Nucleophilic | Electrophilic and Electrophilic | Nucleophilic |
| Nucleophilic | Electrophilic and Nucleophilic | Electrophilic |
| Electrophilic | Nucleophilic and Electrophilic | Nucleophilic |
| Electrophilic | Nucleophilic and Nucleophilic | Electrophilic |

While the disclosed first and second active substances can be attached to each other directly, the use of a linker, as is described herein, can allow more distance (and thus more freedom to move) between the second active substance and the first active substance embedded in the regenerated cellulose. When the first active substance is crosslinked with a linker and/or linked to the cellulose, the first active substance can be prevented from leaching out of the cellulose. These attachments can be via covalent bonds by reaction methods known in the art. When the first and/or second active substances and/or cellulose are attached via the linker, the first active substance can be first coupled to the linker, which is then attached to the second active substance and/or cellulose. Alternatively, the linker can be first coupled to the second active substance and/or cellulose and then be attached to the first active substance.

The linker can be of varying lengths, such as from 1 to 20 atoms in length. For example, the linker can be from 1, 2, 3, 4, 5, 6, 7, 8, 9, 10, 11, 12, 13, 14, 15, 16, 17, 18, 19, or 20 atoms in length, where any of the stated values can form an upper and/or lower end point where appropriate. As noted, the longer the linker, the greater freedom of movement the second active substance can have. Further, the linker can be substituted or unsubstituted. When substituted, the linker can contain substituents attached to the backbone of the linker or substituents embedded in the backbone of the linker. For example, an amine substituted linker can contain an amine group attached to the backbone of the linker or a nitrogen in the backbone of the linker. Suitable moieties for the linker include, but are not limited to, substituted or unsubstituted, branched or unbranched, alkyl, alkenyl, or alkynyl groups, ethers, esters, polyethers, polyesters, polyalkylenes, polyamines, heteroatom substituted alkyl, alkenyl, or alkynyl groups, cycloalkyl groups, cycloalkenyl groups, heterocycloalkyl groups, heterocycloalkenyl groups, and the like, and derivatives thereof In one aspect, the linker can comprise a $C_1$-$C_6$ branched or straight-chain alkyl, such as methyl, ethyl, n-propyl, iso-propyl, n-butyl, iso-butyl, sec-butyl, tert-butyl, n-pentyl, iso-pentyl, neopentyl, or hexyl. In a specific example, the linker can comprise —(CH$_2$)$_n$—, wherein n is from 1 to 5. In another aspect, the linker can comprise a C$_1$-C$_6$ branched or straight-chain alkoxy such as a methoxy, ethoxy, n-propoxy, iso-propoxy, n-butoxy, iso-butoxy, sec-butoxy, tert-butoxy, n-pent oxy, iso-pentoxy, neopentoxy, or hexoxy.

In still another aspect, the linker can comprise a C$_2$-C$_6$ branched or straight-chain alkyl, wherein one or more of the carbon atoms is substituted with oxygen (e.g., an ether) or an amino group. For example, suitable linkers can include, but are not limited to, a methoxymethyl, methoxyethyl, methoxypropyl, methoxybutyl, ethoxymethyl, ethoxyethyl, ethoxypropyl, propoxymethyl, propoxyethyl, methylaminomethyl, methylaminoethyl, methylaminopropyl, methylaminobutyl, ethylaminomethyl, ethylaminoethyl, ethylaminopropyl, propylaminomethyl, propylaminoethyl, methoxymethoxymethyl, ethoxymethoxymethyl, methoxyethoxymethyl, methoxymethoxyethyl, and the like, and derivatives thereof. In one specific example, the linker can comprise a methoxymethyl (i.e., —CH$_2$—O—CH$_2$—).

The reaction between the linker moiety and the first active substance results in crosslinks that link one part of the first active substance to another. This can result in a polymer complex. The reaction between the linker moiety and the first and second active substances results in a chemical bond that links the second active substance to the first active substance. As noted previously, such reactions can occur as a result of a direct nucleophilic or electrophilic interaction between the linker and the first and/or second active substance. For example, a linker comprising a nucleophilic functional group can directly react with an electrophilic substituent on a first and/or second active substance and form a bond that links the linker to the active substance. Alternatively, an electrophilic substituent on the linker can directly react with a nucleophilic functional group on a first and/or second active substance and form a bond that links the linker to the active substance. Also, the first and/or second active substance can be covalently attached to the linker by an indirect interaction where a reagent initiates, mediates, or facilitates the reaction between the linker and the active substance. For example, the bond-forming reaction between the linker and a first and/or second active substance can be facilitated by the use of a coupling reagent (e.g., carbodiimides, which are used in carbodiimide-mediated couplings) or enzymes (e.g., glutamine transferase).

Suitable linkers are readily commercially available and/or can be synthesized by those of ordinary skill in the art. And the particular linker that can be used in the disclosed composites can be chosen by one of ordinary skill in the art based on factors such as cost, convenience, availability, compatibility with various reaction conditions, the type of first and/or second active substance with which the linker is to interact, and the like.

It is often said herein that a linker comprises a particular moiety "prior to crosslinking the first active substance." This means that the linker contains a particular reactive group that can react with a reactive group on the first active substance to form a bond, crosslinking the first active substance. It is understood that the resulting crosslinked first active substance will thus contain bonds form by such a reaction. It is also understood that the reaction may be incomplete, which results in some residual reactive groups on the linker and/or first active substance. These remaining reactive groups can be used in further reactions to link the first active substance to the regenerated cellulose and/or second active substance.

Electrophilic Linkers and Nucleophilic Active Substances

An active substance can be coupled to a linker that can directly or indirectly react with a nucleophilic substituent on the active substance and form a chemical bond. Examples of such nucleophilic substituents that can react with and form a bond to an electrophilic linker include, but are not limited to, proteins, peptides, or receptors that possess amino acid residues with a nucleophilic or potentially nucleophilic amine, carboxylate or carboxylic acid, alcohol, or thiol functional group (e.g., cysteine, serine, threonine, tryptophan, tyrosine, aspartic acid, glutamic acid, glutamine, arginine, histidine, and lysine). Other examples of nucleophilic substituents include, but are not limited to, carbohydrates, polysaccharides, lipids, saturated and unsaturated fatty acids, sphingolipids, or cholesterols that possess a nucleophilic or potentially nucleophilic amine, carboxylate, alcohol, or thiol functional group. These and other examples are disclosed herein.

Further, it is contemplated that more than one type of nucleophilic substituent can be present on an active substance and, as such, they can be selectively reacted with the linker. For example, a peptide active substance with both nucleophilic amine and carboxylate functional groups can be treated with alkylating agents to block the amine functional groups and leave the carboxylate groups available to react with the linker. Conversely, by controlling the reaction conditions (e.g., temperature and concentration) the more reactive amine group can be selectively reacted with the linker moiety and leave the less reactive carboxylate groups mostly unreacted.

When the active substance to be attached to the linker comprises nucleophilic substituents such as those listed above the linker can comprise an electrophilic or potentially electrophilic functional group. Examples of such electrophilic functional groups on a linker include, but are not limited to, aldehydes, acyl derivatives (e.g., acyl azides, acyl nitriles), esters and activated esters (e.g., succinimidyl esters, sulfosuccinimidyl esters), anhydrides, epoxides, and mixed anhydrides, derivatized carboxylic acids and carboxylates, imines, isocyanates, isothiocyanates, sulfonyl chlorides, organo-halides, and maleimides. These moieties are well known in the art of organic chemistry.

Some specific examples of suitable electrophilic linkers include paraformaldehyde, dialdehydes, and diesters. Examples of suitable dialdehydes include, but are not limited to, gluteraldehyde, glyoxal, methylglyoxal, glyoxic acid, dimethyl-glyoxal, malonic dialdehyde, succinic dialdehyde, adipic dialdehyde, 2-hydroxyadipic dialdehyde, pimelic dialdehyde, suberic dialdehyde, azelaic dialdehyde, sebacic dialdehyde, maleic aldehyde, fumaric aldehyde, 1,3-benzenedialdehyde, phthalaldehyde, isophthalaldehyde, terephthalaldehyde, 1,4-diformylcyclohexane, and the like. Equivalents of dialaldehydes that can be used instead of a dialdehyde include, 2,5-dialkoxytetrahydrofurans, 1,4-dialdehyde monoacetals, 1,4-dialdehyde diacetals. Examples of diesters include, but are not limited to, dialkyl oxylate, dialkyl fumarate, dialkyl malonate, dialkyl succinate, dialkyl adipate, dialkyl azelates, dialkyl suberate, dialkyl sebacate, dialkyl terephthalate, dialkylisophthalate, dialkylphthalate, and the like. Examples of diones include heptane-2,6-dione, hexane-2,5-dione, pentane-2,4-dione, and the like. Examples of diisocyanates include, but are not limited to, 1,3-phenyl-diisocyanate, 1,4-phenyldiisocyanate, 1,4-cyclohexyldiisocyanate, toluene diisocyanate, 1,6-hexane-diisocyanate, and the like.

A still further example of a suitable linker is epichlorohydrin.

Also, when a linker is not generally reactive it can be converted into a more reactive linker. For example, linkers that contain carboxylate or carboxylic acid groups can, depending on the conditions, be slow to react with a nucleophilic substituent on an active substance. However, these linkers can be converted into more reactive, activated esters by a carbodiimide coupling with a suitable alcohol, e.g., 4-sulfo-2,3,5,6-tetrafluorophenol, N-hydroxysuccinimide or N-hydroxysulfosuccinimide. This results in a more reactive, water-soluble activated ester linking moiety. Various other activating reagents that can be used for the coupling reaction include, but are not limited to, 1-ethyl-3-(3-dimethylaminopropyl) carbodiimide (EDC), dicyclohexylcarbodiimide (DCC), N,N'-diisopropyl-carbodiimide (DIP), benzotriazol-1-yl-oxy-tris-(dimethylamino)phosphonium hexa-fluorophosphate (BOP), hydroxybenzotriazole (HOBt), and N-methylmorpholine (NMM), including mixtures thereof).

When an active substance contains an amine functional group (e.g., a polymeric amine as disclosed herein) it can be particularly reactive toward linkers with electrophilic functional groups. Such amine containing active substances can react with the linker and form, for example, depending on the linker's functional groups, amine, amide, imines, imides, carboxamide, sulfonamide, urea, or thiourea bonds. When the nucleophilic functional group on the active substance contains a carboxylate, they can react with the linker and form, for example, depending on the linker's functional groups, esters, thioesters, carbonates, or mixed anhydrides. When the nucleophilic functional group on the active substance contains an alcohol or thiol, they can react with the linker's functional group and form, for example, esters, thioesters, ethers, sulfides, disulfides, carbonates, or urethanes.

The kinetics of such reactions depends on the reactivity and concentration of both the linker and the nucleophilic functional group on the first and second active substances. Also, significant factors affecting the reactivity of an active substance with an amine functional group are the amine's class and basicity. For example, many proteins have lysine residues, and most have a free amine at the N-terminus. Aliphatic amines, such as the amino group of lysine, are moderately basic and reactive with most electrophilic linkers. However, the concentration of the free base form of aliphatic amines below pH 8 is low; thus, the kinetics of a reaction between an aliphatic amine on an active substance and, for example, an isothiocyanates or succinimidyl ester linker moiety can be strongly pH dependent. While a pH of 8.5 to 9.5 is most efficient for attaching a linker with an electrophilic group to an active substance containing a lysine residue, there will be some reactivity at pH 7 to pH 8. In contrast, the amino group at the N-terminus of a proteinaceous active substance usually has a pKa of about 7, so it can sometimes be selectively modified by reaction at near neutral pH.

As noted above, the nucleophilic substituents on an active substance can react directly or indirectly with an electrophilic linker. For example, nucleophilic substituents can react with isocyanate linkers. Isocyanate linkers are readily derivable from acyl azide linkers, and they react with active substances that contain amine functional groups to form ureas, they react with active substances that contain alcohols to form urethanes, and they react with active substances that contain thiols to form thiourethanes.

Isothiocyanate linkers are an alternative to isocyanates and are moderately reactive but quite stable in water. Isothiocyanate linkers will react with an amine, alcohol, or thiol containing cell-surface substituents to form thioureas and thiourethanes.

Succinimidyl ester linkers can also react with active substances that contain amine, carboxylate, alcohol, or thiol functional groups. Succinimidyl ester linkers are particularly reactive towards amines, where the resulting amide bond that is formed is as stable as a peptide bond. However, some succinimidyl ester linkers may not be compatible with a specific application because they can be quite insoluble in aqueous solution. To overcome this limitation, sulfosuccinimidyl ester linkers, which typically have higher water solubility than succinimidyl ester linkers, can be used. Sulfosuccinimidyl ester linkers can generally be prepared in situ from simple carboxylic acid containing linker by dissolving the linker in an amine-free buffer that contains N-hydroxysulfosuccinimide and 1-ethyl-3-(3-dimethylaminopropyl)carbodiimide. Also, 4-sulfo-2,3,5,6-tetrafluorophenol (STP) ester linkers can be prepared from 4-sulfo-2,3,5,6-tetrafluorophenol in the same way as sulfosuccinimidyl ester linkers.

As noted above, carboxylic acid containing linkers can be converted into more highly reactive linkers. For example, a carboxylic acid containing linker can be converted into an activated ester or mixed anhydride, which can be used to modify less reactive aromatic amines and alcohol containing active substances.

Sulfonyl chloride containing linkers are highly reactive, but these reagents can be unstable in water, especially at the higher pH required for reaction with some aliphatic amines. Accordingly, attaching linkers with sulfonyl chloride groups to nucleophilic functional group on an active substance is best done at low temperatures. If the nucleophilic functional group of an active substance is an amine, the sulfonamide bond that is formed is extremely stable. Further, sulfonyl chloride containing linkers can also react with phenols (including tyrosine), aliphatic alcohols (including polysaccharides), thiols (such as cysteine) and imidazoles (such as histidine).

Aldehyde containing linkers can react with nucleophilic substituents that contain amines to form Schiff bases. For example, a first active substance that is a polyamine can react with a dialdehyde like glutaraldehyde. One aldehyde moiety of glutaraldehyde can form a bond with the polyamine and the other can be free to react with a nucleophilic second active substance. The coupling reactions between such aldehydes (or other acyl-containing moieties) and nucleophiles like amines can be facilitated by the use of a cyanoborohydride coupling buffer.

Organo-halide containing linkers contain a carbon atom bonded to a halide (e.g., fluorine, chlorine, bromine, or idodine). These moieties can react with active substances that contain amine, carboxylate, alcohol, or thiol functional group to form, for example, amine, ester, ether, or sulfide bonds.

Nucleophilic Linkers and Electrophilic Active Substances

In another example, the first and/or second active substance can be coupled to a linker that can react with an electrophilic functional group on the active substance and form a chemical bond. Examples of such electrophilic functional groups that can react with and form a bond to the linker include, but are not limited to, proteins, peptides, or receptors that possess an electrophilic or potentially electrophilic atom (e.g., a carbonyl carbon atom, such as those found in esters and activated esters (e.g., succinimidyl esters, sulfosuccinimidyl esters), aldehydes, acyl derivatives (e.g., acyl azides, acyl nitriles), anhydrides and mixed anhydrides, or carboxylates, the carbon atom in an imine, isocyanates, or isothiocyanates, or halogenated carbon atoms). Other examples of electrophilic substituents include, but are not limited to, carbohydrates, polysaccharides, lipids, saturated and unsaturated fatty acids, or cholesterols that possess an electrophilic or potentially electrophilic carbon atom such as those noted above.

Also, when an electrophilic functional group is not generally reactive they can be converted into more reactive electrophilic species. For example, active substances that contain carboxylate or carboxylic acid groups can, depending on the conditions, not be very reactive toward a linker comprising a nucleophilic group. However, these electrophilic substituents can be converted into more reactive, activated esters by a carbodiimide coupling with a suitable alcohol, e.g., 4-sulfo-2,3,5,6-tetrafluorophenol or N-hydroxysulfosuccinimide. This results in a more reactive, electrophilic activated ester functional group on the active substance.

When the linker is to be attached to an active substance with an electrophilic functional group, such as those discussed above, the linker is typically nucleophilic or potentially nucleophilic. Examples of suitable nucleophilic linkers include, but are not limited to, hydrazines, amines, alcohols, carboxylates, and thiols. These compounds are generally well known in the art of organic chemistry.

When the nucleophilic linker contains an amine functional group, it can be particularly reactive toward an active substance comprising an electrophilic functional group. Such amine containing linkers can react with the active substance and form, for example, depending on the electrophilic functional group on the active substance, amide, imides, imines, carboxamide, sulfonamide, urea, or thiourea bonds. When the nucleophilic linker contains a carboxylate, they can react with the active substance's electrophilic functional group and form, for example, esters, thioesters, carbonates, or mixed anhydrides. When the nucleophilic linker contains an alcohol or thiol, they can react with the active substance's electrophilic functional group and form, for example, depending on the substituent, esters, thioesters, ethers, sulfides, disulfides, carbonates, or urethanes.

As with the nucleophilic active substance and electrophilic linker interaction discussed above, the kinetics of the electrophilic functional group on an active substance and nucleophilic linker reactions depends on the reactivity and concentration of both the linker and the active substance. Suitable linkers with nucleophilic functional groups capable of reacting directly or indirectly with an electrophilic group on the active substance include, but are not limited to, diamines, diols, dithiols, $H_2N-(CH_2)_n-NH_2$, (where n is some integer, e.g., 2, 3, 4, 5, 6, 7, 8, 9, 10, 11, or 12), 2-pyridine disulfide, amino alcohols, amino thiols, compounds containing an alcohol and thiol, and the like.

Carbodiimide-Mediated Coupling

In yet another example, a carbodiimide-mediated coupling can be used to form a bond between the linker and the first and/or second active substance. For example, a linker with a hydrazine or amine group can be coupled to an active substance with carboxylate or carboxylic acid functional groups using water-soluble carbodiimides such as 1-ethyl-3-(3-dimethylaminopropyl)carbodiimide. Suitable linkers capable of carbodiimide-mediate coupling to carboxylate or carboxylic acid containing active substances are commercially available. Specific examples of such linkers include, but are not limited to, water soluble carbodiimides such as 1-ethyl-3-(3-dimethylaminopropyl)-carbodiimide HCl and 1-cyclohexyl-3-(2-morpholinoethyl)-carbodiimide-metho-p-toluene sulfonate, alcohol and water soluble N-ethyoxycarbonyl-2-ethoxy-1,2-dihydroquinoline, and organic soluble N,N'-dicyclohexylcarbodiimide.

In an alternative aspect involving a carbodiimide-mediated coupling, a linker with a carboxylate or carboxylic acid group can be coupled to a first and/or second active substance with amine functional groups using water-soluble carbodiimides such as 1-ethyl-3-(3-dimethylaminopropyl)-carbodiimide. Suitable linkers capable of carbodiimide-mediate coupling to amine containing first and/or active substance are commercially available.

Exemplary Combinations

In one example of the disclosed composites, the first active substance prior to bonding with the linker can have a nucleophilic functional group, the linker prior to bonding with the first and second active substance can have at least two electrophilic functional groups, and the second substance prior to bonding with the linker can have a nucleophilic functional group. In another example of the disclosed composites, the first active substance prior to bonding with the linker can have a nucleophilic functional group, the linker prior to bonding with the first and second active substance can have an electrophilic and nucleophilic functional group, and the second substance prior to bonding with the linker can have an electrophilic functional group. In yet another example of the disclosed composites, the first active substance prior to bonding with the linker can have an electrophilic functional group, the linker prior to bonding with the first and second active substance can have at a nucleophilic and electrophilic functional group, and the second substance prior to bonding with the linker can have a nucleophilic functional group. In still another example of the disclosed composites, the first active substance prior to bonding with the linker can have an electrophilic functional group, the linker prior to bonding with the first and second active substance can have at least two nucleophilic functional groups, and the second substance prior to bonding with the linker can have an electrophilic functional group. In yet a further example, the first active substance prior to bonding directly to the second active substance can have a nucleophilic functional group and the second active substance prior to bonding directly to the first active substance can have an electrophilic group. In yet a further example, the first active substance prior to bonding directly to the second active substance can have an electrophilic functional group and the second active substance prior to bonding directly to the first active substance can have a nucleophilic group.

In one example of the disclosed composites, the first active substance prior to bonding with the linker can be a polymeric amine or polyamine dendrimer, or polyamine complex, the linker prior to bonding with the first and second active substance can be a dialdehyde, dione, epichlorohydrin, paraformaldehyde, diisocyanate, glycidol, or diester, and the second substance prior to bonding with the linker can also be a polymeric amine or polyamine dendrimer. In another example of the disclosed composites, the first active substance prior to bonding with the linker can be a polyamide, polyamine dendrimer, protein, polyalkyleneimine, polyalcohol, or hyperbranched polyglycerol, the linker prior to bonding with the first and second active substance can be a dialdehyde, dione, epichlorohydrin, glycidol, paraformaldehyde, diisocyanate, or diester, and the second substance prior to bonding with the linker can be a protein, nucleic acid, antibacterial, antiviral, cardiovascular therapeutic, anti-cancer therapeutic, CNS therapeutic, hypoglycemic agent, fertility/contraception or woman's health agent, infectious disease therapeutic, pulmonary disease therapeutic, or neutralizing agent. In still another example of the disclosed composites, the first active substance prior to bonding with the linker can be a polymeric amine, polyamine dendrimer, polyalkyleneimine, polyalcohol, polyetheramine, hyperbranched polyglycerol, or protein, the linker prior to bonding with the first and second active substance can be a amino aldehyde, amino ester, hydroxy aldehyde, or hydroxy ester, and the second substance prior to bonding with the linker can be a protein, antibacterial, antiviral, cardiovascular therapeutic, anti-cancer therapeutic, CNS therapeutic, hypoglycemic agent, fertility/contraception or woman's health agent, infectious disease therapeutic, pulmonary disease therapeutic or neutralizing agent. In another example of the disclosed composites, the first active substance prior to bonding with the linker can be a polyester or protein the linker prior to bonding with the first and second active substance can be a diamine, diol, dithiol, amino alcohol, or amino thiol, and the second substance prior to bonding with the linker can be a polyester, protein, nucleic acid, antibacterial, antiviral, or neutralizing agent. In another example of the disclosed composites, the first active substance prior to bonding with the linker can be a polyamide, polyamine dendrimer, polyamine complex, protein, polyalkyleneimine, polyetheramine, polyalcohol, or hyperbranched polyglycerol, the linker prior to bonding with the first and second active substance can be a dialdehyde, dione, glycidol, epichlorohydrin, paraformaldehyde diester, or diisocyanate, and the second substance prior to bonding with the linker can be a thermoplastic.

Some specific examples of reconstituted cellulose with a first active substance include, cellulose with BSA, cellulose with Jeffamine D230, cellulose with PAMAM (with or without the cross-linker 1,3-diphenyldiisocyanate), cellulose with TMP (with or without the cross-linker 1,3-diphenyldiisocyanate), cellulose with diglycerol (with or without the cross-linker 1,3-diphenyldiisocyanate), cellulose with hyperbranched polyglycerol, cellulose with Jeffamine D230 and magnetite beads. Any of these can be coupled directly or via a linker with a second active substance (e.g., a therapeutic with a pendant functional group) as disclosed herein.

Methods

Disclosed herein are methods for the entrapment of materials in a cellulose matrix that involve the dissolution and regeneration of ionic liquid (IL)/cellulose compositions. The regenerated cellulose, which can contain a first active substance distributed substantially homogeneously therein, can be directly functionalized with one or more other second active substances or can be derivatized with a linker and then functionalized with the other second active substance(s). In many examples, the linker crosslinks the first active substance, resulting in a complex that will not, or will be slow to, leach out of the regenerated cellulose matrix. An advantage of the disclosed methods is that the linking of the first and/or second active substances can be performed in an ionic liquid, which can solubilize cellulose and active substances (e.g., dendrimeric amines and alcohols). Other solvent systems can render the active substances inactive. These methods can provide for the incorporation of activity (e.g., biological or chemical) into cellulose products like paper and clothing. Further, it will be clear to those skilled in the art that the disclosed methods and composites are applicable to the preparation of various forms of composites, e.g., films, beads, particles, flakes, fibers, substrates, coatings, capsules, gels, and the like, in or on which substances are entrapped.

In one aspect, disclosed herein is a method for preparing a cellulose/active substance composite comprising providing a composition comprising a regenerated cellulose matrix and a first active substance, wherein the first active substance is substantially homogeneously distributed within the regenerated cellulose matrix; contacting the first active substance with a linker, wherein the linker bonds to the first active substance; and contacting a second active substance with the linker, wherein the linker bonds to the second active substance, thereby providing a cellulose-active substance composite.

In a further aspect, disclosed herein is a method for preparing a cellulose/active substance composite comprising providing a composition comprising a regenerated cellulose matrix and a first active substance, wherein the first active substance is crosslinked with a linker and substantially homogeneously distributed within the regenerated cellulose matrix; contacting the first active substance with a second active substance, wherein the second active substance bonds to the first active substance, thereby providing a cellulose-active substance composite.

Figure 8:
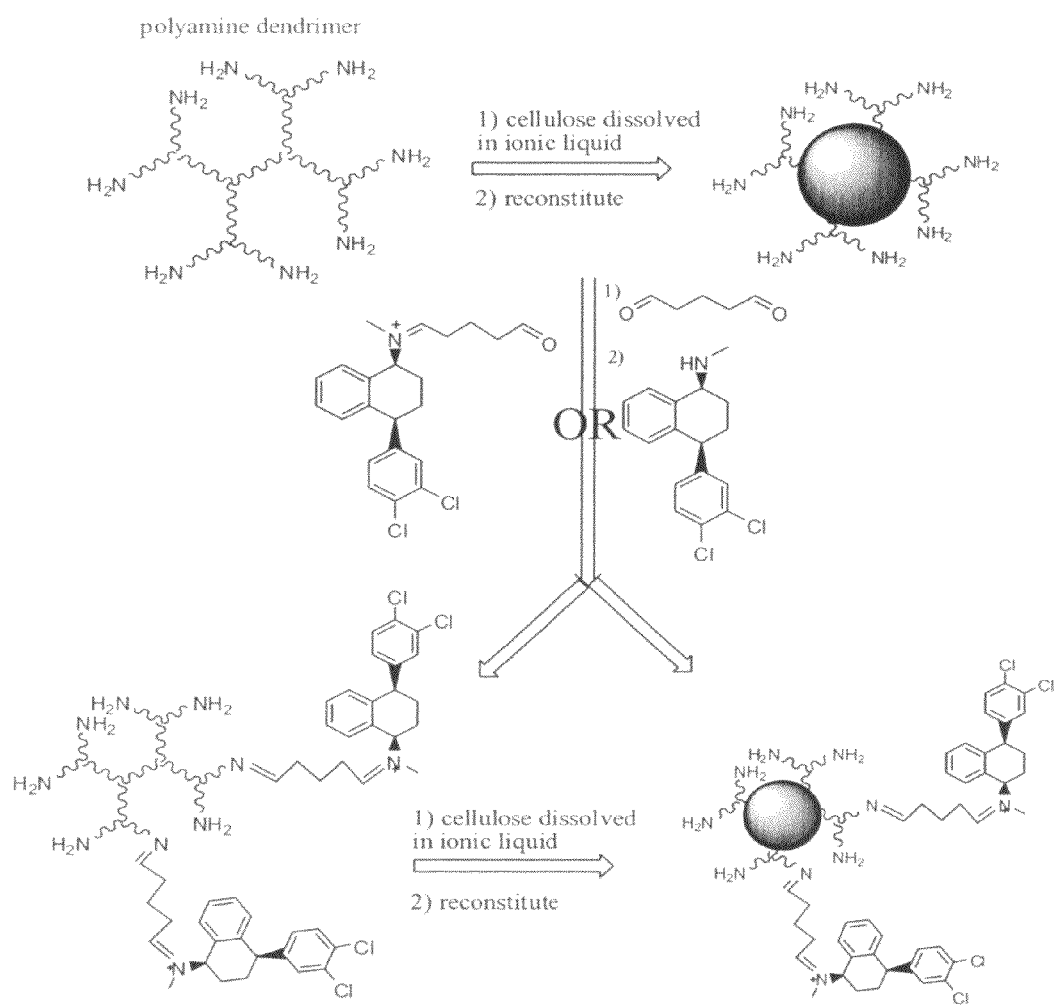
FIG. 8 is a schematic of the various routes to functionalizing a regenerated cellulose bead when the first active substance is a polyamine dendrimer, the second active substance is a drug, and the linker is 1,5-pentanedial. A similar approach can also be followed with a hyperbranched polyol instead of the polyamine dendrimer shown.

In some examples, the linker can be contacted to the first active substance prior to contacting the second active substance with the linker. Alternatively, the linker can be contacted to the second active substance prior to contacting the first active substance with the linker. Still further, the linker can be contacted to the first active substance prior to providing the composition comprising the regenerated cellulose matrix and first active substance. Also, in one example, the linker can be contacted to the first and second active substances at the same time. FIG. 8 is a schematic that illustrates these different routes.

The disclosed methods allow the entrapment of a wide range of materials (i.e., "active substances"), providing a composite where the active substance(s) is(are) substantially homogeneously distributed throughout a regenerated cellulose matrix. One method of incorporating or entrapping a substance into a regenerated cellulose matrix is disclosed in U.S. Pat. No. 6,808,557, which is incorporated by reference herein in its entirety and for its teachings of cellulose regeneration and entrapment of substances in regenerated cellulose.

In the disclosed methods, one or more first active substances can be entrapped in a regenerated cellulose matrix. For example, one or more first active substances can be encapsulated or entrapped by dispersion or dissolution in a hydrophilic ionic liquid containing solubilized cellulose. The ionic liquid can be substantially free of water, organic solvent, and nitrogen-containing base. Subsequent reformation of the cellulose as a solid matrix can result in the first active substance being dispersed in the regenerated cellulose matrix. The resulting material can contain the first active substance dispersed substantially homogeneously throughout the regenerated cellulose matrix.

A linker that can react with the first active substance as disclosed above can then be added to the material, followed by the addition of a second active substance that can be attached to (e.g., form a bond with) the linker. Alternatively, a second active substance that can form a bond with the first active substance entrapped in the regenerated cellulose matrix can be added directly to the matrix without the need for a linker. In still another aspect, a linker can be bonded to the second active substance and the resulting linker-second active substance conjugate can be added to the first active substance distributed in the regenerated cellulose matrix. In these examples, the first active substance, the second active substance, and/or linker can be said to be encapsulated with the regenerated cellulose matrix, film, or bead. Alternatively, the first active substance, second active substance, and/or linker can be said to functionalize the surface of the regenerated cellulose matrix or bead.

In further examples, the disclosed methods involve the preparation of cellulose/active substance composites incorporating molecular, nanoscale, and macroscopic materials within a cellulose matrix. For example, disclosed are methods of encapsulating such first active substances by regenerating a cellulose matrix from a hydrophilic ionic liquid solution containing a solid first active substance in a regenerating solution in which both the cellulose and the active substance are insoluble or difficult to dissolve (i.e., substantially insoluble).

In another example, the disclosed methods involve the preparation of a composite comprising cellulose and a first active substance dissolved or dispersed in a hydrophilic ionic liquid and in which the ionic liquid solution is substantially free of water, a non-ionic organic solvent, and nitrogen-containing base. That composition can be contacted with a liquid non-solvent diluent in which both the cellulose and first active substance are substantially insoluble to form a liquid phase and a regenerated solid cellulose phase as a matrix encapsulating the first active substance and thereby forming a material that comprises a cellulose-encapsulated first active substance. Residual hydrophilic ionic liquid can thereafter be removed.

IL/Cellulose Compositions

The ionic liquids that can be used in the disclosed methods and compositions contain ionized species (i.e., cations and anions) and have melting points usually below about 150° C. In some cases the ionic liquids are organic salts containing one or more cations that are typically ammonium, imidazolium, or pyridinium ions, although many other types are known and disclosed herein.

Ionic liquids can be used in the dissolution of cellulose (see U.S. Pat. No. 6,824,599 and Swatloski et al., *J Am Chem Soc* 2002, 124:4974-4975). In U.S. Pat. No. 1,943,176, Graenacher first disclosed a process for the preparation of cellulose solutions by heating cellulose in a liquid N-alkylpyridinium or N-arylpyridinium chloride salt, especially in the presence of a nitrogen-containing base such as pyridine. However, that finding seems to have been treated as a novelty of little practical value because the molten salt system was, at the time, somewhat esoteric. This original work was undertaken at a time when ionic liquids were essentially unknown and the application and value of ionic liquids as a class of solvents had not been realized. Now, ionic liquids are a well-established class of liquids and are being used as replacements for conventional organic solvents in chemical, biochemical, and separation processes.

Linko and co-worker reported dissolving relatively low molecular weight cellulose (DP=880) in a mixture of N-ethylpyridinium chloride (NEPC) and dimethylformamide, followed by cooling to 30° C., incorporation of various microbial cells into the solution, and then regeneration of the cellulose into a solid form by admixture with water (Linko et al., *Enzyme Microb Technol* 1979, 1:26-30). That research group also reported entrapment of yeast cells in a solution of 1 percent cellulose dissolved in a mixture of NEPC and dimethyl sulfoxide, as well as entrapment using 7.5 to 15 percent cellulose di- or triacetates dissolved in several organic solvents. (Weckstrom et al., in *Food Engineering in Food Processing*, Vol. 2, Applied Science Publishers Ltd., 1979, pp. 148-151.)

The hydrophilic ionic liquid solution used herein can be substantially free of water, a water- or alcohol-miscible organic solvent, or nitrogen-containing base and contains solubilized cellulose. Contemplated organic solvents of which the solution is free include solvents such as dimethyl sulfoxide, dimethyl formamide, acetamide, hexamethyl phosphoramide, water-soluble alcohols, ketones or aldehydes such as ethanol, methanol, 1- or 2-propanol, tert-butanol, acetone, methyl ethyl ketone, acetaldehyde, propionaldehyde, ethylene glycol, propylene glycol, the $C_1$-$C_4$ alkyl and alkoxy ethylene glycols and propylene glycols such as 2-methoxyethanol, 2-ethoxyethanol, 2-butoxyethanol, diethyleneglycol, and the like.

A cation of a hydrophilic ionic liquid can be cyclic and correspond in structure to a formula shown below:

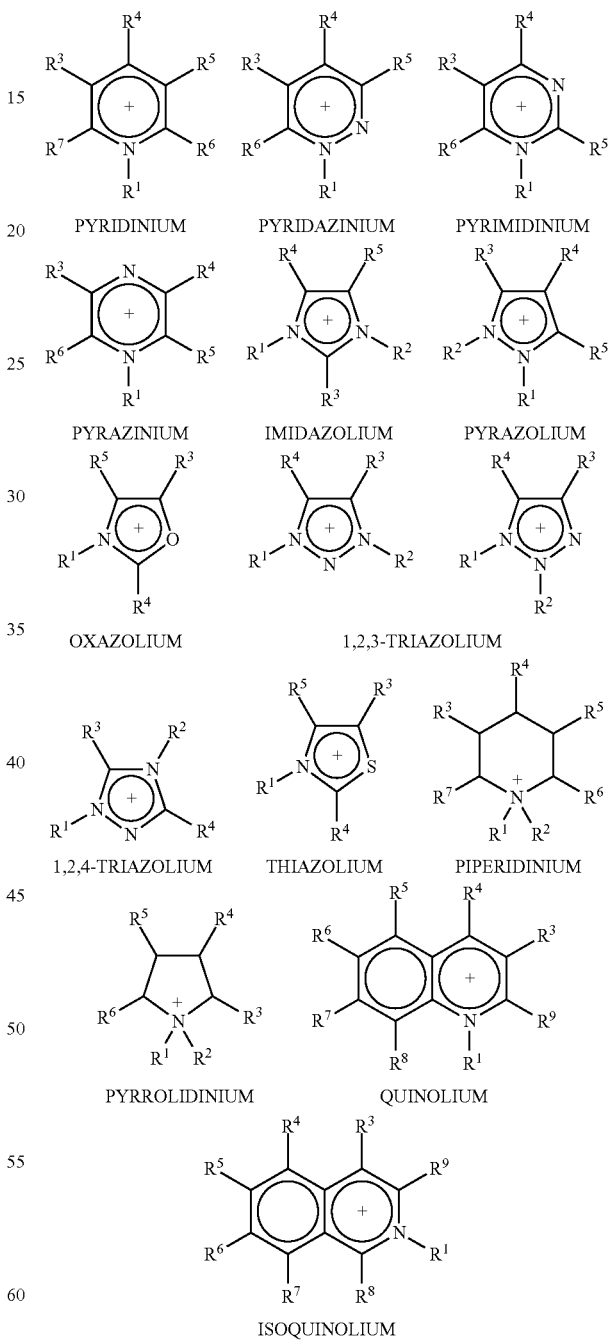

wherein $R^1$ and $R^2$ are independently a $C_1$-$C_6$ alkyl group or a $C_1$-$C_6$ alkoxyalkyl group, and $R^3$, $R^4$, $R^5$, $R^6$, $R^7$, $R^8$, and $R^9$ ($R^3$-$R^9$), when present, are independently H, a $C_1$-$C_6$ alkyl, a $C_1$-$C_6$ alkoxyalkyl group, or a $C_1$-$C_6$ alkoxy group. In other examples, both $R^1$ and $R^2$ groups are $C_1$-$C_4$ alkyl, with one being methyl, and $R^3$-$R^9$, when present, are H. Exemplary $C_1$-$C_6$ alkyl groups and $C_1$-$C_4$ alkyl groups include methyl, ethyl, propyl, iso-propyl, butyl, sec-butyl, iso-butyl, pentyl, iso-pentyl, hexyl, 2-ethylbutyl, 2-methylpentyl, and the like. Corresponding $C_1$-$C_6$ alkoxy groups contain the above $C_1$-$C_6$ alkyl group bonded to an oxygen atom that is also bonded to the cation ring. An alkoxyalkyl group contains an ether group bonded to an alkyl group, and here contains a total of up to six carbon atoms. It is to be noted that there are two iosmeric 1,2,3-triazoles. In some examples, all R groups not required for cation formation can be H.

The phrase "when present" is often used herein in regard to substituent R group because not all cations have all of the numbered R groups. All of the contemplated cations contain at least four R groups, which can be H, although $R^2$ need not be present in all cations.

The phrases "substantial absence" and "substantially free" are used synonymously to mean that less than about 5 weight percent water is present, for example. In some examples, less than about one percent water is present in the composition. The same meaning is intended regarding the presence of a nitrogen-containing base.

An anion for a contemplated ionic liquid cation is a halogen (fluoride, chloride, bromide, or iodide), perchlorate, a pseudohalogen such as thiocyanate and cyanate or $C_1$-$C_6$ carboxylate. Pseudohalides are monovalent and have properties similar to those of halides (Schriver et al., *Inorganic Chemistry*, W.H. Freeman & Co., New York, 1990, 406-407). Pseudohalides include the cyanide (CN⁻), thiocyanate (SCN⁻), cyanate (OCN⁻), fulminate (CNO⁻), and azide ($N_3^-$) anions. Carboxylate anions that contain 1-6 carbon atoms ($C_1$-$C_6$ carboxylate) and are illustrated by formate, acetate, propionate, butyrate, hexanoate, maleate, fumarate, oxalate, lactate, pyruvate, and the like. Still other examples of anions that can be present in the disclosed compositions include, but are not limited to, sulfate, sulfites, phosphates, phosphites, nitrate, nitrites, hypochlorite, chlorite, perchlorate, bicarbonates, and the like, including mixtures thereof.

A contemplated ionic liquid used herein is hydrophilic and therefore differs from the hydrophobic ionic liquids described in U.S. Pat. No. 5,827,602 or those of U.S. Pat. No. 5,683,832 that contain one or more fluorine atoms covalently bonded to a carbon atom as in a trifluoromethanesulfonate or trifluoroacetate anion.

Some additional examples of ionic liquids include, but are not limited to, the following quaternary ammonium salts: $Bu_4NOH$, $Bu_4N(H_2PO_4)$, $Me_4NOH$, $Me_4NCl$, $Et_4NPF_6$, and $Et_4NCl$.

The contemplated solvent can also comprise mixtures of two, or more, of the contemplated ionic liquids.

In one example, all R groups that are not required for cation formation; i.e., those other than $R^1$ and $R^2$ for compounds other than the imidazolium, pyrazolium, and triazolium cations shown above, are H. Thus, the cations shown above can have a structure that corresponds to a structure shown below, wherein $R^1$ and $R^2$ are as described before.

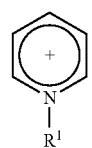 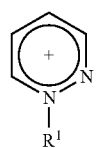 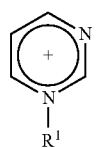 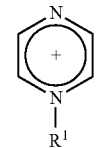

PYRIDINIUM  PYRIDAZINIUM  PYRIMIDINIUM  PYRAZINIUM

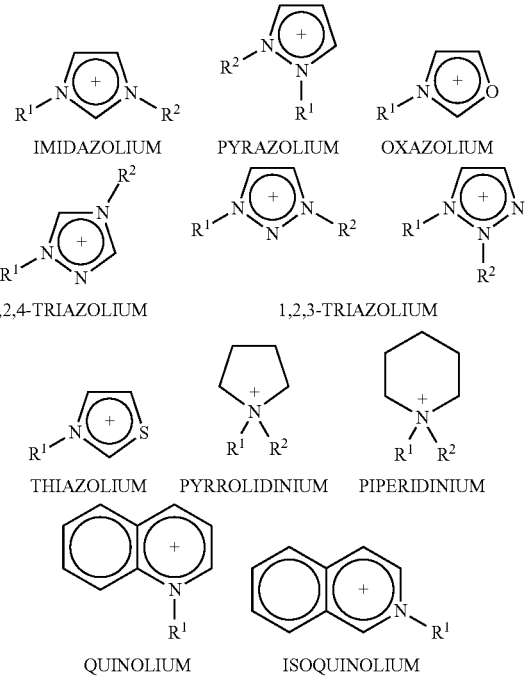

A cation that contains a single five-membered ring that is free of fusion to other ring structures is suitable for use herein. A cellulose dissolution method is also contemplated using an ionic liquid comprised of those cations. That method comprises admixing cellulose with a hydrophilic ionic liquid comprised of those five-membered ring cations and anions in the substantial absence of water to form an admixture. The admixture is agitated until dissolution is attained. Exemplary cations are illustrated below wherein $R^1$, $R^2$, and $R^3$-$R^5$, when present, are as defined before.

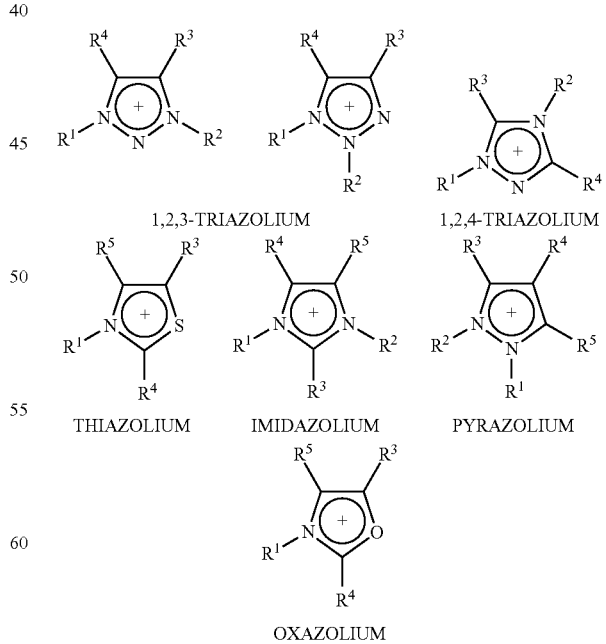

Of the cations that contain a single five-membered ring free of fusion to other ring structures, an imidazolium cation that corresponds in structure to Formula A is also suitable, wherein $R^1$, $R^2$, and $R^3$-$R^5$, are as defined before.

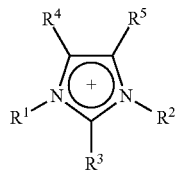

(A)

In a further example, an N,N-1,3-di-($C_1$-$C_6$ alkyl)-substituted-imidazolium ion can be used; i.e., an imidazolium cation wherein $R^3$-$R^5$ of Formula A are each H, and $R^1$ and $R^2$ are independently each a $C_1$-$C_6$ alkyl group or a $C_1$-$C_6$ alkoxyalkyl group. In still other examples, a 1-($C_1$-$C_6$-alkyl)-3-(methyl)-imidazolium [$C_n$-mim, where n=1-6] cation and a halogen anion can be used. In yet another example, the cation illustrated by a compound that corresponds in structure to Formula B, below, wherein $R^3$-$R^5$ of Formula A are each hydrido and $R^1$ is a $C_1$-$C_6$-alkyl group or a $C_1$-$C_6$ alkoxyalkyl group.

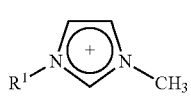

(B)

The disclosed ionic liquids can be liquid at or below a temperature of about 150° C., for example, at or below a temperature of about 100° C. and at or above a temperature of about minus 100° C. For example, N-alkylisoquinolinium and N-alkylquinolinium halide salts have melting points of less than about 150° C. The melting point of N-methylisoquinolinium chloride is 183° C., and N-ethylquinolinium iodide has a melting point of 158° C. In other examples, a contemplated ionic liquid is liquid (molten) at or below a temperature of about 120° C. and above a temperature of about minus 44° C. In some examples, a suitable ionic liquid can be liquid (molten) at a temperature of about minus 10° C. to about 100° C.

Cellulose can be dissolved without derivitization in high concentration in ionic liquids by heating to about 100° C. (e.g., by heating to about 80° C.) in an ultrasonic bath, and most effectively by using microwave heating of the samples using a domestic microwave oven. Using a microwave heater, the admixture of hydrophilic ionic liquid and cellulose can be heated to a temperature of about 100° C. to about 150° C.

An ionic liquid as disclosed herein can have an extremely low vapor pressure and typically decomposes prior to boiling. Exemplary liquification temperatures (i.e., melting points (MP) and glass transition temperatures ($T_g$)) and decomposition temperatures for illustrative N,N-1,3-di-$C_1$-$C_6$-alkyl imidazolium ion-containing ionic liquids wherein one of $R^1$ and $R^2$ is methyl are shown in Table 1 below.

TABLE 1

| Ionic Liquid | Liquification Temperature (° C.) | Decomposition Temperature (° C.) | Citation* |
|---|---|---|---|
| [$C_2$mim] Cl | | 285 | a |
| [$C_3$mim] Cl | | 282 | a |
| [$C_4$mim] Cl | 41 | 254 | b |
| [$C_6$mim] Cl | −69 | 253 | |
| [$C_8$mim] Cl | −73 | 243 | |
| [$C_2$mim] I | | 303 | a |
| [$C_4$mim] I | −72 | 265 | b |
| [$C_4$mim] [$PF_6$] | 10 | 349 | b |
| [$C_2$mim] [$PF_6$] | 58-60 | 375 | c, a |
| [$C_3$mim] [$PF_6$] | 40 | 335 | a |
| [i$C_3$mim] [$PF_6$] | 102 | | a |
| [$C_6$mim] [$PF_6$] | −61 | 417 | d |
| [$C_4$mim] [$BF_4$] | −81 | 403, 360 | d, e |
| [$C_2$mim] [$BF_4$] | | 412 | a |
| [$C_2$mim] [$C_2H_3O_2$] | 45 | | c |
| [$C_2$mim] [$C_2F_3O_2$] | 14 | About 150 | f | a) Ngo et al., *Thermochim Acta* 2000, 357: 97.
b) Fanniri et al., *J Phys Chem* 1984, 88: 2614.
c) Wilkes et al., *Chem Commun* 1992, 965.
d) Suarez et al., *J Chim Phys* 1998, 95: 1626.
e) Holbrey et al., *J Chem Soc, Dalton Trans* 1999, 2133.
f) Bonhote et al., *Inorg Chem* 1996, 35: 1168.

Illustrative 1-alkyl-3-methyl-imidazolium ionic liquids, [$C_n$-mim]X, where n=4 and 6, X=Cl$^-$, Br$^-$, SCN$^-$, (PF$_6$)$^-$, (BF$_4$)$^-$ have been prepared. The dissolution of cellulose (fibrous cellulose, from Aldrich Chemical Co.; Milwaukee, Wis.) in those illustrative ionic liquids under ambient conditions and with heating to about 100° C., with sonication and with microwave heating has been examined. Dissolution is enhanced by the use of microwave heating. Cellulose solutions can be prepared very quickly, which is energy efficient and provides associated economic benefits.

A contemplated solution of cellulose in an ionic liquid can contain cellulose in an amount of from about 0.1 to about 35 wt. %, from about 0.1 to about 25 wt. %, from about 0.1 to about 20 wt. %, from about 0.1 to about 15 wt. %, from about 10 to about 35 wt. %, from about 10 to about 25 wt. %, from about 15 to about 35 wt. %, or from about 15 to about 25 wt. % of the solution. In other examples, the ionic liquid can contain cellulose in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 wt. % of the solution, where any of the stated values can form an upper or lower endpoint when appropriate. Further, a contemplated solution of cellulose in an ionic liquid can contain cellulose in an amount of from about 5 to about 35 parts by weight, from about 5 to about 25 parts by weight, from about 5 to about 20 parts by weight, from about 5 to about 15 parts by weight, from about 10 to about 35 parts by weight, from about 10 to about 25 parts by weight, from about 15 to about 35 parts by weight, or from about 15 to about 25 parts by weight of the solution. In other examples, the ionic liquid can contain cellulose in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 parts by weight of the solution, where any of the stated values can form an upper or lower endpoint when appropriate. Also, cellulose displays high solubility in the disclosed ionic liquids. Viscous, birefringent liquid crystalline solutions are obtained at high concentration, e.g., from about 10 to about 25 wt. % or from about 10 to about 25 parts by weight.

A solution comprised of cellulose in a molten hydrophilic ionic liquid solvent that is substantially free of water or a nitrogen-containing base is contemplated for preparing a regenerated cellulose matrix with encapsulated active substance. As such, such a liquid or solution contains about one percent or less water or a nitrogen-containing base. Thus, when a solution is prepared, it is prepared by admixing the ionic liquid and cellulose in the absence of water or a nitrogen-containing base to form an admixture.

As noted above, the ionic liquid is comprised of cations and anions. In one example, the solution can be comprised of cellulose dissolved in a hydrophilic liquid whose cations contain a single five-membered ring free of fusion to other ring structures, as discussed previously. The solution can be used as is to carry out further reactions on the cellulose such as acylation to form cellulose acetate or butyrate, or for regeneration.

Further, the use of ionic liquids, such as 1-butyl-3-methylimidazolium chloride ([$C_4$mim] CO, as solvents for non-derivatizing cellulose dissolution and regeneration has been described (PCT Publication No. WO03/029329 A2; Swatloski et al., *J Am Chem Soc* 2002, 124:4974-4975; Swatloski et al., "Ionic Liquids for the Dissolution and Regeneration of Cellulose," In Molten Salts XIII: Proceedings of the International Symposium, Trulove, et al., Eds., The Electrochemical Society: Pennington, N.J., 2002, Vol. 2002-19, pp. 155-164, which are incorporated by reference herein for at least their teachings of IL/cellulose dissolution and regeneration methods).

Also, Wu et al. (*Biomacromolecules* 2004, 5:266-268) disclosed how 1-alkyl-3-allylimidazolium chloride ILs could be used as solvents for homogeneous derivitization of cellulose and Heinze et al. (Liebert and Heinze, *Biomacromolecules* 2005, 6:333-340) described using a alkylammonium fluoride/dimethylsulfoxide solvent system for similar derivitizations of cellulose. In contrast, the methods disclosed herein use the dissolution characteristics of ILs for cellulose to enable physical encapsulation of macromolecules such as *Rhus vernificera* laccase (E.C. #1.10.3.2) in regenerated cellulose films, and the disclosed methods demonstrate the compatibility of biomolecules such as enzymes with IL-cellulose environments (Turner et al., *Biomacromolecules* 2004, 5:1379-1384; U.S. Pat. No. 6,808,557). Enzymatically active membranes were prepared; however, significant loss in activity of the entrapped laccase, compared to the enzyme in an aqueous environment, was observed.

Regeneration

In the disclosed methods, cellulose is regenerated from an ionic liquid and in the presence of a first active substance. Examples of suitable first active substances are disclosed herein. And the disclosed methods are particularly useful for active substances that comprise water-insoluble metal extractants, water-insoluble dyes, and magnetite particles of about 5 micrometers in diameter (largest dimension if not approximately spherical), which can be dispersed in the IL solution, either physically to form a suspension or colloid, or by dissolving the components in the IL solvent, and then regenerating the composite material.

Upon regeneration, the distribution of the first active substance can be substantially homogeneous within the matrix of regenerated cellulose. In many instances, the regenerated solid cellulose can have about the same molecular weight as the original cellulose from which it is prepared and can typically contain a degree of polymerization number (DP) of about 1200 or more. Also, the regenerated cellulose can be substantially free of an increased amount of substituent groups relative to the starting cellulose and entrapped ionic liquid degradation products.

A minor amount of cellulose hydrolysis can take place during dissolution and regeneration. However, the weight average molecular weight of the cellulose after regeneration can be about 90% that of the cellulose prior to dissolution and regeneration. For example, the molecular weight percent of the cellulose can be from about 90% to about 100%, from about 92% to about 98%, from about 94% to about 96%, from about 90 to. about 95%, from about 95% to about 100%. In other examples, the molecular weight percent of the cellulose can be about 90, 91, 92, 93, 94, 95, 96, 97, 98, 99, or 100% that of the cellulose prior to dissolution or regeneration, where any of the stated values can form an upper or lower endpoint when appropriate. This result is contrary to that of U.S. Pat. No. 5,792,399 where the starting cellulose is treated with a cellulase in the presence of NMMNO in order to effect dissolution.

The substituent groups of which the regenerated cellulose is substantially free are those that were not present in the cellulose that was dissolved in the IL. Thus, for example, the hydroxyl groups of a natural cellulose can be oxidized to form oxo (substituents with $C=O$ bonds) functionality such as ketones, aldehydes, or carboxylic acids, and natural cellulose can contain amounts of such functionalities. In one aspect, the dissolution/regeneration process used herein does not cause the formation of more than a few percent more of those groups than were originally present. Where oxidized cellulose that contains a high level of oxo functionality is used as the starting material such as where Regenerated Oxidized Cellulose U.S.P. (ROC), the regenerated cellulose again contains about the same amount of functionality (e.g., about 18 to about 24 percent carboxyl groups for ROC) after dissolution and regeneration as was present prior to those steps being carried out.

Another group of substituents of which the regenerated cellulose can be substantially free are those substituents such as xanthate groups, $C_2$-$C_3$ 2-hydroxyalkyl (e.g., 2-hydroxyethyl and 2-hydroxypropyl) groups, and carboxyl groups such as acetyl and butyryl that are used in other processes to dissolve cellulose.

The weight ratio of cellulose to first active substance in the molten composition can be quite varied. It can depend on such factors as the type of active substance, the desired amount of active substance to be entrapped, and the like. For example, a range of from about 1000:1 to about 1:2 by weight of cellulose to active substance is contemplated. More usual weight ratios contemplated are from about 100:1 to about 1:1, from about 75:1 to about 5:1, from about 50:1 to about 10:1, from about 75:1 to about 25:1, from about 100:1 to about 50:1, from about 50:1 to about 1:2, and from about 10:1 to about 1:2. In some examples, the ratio of cellulose to active substance can be about 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, 99:1, or 100:1, where any of these ranges can form an upper or lower endpoint when appropriate. Those weight ratios are reflected also in the regenerated cellulose product. Also, the ratio of regenerated cellulose to second active substance in the composite can be any of these stated values.

Ionic liquids containing chloride anions appear to be most effective at preparing regenerated cellulose matrixes with a first active substance distributed therein. The chloride anion is not required; however, as reasonable solubility was also observed when the ionic liquid contained thiocyanate, perchlorate, and bromide anions. No solubility was observed for ionic liquids containing tetrafluoroborate or hexafluorophosphate anions.

In usual practice, cellulose is dissolved in an IL to form a homogeneous or liquid crystalline anisotropic solution. The first active substance can then be introduced into the IL solution, either dissolved, or dispersed in the medium (for example nanoparticles or macroscopic beads). The cellulose matrix can then be formed by regeneration upon contacting the IL solution with a non-solvent diluent, resulting in formation of a regenerated cellulose material (as a floc, film, membrane, fiber, or monolith depending on processing) in which the additives are entrained.

The order of addition of the components to the IL solvent is not important for the regeneration and encapsulation process, and depends on external consideration such as the stability of the individual components under processing conditions. Cellulose can be initially dissolved to form a solution in the IL, followed by dispersion of the first active substance, and regeneration. Or, the first active substance can be dispersed in the IL, followed by dissolution of cellulose and subsequent regeneration of the cellulose.

The regenerating fluid or non-solvent diluent is a non-solvent for the active substance and the cellulose. That is, the regenerating fluid does not dissolve large quantities of either the cellulose or the first active substance, so that both ingredients are substantially insoluble in the regenerating fluid. Thus, the first active substance and the cellulose are independently soluble to an extent of less than about 5 wt. %, (e.g., less than about 1%) in the regenerating fluid. The ionic liquid is miscible with the regeneration fluid, and contacting of the IL phase with the regeneration fluid induces regeneration of the solid cellulose polymer that is the matrix in which the active substance is encapsulated.

Where extrusion of an ionic liquid solution of cellulose and an additive through a die is contemplated, that extrusion can be accomplished in a number of manners that are well known. For example, in some aspects, a surface of the die containing one or more orifices through which the solution is extruded is below the surface of the regenerating fluid. In other aspects, the solution passes from a die orifice through air or another gas such as nitrogen or argon prior to being contacted with the regenerating fluid.

The liquid non-solvent can be miscible with water. Exemplary liquid non-solvents include water, an alcohol such as methanol, or ethanol, acetonitrile, an ether such as furan or dioxane, and a ketone such as acetone. The advantage of water is that the process avoids the use of a volatile organic compound (VOC). Regeneration does not require the use of volatile organic solvents. The ionic liquid can be dried or otherwise freed of the liquid non-solvent and reused after regeneration.

The concepts described herein permit addition of IL-soluble chemicals to be added, followed by regeneration using a non-solvent diluent in which both cellulose and first active substance are non- or sparingly soluble. Incorporation of nanoparticles, and macroscopic particles in the cellulose matrix that are initially dispersed within the viscous IL medium, results in a substantially homogeneous dispersion within the regenerated cellulose matrix, forming a nano-dispersed composite. The nano-particle first active substance can then be linked to a second active substance via a suitable linker.

These disclosed methods have advantages for formation of composites containing many solid active substance, which are desirable to encapsulate in a regenerated cellulose matrix, particularly for the incorporation of active substances that are not soluble in water or other common solvents, for example nanoparticles or macroscopic materials.

Matrices formed by this process are capable of effecting a slow rate of release of the encapsulated materials by diffusion through the shell to the surrounding medium, swelling in a liquid medium such as water, by slow, controlled degradation of the cellulose matrix structure, or by slow dissolution of the active substances from within the matrix.

The final morphological form of the disclosed composites depends on the regeneration process and on the desired applications of the materials. For example, high surface area beads, cylinders or flocs can be manufactured for filtration or separation applications, whereas thin films can be prepared for membrane and sensor uses.

Linking

As noted, the first active substance, which is embedded in the regenerated cellulose matrix (e.g., bead), can be coupled to a linker and a second active substance. Also, the first active substance, which is embedded in the regenerated cellulose matrix can be coupled to a second active substance, without the use of a linker. Methods for coupling the first and second active substances to a linker or to each other are disclosed herein. Other methods for coupling the first and second active substance to a linker or each other are reactions known in the art. The particular method will depend on the specific first active substance, second active substance, and linker (if used). Generally, the regenerated cellulose matrix comprising the first active substance distributed therein can be treated with a linker that can form a bond with the first active substance. Alternatively, the linker and the second active substance can be coupled beforehand and then contacted with the first active substance entrapped in the regenerated cellulose matrix. In a further aspect, the first active substance can be coupled to the linker and then contacted with the cellulose IL solution. Then upon regeneration of the cellulose, the first active substance coupled to the linker can be distributed substantially homogeneously within the regenerated matrix.

Alternatively, the linker and the second active substance can be coupled beforehand with the first active substance and then entrapped in the regenerated cellulose matrix.

Pharmaceutical Formulations

Also, pharmaceutical formulations comprising the disclosed cellulose/active substance composites are disclosed herein. A suitable pharmaceutical formulation can comprise any of the disclosed composites with a pharmaceutically acceptable carrier. For example, a pharmaceutical formulation can comprise one or more of the disclosed composites and a pharmaceutically acceptable carrier. The disclosed pharmaceutical formulations can be used therapeutically or prophylactically.

By "pharmaceutically acceptable" is meant a material that is not biologically or otherwise undesirable, i.e., the material can be administered to a subject without causing any undesirable biological effects or interacting in a deleterious manner with any of the other components of the pharmaceutical formulation in which it is contained. The carrier would naturally be selected to minimize any degradation of the active ingredient and to minimize any adverse side effects in the subject, as would be well known to one of skill in the art.

Pharmaceutical carriers are known to those skilled in the art. These most typically would be standard carriers for administration of drugs to humans, including solutions such as sterile water, saline, and buffered solutions at physiological pH. Suitable carriers and their formulations are described in Remington: The Science and Practice of Pharmacy, 21st ed., Lippincott Williams & Wilkins, Philidelphia, Pa., 2005, which is incorporated by reference herein for its teachings of carriers and pharmaceutical formulations. Typically, an appropriate amount of a pharmaceutically-acceptable salt is used in the formulation to render the formulation isotonic. Examples of the pharmaceutically-acceptable carrier include, but are not limited to, saline, Ringer's solution and dextrose solution. The pH of the solution can be from about 5 to about 8 (e.g., from about 7 to about 7.5). Further carriers include sustained release preparations such as semipermeable matrices of solid hydrophobic polymers containing the disclosed compounds, which matrices are in the form of shaped articles, e.g., films, liposomes, microparticles, or microcapsules. It will be apparent to those persons skilled in the art that certain carriers can be more preferable depending upon, for instance, the route of administration and concentration of composition being administered. Other compounds can be administered according to standard procedures used by those skilled in the art.

Pharmaceutical formulations can include additional carriers, as well as thickeners, diluents, buffers, preservatives, surface active agents and the like in addition to the compounds disclosed herein. Pharmaceutical formulations can also include one or more additional active ingredients such as antimicrobial agents, anti-inflammatory agents, anesthetics, and the like.

The pharmaceutical formulation can be administered in a number of ways depending on whether local or systemic treatment is desired, and on the area to be treated. Administration can be topically (including ophthalmically, vaginally, rectally, intranasally), orally, by inhalation, or parenterally. for example by intravenous drip, subcutaneous, intraperitoneal or intramuscular injection. The disclosed compounds can be administered intravenously, intraperitoneally, intramuscularly, subcutaneously, intracavity, or transdermally.

Pharmaceutical formulations for topical administration can include ointments, lotions, creams, gels, drops, suppositories, sprays, liquids and powders. Conventional pharmaceutical carriers, aqueous, powder or oily bases, thickeners and the like can be desirable.

Pharmaceutical formulations for oral administration include, but are not limited to, powders or granules, suspensions or solutions in water or non-aqueous media, capsules, sachets, or tablets. Thickeners, flavorings, diluents, emulsifiers, dispersing aids, or binders can be desirable.

Preparations for parenteral administration include sterile aqueous or non-aqueous solutions, suspensions, and emulsions. Examples of non-aqueous solvents are propylene glycol, polyethylene glycol, vegetable oils such as olive oil, marine oils, and injectable organic esters such as ethyl oleate. Aqueous carriers include water, alcoholic/aqueous solutions, and emulsions or suspensions, including saline and buffered media. Parenteral vehicles include sodium chloride solution, Ringer's dextrose, dextrose and sodium chloride, lactated Ringer's, and fixed oils. Intravenous vehicles include fluid and nutrient replenishers, electrolyte replenishers (such as those based on Ringer's dextrose), and the like. Preservatives and other additives can also be present such as, for example, antimicrobials, anti-oxidants, chelating agents, and inert gases and the like.

Some of the formulations can potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

Foodstuffs

Also disclosed herein are foodstuffs that comprise any of the disclosed composites. By "foodstuff" is meant any article that can be consumed (e.g., eaten, drank, or ingested) by a subject. For example, the disclosed composites can be added to food or beverages. In this sense, the disclosed composites can be prepared in, for example, a powdered form and contained in articles such as sachets or shakers, which can be used to pour or sprinkle the disclosed compositions onto and into food and beverages.

Emulsions

Also disclosed are compositions comprising a spray dried emulsion comprising a cellulose/active substance composites.

Uses

Figure 6:
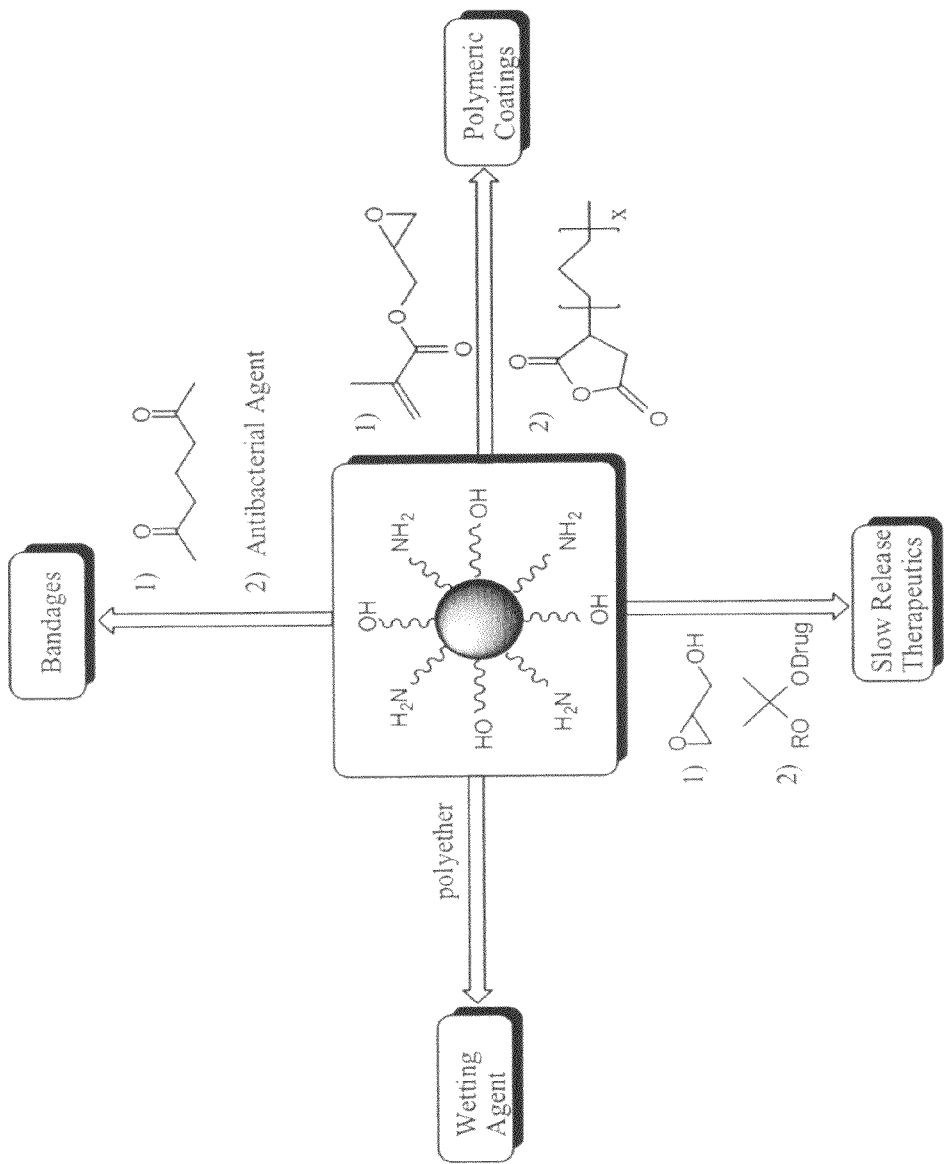
FIG. 6 is a schematic showing various applications of a cellulosic composite disclosed herein.
Figure 7:
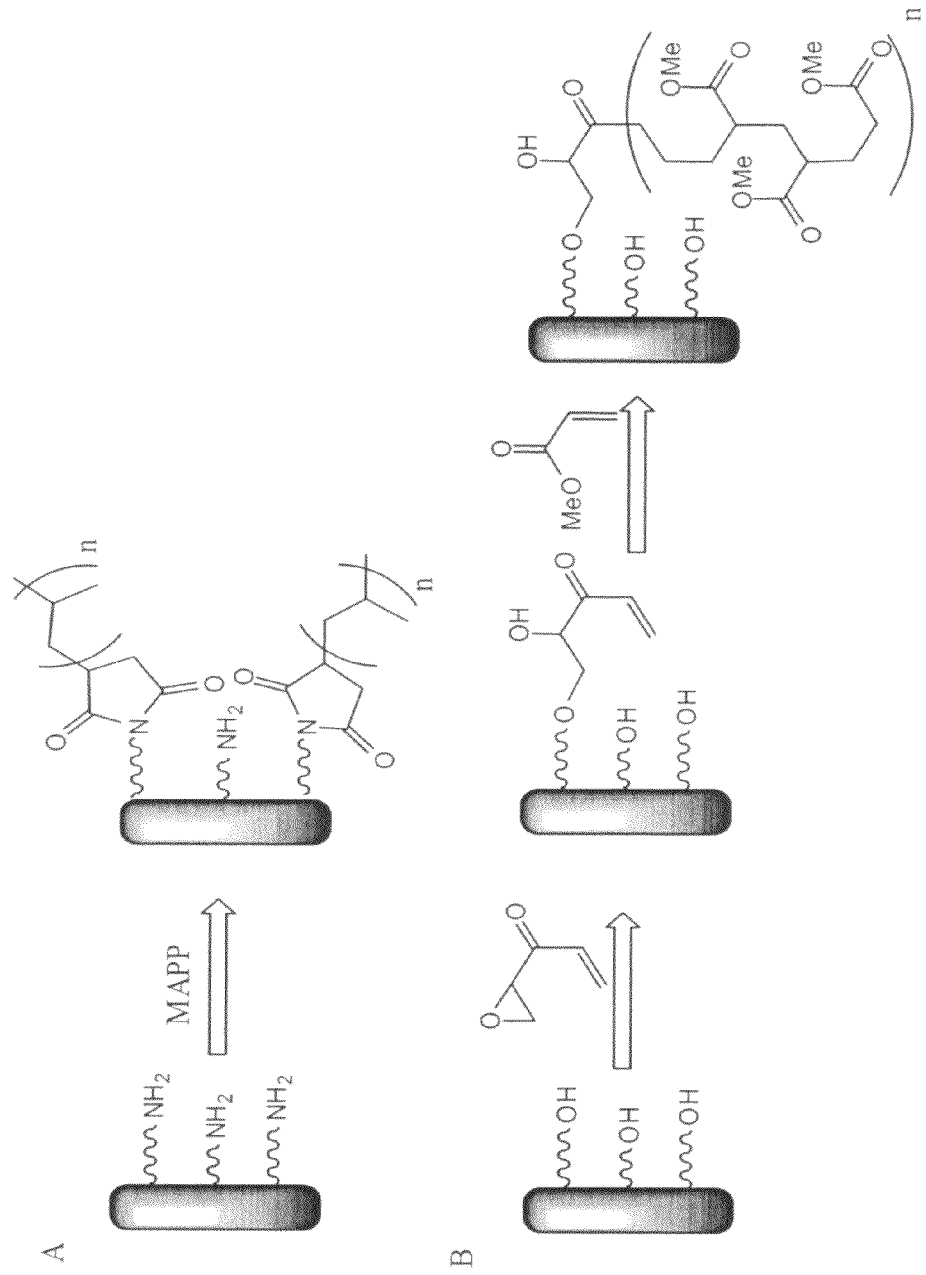
FIG. 7 is a schematic showing the preparation of two cellulose/thermoplastic composites. Scheme A shows regenerated cellulose with a polyamine or amine containing dendrimer substantially homogeneously distributed therein. The amine moieties are coupled to maleic anhydride-grafted polypropylene (MAPP). The result is a cellulose/polypropylene composite. Scheme B shows regenerated cellulose with a polyalcohol, hyperbranched polyglycerol, or alcohol containing dendrimer substantially homogeneously distributed therein. The alcohol moieties are coupled with an 1-(oxiran-2-yl)prop-2-en-1-one linker. The resulting composition is then coupled with an olefin monomer (in this case methacrylate) to provide a cellulose/polymethacrylate composite.

The described cellulose/active substance composites can have a wide variety of uses. (See for example FIG. 6.) For example, preparing regenerated cellulose/polyamine composite films and beads can result in high loading of primary amines on the surface of the regenerated cellulose matrix, allowing direct one step conjugation of a second active species. Using an IL based regeneration process, film and bead architectures can be prepared and used as immobilization supports for proteins, nucleic acids, biomolecules, and the like.

Useful applications of such cellulose/active substance composites include, but are not limited to membranes/filters, fuel cells, separations devices, electrolysis membranes, flame retardants, biocidal filters, sensors, metal extractants, supports for enzymes, extractant materials for filtration, separations and extractions of metal ions, biomolecules, and gas molecules, magnetic particles for membrane/extractant processing, materials modifiers for cellulose coatings, bioactive agents (controlled release, sensing, destruction), metal complexants (sensing, controlled release, extractants and binding and separations agents for filters), water insoluble dyes for coloring cellulose, sensing and indicators, photoresists, incorporation of nanoparticles as photonic agents or UV screens, magnetic particles for magneto-responsive beads, filtration and reactive beds, nanoparticle catalysis, dispersions of clays and other fire-retardant materials, enzyme supports, supported polymer electrolytes, cavity-forming pillars/ scaffolding for the manufacture of nanoporous materials.

In some specific examples, the disclosed cellulose/active substance composites can be used to form articles such as textiles or paper products. In one example, a textile can be prepared from a cellulose/active substance composite where the active substance comprises an antibacterial, antiviral, and/ or neutralizing agent. The resulting textile can be used as protective clothing, for example, surgical gowns, gloves, masks, bandages and the like. The textiles can also be used in uniforms (e.g., first responder or military uniforms). Articles where the composite comprises an antibacterial, antiviral, coagulating agent can be used to prepare sutures or stitches.

The disclosed composites can also be used as sensing materials to detect various compounds including polyphenols, aromatic amines, and aminophenols and as solid support materials for enzyme catalyzed transformations. Further, the disclosed composites can be used in separation processes (e.g., chromatography), and/or constant flow reactors.

Other useful applications include delivery of a therapeutic (i.e., the second active substance) to a subject by administering to the subject a composite as disclosed herein. Also disclosed is the use a composite as disclosed herein to prepare a medicament for delivering an active substance to a subject. Here, a regenerated cellulose bead with an embedded first active substance(s) can be reacted with a therapeutic (and optionally a linker), thus binding the therapeutic to the first active substance (directly or through the linker) and anchoring it to the cellulose bead. Upon ingestion, or injection the bond between the second active substance (therapeutic) and the first active substance, or the linker if present, can be hydrolyzed by stomach acid or blood acid. By changing the type of bond that the second active substance is anchored to the first active substance (or linker), one can control the rate of delivery.

In the disclosed methods of use, the composites that are administered can be any of the composites disclosed herein. In one example, the disclosed composites can be used in the disclosed methods in the form of any of the pharmaceutical formulations disclosed herein. In still another example, the disclosed composites can be incorporated into any foodstuffs or emulsions disclosed herein and used in the disclosed methods.

It is contemplated that the methods disclosed herein can be accomplished by administering various forms of the disclosed composites. For example, one can administer any of the pharmaceutical formulations with any of the foodstuffs disclosed herein. In another example, one can administer a tablet or capsule with any of composites disclosed herein. It is also contemplated that one can administer more than one cellulose/active substance composite disclosed herein. For example, one can administer a cellulose/active substance composite comprising a second active substance with a particular therapeutic property and also (at the same time or later) administer another cellulose/active substance composite comprising a second active substance with a different (often complimentary) therapeutic property. In another example, one can administer a cellulose/active substance composite where the first active substance possesses one desired therapeutic property and the second active substance possesses a different and often complimentary therapeutic property. In still another example, one can administer a cellulose/active substance composite comprising a second active substance that has a therapeutic property and also can form an ionic liquid with a counterion. The counterion can also have a therapeutic activity.

Dosage

When used in the above described methods or other treatments, pharmaceutical formulations, delivery devices, or foodstuffs disclosed herein, an "effective amount" of one of the disclosed composites can be employed in pure form or, where such forms exist, in pharmaceutically acceptable salt form, and with or without a pharmaceutically acceptable excipient, carrier, or other additive.

The specific effective dose level for any particular subject will depend upon a variety of factors including the disorder being treated and the severity of the disorder; the identity and activity of the specific composition employed; the age, body weight, general health, sex and diet of the patient; the time of administration; the route of administration; the rate of excretion of the specific composition employed; the duration of the treatment; drugs used in combination or coincidental with the specific composition employed and like factors well known in the medical arts. For example, it is well within the skill of the art to start doses of a composition at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose.

The dosage can be adjusted by the individual physician or the subject in the event of any counterindications. Dosage can vary, and can be administered in one or more dose administrations daily, for one or several days. Guidance can be found in the literature for appropriate dosages for given classes of pharmaceutical products.

Further, disclosed are methods for delivering a disclosed composite to a subject by administering to the subject any of the pharmaceutical formulations, delivery devices, emulsions, and/or foodstuffs disclosed herein. The disclosed composites (including delivery devices and pharmaceutical formulations thereof) can typically be administered orally.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

All chemicals used were of analytical grade, purchased from Sigma-Aldrich (Milwaukee, Wis.), and used without further purification unless otherwise noted.

Example 1

Preparation of Functionalized IL-Regenerated Cellulose Films

Underivitized microcrystalline cellulose (Aldrich Chemical Co.; Milwaukee, Wis.), was dissolved in the IL, 1-butyl-3-methylimidazolium chloride ([$C_4$mim]Cl) to form a 5 weight percent (wt. %) solution using microwave pulse heating as previously described (PCT Publication No. WO03/029329 A2; Swatloski et al., *J Am Chem Soc* 2002, 124:4974-4975; Swatloski et al., "Ionic Liquids for the Dissolution and Regeneration of Cellulose" In Molten Salts XIII: Proceedings of the International Symposium, Trulove et al., Eds., The Electrochemical Society: Pennington, N.J., 2002; Vol. 2002-19, pp. 155-164). After complete dissolution at around 120 to 150° C., forming a viscous clear solution, the mixture was allowed to cool to approximately 60° C., forming a supercooled liquid. A second polymer (see Table 2 for a list of "first active substances") was then added to the cellulose solution at a concentration of approximately 20 wt. % relative to the cellulose component and the mixture was manually homogenized (to ensure complete mutual dispersion) and then cast as a film (1 mm thickness) on a glass plate using coating rods (R&D Specialties, Weber, N.Y.). The films were reconstituted and the IL solvent was leached from the films with deionized (DI) $H_2O$. Following complete reconstitution, films were placed in a bath and immersed in DI H$_2$O for at least 24 hours (h) to leach residual [C$_4$mim]Cl from the film.

Example 2

Preparation of Functionalized IL-Regenerated Cellulose Films

Approximately 10 wt. % of microcrystalline cellulose was dissolved in [C$_4$mim]Cl using microwave pulse heating. The solution was cooled slightly and 20 wt. % of a first active substance (Table 2) was added and homogenized. The cellulose non-solvent, polypropylene glycol (PPG) 2,000, was heated in the microwave for approximately 1 minute using 30 second pulses and placed on the overhead ultrahigh-torque stirrer at 550 rpm. The cellulose mixture was slowly added to the pre-heated PPG and allowed to continue to stir for approximately 30 minutes. This allowed the temperature of the PPG to fall, preventing agglomeration of the beads. The mixture was then removed from the stirrer to which a 1:1 ratio of ethanol was directly added and manually stirred to begin reconstituting the beads. The entire mixture was passed through a vacuum-attached funnel (filter) to separate the beads from the solution. Once the beads were vacuumed dried, they were washed with five additional aliquots of ethanol (about 50.0 mL) followed by five washes of deionized water (about 50.0 mL). Beads can be air-dried, freeze dried, or stored in deionized water until use.

Example 3

X-Ray Photoelectron Spectroscopy (XPS)

The modification in chemical structure of the functionalized cellulose films was measured using a Kratos Analytical Analysis 165 Multitechnique Spectrometer working at a base pressure of less than 10$^{-9}$ Torr. A photon source of Al Kα radiation (1486.6 electron volts (eV)) was used and emitted photoelectrons were analyzed with a 165 mm mean radius concentric hemispherical analyzer equipped with 8 channeltron detectors operated in the fixed analyzer mode. Survey scans were taken using a pass energy of 160 eV whereas high resolution scans were collected at 80 eV. Samples were prepared as described above and dried in air under ambient conditions.

Example 4

Preparation of Functionalized IL-Regenerated Cellulose Beads

An approximately 10 wt. % solution of microcrystalline cellulose (4.8 g) in [C$_4$mim]Cl (50.0 g) was prepared using microwave pulse heating (PCT Publication No. WO03/029329 A2; Swatloski et al., *J Am Chem Soc* 124:4974-4975, 2002; Swatloski et al., "Ionic Liquids for the Dissolution and Regeneration of Cellulose" In Molten Salts XIII: Proceedings of the International Symposium, Trulove et al., Eds., The Electrochemical Society: Pennington, N.J., 2002, Vol. 2002-19, pp. 155-164). The solution was then cooled slightly and 1.0 g BSA (Sigma; Milwaukee, Wis.) was added and homogenized using a glass stirring rod to prepare a mixture containing 1:5 weight ratio of BSA:cellulose. Beads were prepared by dispersing the solution in a rapidly stirring hot (100° C.) polypropylene glycol (PPG 425) bath using an overhead ultrahigh-torque stirrer (Caframo Limited; Wiarton, Ontario) at 850 rpm. The cellulose/[C$_4$mim]Cl/BSA mixture was slowly added to the hot PPG, dispersing to form small beads, and was stirred for 30 min. During stirring, the temperature of the PPG bath was allowed to fall to approximately 40° C. hardening the dispersed cellulose/[C$_4$mim]Cl/BSA beads and preventing subsequent agglomeration. The solution was removed from the stirrer and ethanol was slowly added to begin reconstitution of the cellulose composite beads. The beads were washed five times with ethanol followed by five washings with deionized water then filtered using a set of mesh filters. The major fraction with diameters between 0.25-1.00 mm were collected and stored under deionized water prior to functionalization.

Example 5

Attachment of Laccase to Functionalized Cellulose Support

The reconstituted cellulose composite materials (with the first active substances listed in Table 2 substantially homogeneously distributed therein) were removed from their deionized water bath and added to a solution of 18 mL 25 wt. % glutaraldehyde (Sigma; Milwaukee, Wis.) and 23 mL 0.1 M phosphate buffer (pH 7.0) and stirred for 12 h at room temperature. The resultant imine bonds were reduced using 50 mL of cyanoborohydride coupling buffer (Sigma), pH 7.5 for 2 h at room temperature. Finally, the materials were washed with copious amounts of DI H$_2$O and phosphate buffer to ready them for enzyme attachment. Activated support materials were placed in an aqueous solution containing either 7.5 mg *Rhus vernificera* laccase (E.C. #1.10.3.2) or 100.0 mg lipase (E.C. #3.1.1.3; L-9518) (both purchased from Sigma) for 2 h at room temperature for surface attachment. Materials were then washed with 0.1% Tween 20 followed by DI H$_2$O to remove electrostatically surface-bound enzyme. Materials were stored in a DI H$_2$O bath at 4° C. until use.

Example 6

Laccase-Catalyzed Syringaldazine Oxidation Assay

To determine the activity of laccase bound to the surface of a functionalized film, the colorimetric oxidation of syringaldazine was monitored using UV/Vis spectroscopy. Samples of each film were cut into circular disks (d=1.60 cm, A=2.01 cm$^2$) and immersed in a solution containing 2.8 mL 20 mM phosphate buffer (pH 7.13) and 0.054 mg reduced syringaldazine. The samples were incubated for 180 min at 27° C. followed by a DI H$_2$O washing. Each sample was individually, vertically mounted on a microscope slide for UV/Vis spectroscopic measurement. Samples were scanned from 300-700 nm on a Varian Cary 3C UV-visible spectrophotometer (Palo Alto, Calif.). The specific activity of laccase was calculated using the extinction coefficient for oxidized syringaldazine (ε=65,000) (Harkin and Obst, Science 1973, 180:296-298), and a path length (film thickness) of 1 mm. All reactions were performed in triplicate.

Example 7

Lipase-Catalyzed Transesterification of Ethyl Butyrate with Butanol 0.06 M ethyl butyrate (0.016 mL), 0.12 M n-butanol (0.022 mL), and 0.06 M 1,3-dimethoxybenzene (0.016 mL), as internal standard, were added to 2 mL tert-butanol. 119 mg or 166 mg enzyme (Novozym 435 (dried) and B-immobilized lipase (wet), respectively) was added to the reaction solution and allowed to proceed at 40° C. and 150 rpm for 24 h. 50 µL aliquots of reaction solution were diluted in 100 µL of 65:35 MeOH:acetate buffer (pH 4.5) and injected into a Shimadzu HPLC (Columbia, Md.) fitted with a C-18 Jordi Gel column, 150 mm×4.6 mm, (Alltech, Deerfield, Ill.) using 65:35 MeOH:acetate buffer as eluent at a flow rate of 1.0 mL min$^{-1}$. Formation of the reaction product, butyl butyrate, was detected and monitored using a Shimadzu differential refractometric detector (RID-10A). All reactions were performed in triplicate (Lau et al., *Green Chem* 2004, 6:483-487).

Example 8

Attachment of Biotin to Functionalized Cellulose Support

Figure 9:
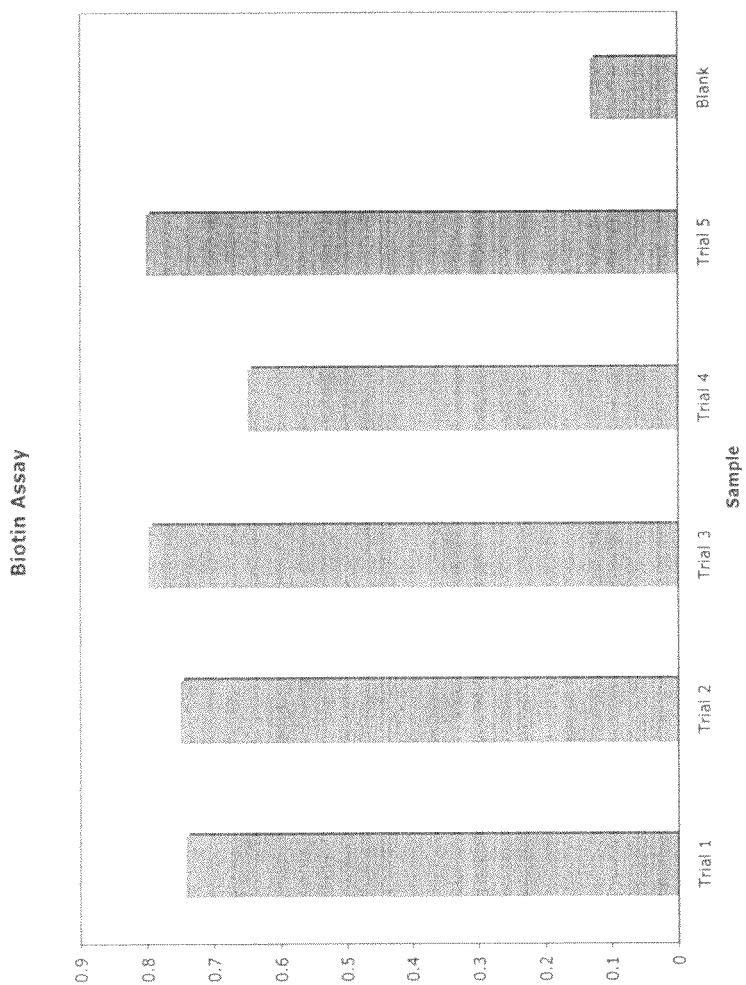
FIG. 9 is a graph showing five trials of an alkaline phosphatase assay using reconstituted cellulose composites comprising Jeffamine D230 and functionalized with biotin.

Reconstituted beads of cellulose (about 67 mg) with Jeffamine D230 (20% w/w) distributed therein (example C in Table 2) were reacted with biotin (about 25 mg) in 2 mL cyanoborohydride Coupling Buffer (Sigma, St. Louis, Mo.) at 25° C. and 150 rpm for one hour following at 4° C. with no stirring for 23 hours. The biotin functionalized beads were reacted with 3 mL anti-biotin alkaline phosphatase conjugate solution (phosphate buffered saline, PBS) at pH 7.64. The blank was prepared by reacting biotin functionalized beads with 3 mL PBS only. Next, the resulting composites were assayed (in quintuplicate) for activity using 2.5 mL p-nitrophenylphosphate (pNPP; a chromogenic substrate for alkaline phosphatase assay) solution added to each trial/blank and allowed to react for one hour. This substrate produced a yellow product that can be read spectrophotometrically at 405 nm. Results showed high alkaline phosphatase activity for the five trial samples over the blank sample (see FIG. 9).

Example 9

Attachment of Benzylamine to Functionalized Cellulose Support

Cellulose films (1.0×0.5 inches) were prepared by dissolution of microcyrstaline cellulose in [C$_4$mim]Cl and reconstituting in water. Samples were activated in a solution containing 9 mL of 25 wt % glutaraldehyde and 12 mL of phosphate buffer (pH 7.0). Reaction mixtures were stirred at room temperature for 24 hours with a parafilm cover. The solution remained clear over the 24 hour period. The glutaraldehyde solution was removed using a disposable pipette to avoid the use of H$_2$O. 20.0 mL of cyanoborohydride coupling buffer was added to the samples (quintuplicate) and stirred to room temperature for about 10 minutes. 1.20 mL of benzylamine was added to the resulting mixture, which was allowed to stir for 24 hours at room temperature. Samples were placed into a DI H$_2$O bath for about 10 min to remove any unbound benzylamine from the surface of the sample.

Example 10

Attachment of LIPITOR™ (Avorvastatin) to Functionalized Cellulose Support

To attached the glutaraldehyde to the hydroxyl groups, the procedure of Araujo et al., *Mem. Lnst. Oswaldo Cruz* 91:195-198, (1996) was followed.

Cellulose films (1.0×0.5 inches) were prepared by dissolution of microcyrstaline cellulose and hyperbranched polyglycerol in [C$_4$mim]Cl and reconstituting in water. Six samples of film were used in this study. The samples were submerged into a solution containing 20.0 mL of DI H$_2$O, 6.0 mL of 25 wt. % glutaraldehyde, and 4.0 mL of 1 M H$_2$SO$_4$. The resulting mixture was allowed to stir at room temperature for 24 hours to "activate" the surface with the linker molecule. The solution remained clear. The glutaraldehyde/H$_2$SO$_4$ solution was removed via pipette to avoid hydrolysis of the bonds. 20.0 mL of cyanoborohydride coupling buffer was added and allowed to, stir with the samples for about 10 minutes. 1.20 mL of neat avorvastatin was added to the above mixture and allowed to stir for 24 hours at room temperature. The solution turned cloudy upon addition of avorvastatin but after about 2 hours, the solution became clear and the previously clear cellulose/polyglycerol samples became opaque. The samples were placed in a DI H$_2$O bath for about 10 minutes to remove any unbound avorvastatin from sample surface. Avorvastatin was removed as droplets formed on the surface of the H$_2$O. Three samples were removed from the DI H$_2$O and placed in a glass vial to dry on vacuum line (to eliminate oxidation in O$_2$).

The remaining three samples were placed in 0.1 M HCl (40.0 mL) to hydrolyzed the bonds between avorvastatin and the glutaraldehyde and were stirred at room temperature for about 4 hours. The solution was neutralized using 0.1 M NaOH solution. These samples were removed from solution and allowed to air dry.

All samples were then placed on vacuum line to dry under nitrogen for about 6 hours. They were also tightly sealed with parafilm until hydrolysis.

Example 11

Glycidol Formation and Acetal Functionalization

Reconstituted beads of cellulose (about 67 mg) with Jeffamine D403 (20% w/w) distributed therein (example D in Table 2) were reacted with glycidol (about 30 mg) in anhydrous methanol and reacted at reflux for 12 hr. To this mxture 25 mg of phenyl dimethoxyacetal was added and the product was obtained by rotory evaporation.

Results and Discussion

These examples demonstrate that the dissolution and regeneration process for cellulose utilizing the IL, 1-butyl-3-methylimidazolium chloride ([C$_4$mim]Cl) (PCT Publication No. WO03/029329 A2; Swatloski et al., *J Am Chem Soc* 2002, 124:4974-4975; Swatloski et al., "Ionic Liquids for the Dissolution and Regeneration of Cellulose" In *Molten Salts XIII: Proceedings of the International Symposium*, Trulove et al., Eds., The Electrochemical Society: Pennington, N.J., 2002, Vol. 2002-19, pp. 155-164), can be used to facilitate a simple, one-step process to prepare cellulose-polyamine composites as thin films and as beads (Table 2). The surface accessible amine groups incorporated into the composites can be used as anchoring points to attach enzymes via conventional glutaraldehyde bioconjugation methods (Blanes et al., "Immobilization of lactase and invertase on crosslinked chitin." In *Bioreactor immobilized enzymes and cells*, Moo-Young, Ed., Elsevier Applied Science: London, 1998, pp. 233-249), providing a straightforward methodology to prepare surface immobilized enzymes for use in bioassays and supported reaction media.

TABLE 2

Polymers incorporated into cellulose composite films.

| Polymer | Molecular Weight | 1° Amine Concentration | Solubility in H$_2$O | Appearance of film |
|---|---|---|---|---|
| A-Poly-lysine hydrobromide | About 48,500 | About 4.4 mmol/g | 50 mg/mL | transparent |
| B-Bovine serum albumin | About 66,500* | About 0.5 mmol/g | 40 mg/mL | transparent |
| C-JEFFAMINE ® D-230 | 230 | 8.3 mmol/g | >10% | transparent |
| D-JEFFAMINE ® T-403 | 403 | 6.0 mmol/g | >10% | transparent |
| E-JEFFAMINE ® D-2000 | 2000 | 1.0 mmol/g | 0.1-1% | transparent |
| F-JEFFAMINE ® T-5000 | 5000 | 0.5 mmol/g | <0.1% | transparent |
| G-Polyethyleneimine (linear) | 18,250 | 5.2 mmol/g | soluble | transparent |
| H-Polyethyleneimine (branched) | 25,000 | 0.1 mmol/g | soluble | opaque |
| I-PAMAM (G1) (20% solution in methanol) | About 1429.85 | 5.6 mmol/g | Unknown | Transparent |

*Hirayama, *Biochem Biophys Commun* 1990, 173: 639.

Figure 2:
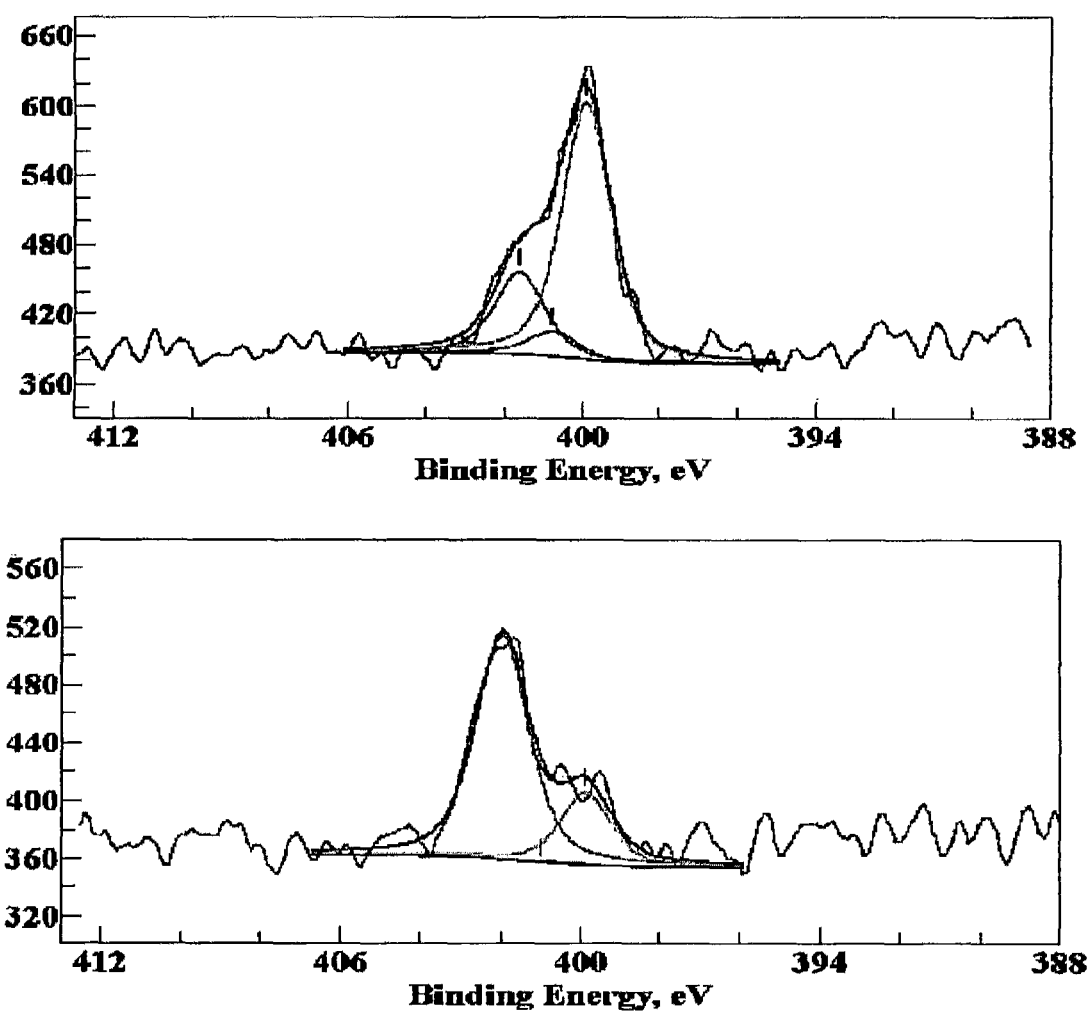
FIG. 2 is a pair of graphs of a Peakfit analysis of the N1s peak from the XPS spectra of B (top) and ionic liquid (IL) reconstituted cellulose (bottom). The blue peak in each panel represents NOx (or imidazolium) groups, red peak represents $NH_3$ groups, and green peak represents $NH_2$ groups present on the surface of each film.
Figure 3A:
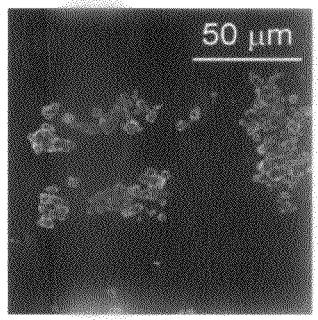
FIG. 3 is a group of SEM images of cellulose composite materials. Panel A: cellulose-poly-lysine hydrobromide; B: cellulose-BSA; C: cellulose-JEFFAMINE® D-230; D: cellulose-JEFFAMINE® T-403; E: cellulose-JEFFAMINE® D-2000; F: cellulose-JEFFAMINE® T-5000, G: cellulose-PEI (linear); Ha: cellulose-PEI (branched), smooth portion; Hb: cellulose-PEI (branched), textured portion.
Figure 3B:
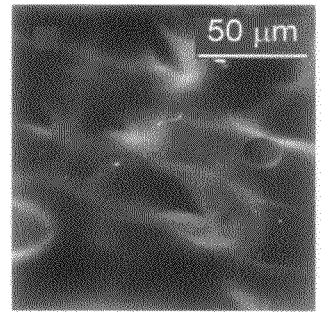
Figure 3C:
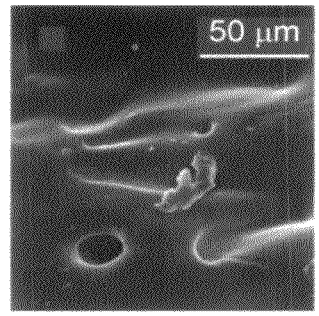
Figure 3D:
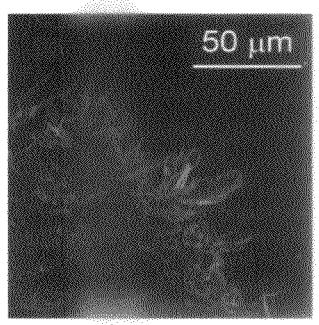
Figure 3E:
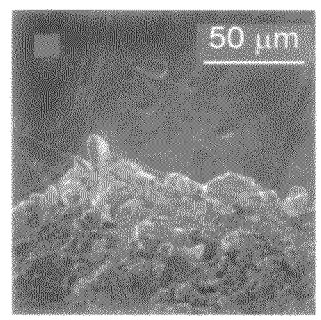
Figure 3F:
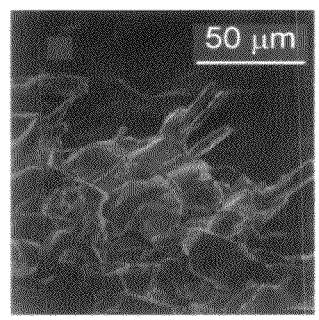
Figure 3G:
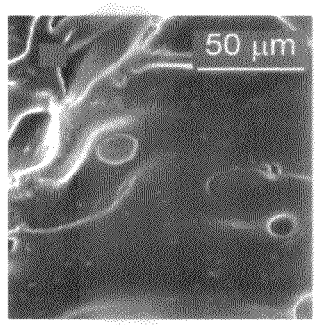
Figure 3H:
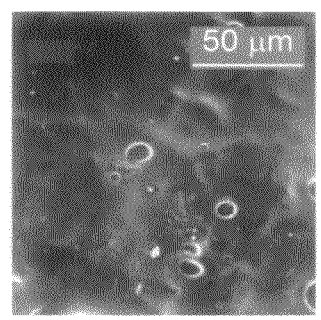
Figure 3H:
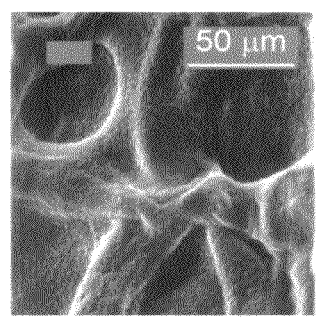

Initially, the high MW protein, bovine serum albumin (BSA) was used as the secondary polymer leading to the formation of transparent composite films. Observation of the characteristic absorbance signature in the UV/V is spectrum at 280 nm indicated the presence of protein remained ensnared within the bulk cellulose matrix. This suggested the possibility that primary amine-containing lysine residues might be present and accessible on the surface of the membranes, represented schematically in FIG. 1. This would allow simple glutaraldehyde activation and subsequent functionalization leading to the production of materials appropriate for use as solid supports in immobilized biocatalytic reactions. To this end, X-ray photoelectron spectroscopy (XPS) was used to analyze the surface of these composites to confirm, and quantify, the presence of available surface amine functionality (Bora et al., *J Membr Sci* 2005, 250:215-222). Pass scans were performed to determine the surface atomic composition of each sample and revealed the presence of nitrogen to be 0.0 atom % in the "native" cellulose (no reconstitution), 0.4 atom % in the IL-reconstituted cellulose, and 5.6 atom % in the IL-reconstituted cellulose composite containing BSA. Further, peakfit analysis of the N1s spectrum (FIG. 2) was used to quantify the relative concentrations of various surface nitrogen-containing groups present on both the IL-reconstituted samples. Of the 0.4 atom % of nitrogen on the surface of the IL-reconstituted cellulose, the relative concentration of NOx accounted for 58.8% and the relative concentration of primary amine groups was the remaining 42.1%. The presence of NO here can simply be attributed to residual imidazolium that formed a surface adsorbed layer. As well, the presence of NH$_2$ is likely attributed to decomposition material from the cationic portion of the ionic liquid that can have existed as an impurity of was formed upon heating. The relative surface nitrogen composition of the IL-reconstituted cellulose composite material (5.6 atom %) was attributed to 76.1% NH$_2$ and 23.9% NO$_x$. The marked increase in the concentration of surface primary amine groups on the cellulose composite compared to the "pure" IL-reconstituted cellulose demonstrates the feasibility of further conjugation of the material.

The use of the lysine residues in BSA as anchoring sites utilizes only approximately 6% of the polymer's total weight, leaving a significant number of these potential reaction sites inaccessibly buried within the bulk of the matrix. In order to facilitate increased enzymatic attachment, and thus relative activity, a series of other polymers, containing higher concentrations of primary amines, were investigated as additives to incorporate into the cellulose films. Polymers examined (Table 2) include poly-lysine hydrobromide, several JEFFAMINE® polymers (Huntsman, Salt Lake City, Utah) with a range of molecular weight and amine concentrations, and two variable polyethyleneimine (PEIs) polymers. The resultant amine functions of the composite films were then activated and functionalized as described above. Following biocatalyst attachment, the laccase-catalyzed oxidation of syringaldazine was performed to determine the activity of the bound enzyme (Table 2).

The suitability of these materials for use as supports for biological assays was first determined by preparing test strips from the composite films generated. Transmission mode UV/Vis spectroscopy was used to screen the materials prepared. This necessitated that the films were optically transparent thus, examples prepared which proved to be opaque, representing bulk immiscibility of the two polymer components and formation of polymer microdomains (e.g., the cellulose/branched polyethyleneimine blend H (Table 2)) were excluded at this stage.

Laccase was bound to the films using the glutaraldehyde linking methodology and its activity was determined using the standard oxidation of syringaldazine assay (Harkin and Obst, *Science* 1973, 180:296-298), and the results (Table 3) compared to both the native enzyme and to results from cellulose films containing encapsulated laccase previously reported. Overall, laccase activity was equivalent to or higher than that of the entrapped enzyme. The specific activities were calculated for laccase attached to each material resulting in values ranging from 0.030 to 0.189, accounting for an almost 50% increase in activity for the laccase attached to C. An increase in activity is likely due to improved flexibility of the enzyme as well as the formation of stable bonds between the glutaraldehyde and protein (Abdulkareem et al., *Process Biotechnol* 2002, 37:1387-1394). Based on the results obtained from the syringealdazine assay, composite materials B and C appear to be best suited materials for this application whereas the poorest performing material, G, contained linear polyethyleneimine as the secondary polymer. These results show no correlation between primary amine concentration of the secondary polymer and resultant laccase activity that likely reflect poor solubility and/or homogeneity of some of the secondary polymers in the [C$_4$mim]Cl IL/cellulose mixture.

Scanning electron microscopy (SEM) imaging was used to investigate the homogeneity and the rheology of the cellulose-composite materials (FIG. 3). FIG. 3A clearly shows distinct areas of crystalline material throughout the film demonstrating the insolubility of the poly-lysine hydrobromide resulting in discrete 'patches' of surface reactivity. In fact, these 'patches' became prominent during the colorimetric laccase-catalyzed assay. The homogenous materials, FIGS. 3B-3C, containing BSA, and JEFFAMINE® D-230, respectively represent the materials having the highest measured enzymatic activity. It appears, based on their homogeneity and high specific activities, that these materials possess a higher concentration of surface primary amine groups allowing for an increased number of protein attachment sites. Images 3D, E, F, and Ha-b confirm heterogeneity of the materials, which corresponds to decreasing solubility of the higher the molecular weight JEFFAMINES® and the PEIs in the [C$_4$mim]Cl IL-cellulose mixture. Again, the lower activities appear to be related to lower levels of enzyme attachment attributed to uneven distribution of these co-polymers throughout the film.

TABLE 3

Activity of *Rhus vernificera* laccase covalently attached to IL-regenerated cellulose composite films.

| Form of Enzyme | 1° Amine Containing Polymer | Linker Molecule | Specific Activity (μM/min/mg laccase) | Specific Activity/ mmol NH$_2$ |
|---|---|---|---|---|
| Native (aqueous) | n/a | n/a | 0.298* | — |
| Native (entrapped) | n/a | n/a | 0.052* | — |
| IL-coated (entrapped) | n/a | n/a | 0.086* | — |
| Native (surface attachment) | A | glutaraldehyde | 0.045 ± 0.052 | 1.149 |
| Native (surface attachment) | B | glutaraldehyde | 0.135 ± 0.009 | 18.07 |
| Native (surface attachment) | C | glutaraldehyde | 0.188 ± 0.020 | 0.136 |
| Native (surface attachment) | D | glutaraldehyde | 0.090 ± 0.027 | 0.093 |
| Native (surface attachment) | E | glutaraldehyde | 0.094 ± 0.037 | 0.633 |
| Native (surface attachment) | F | glutaraldehyde | 0.086 ± 0.015 | 1.104 |
| Native (surface attachment) | G | glutaraldehyde | 0.028 ± 0.009 | 0.005 |
| Native (surface attachment) | H | glutaraldehyde | nd | nd |
| Native | C | n/a | 0.140 ± 0.000 | 0.099 |
| Native (surface attachment) | C | glycidol | nd | nd |
| Native | n/a | n/a | 0.073 ± 0.005 | — |

*Results from Turner et al., *Biomacromolecules* 2004; 5: 1379-1384; U.S. Pat. No. 6,808,557.

Figure 4:
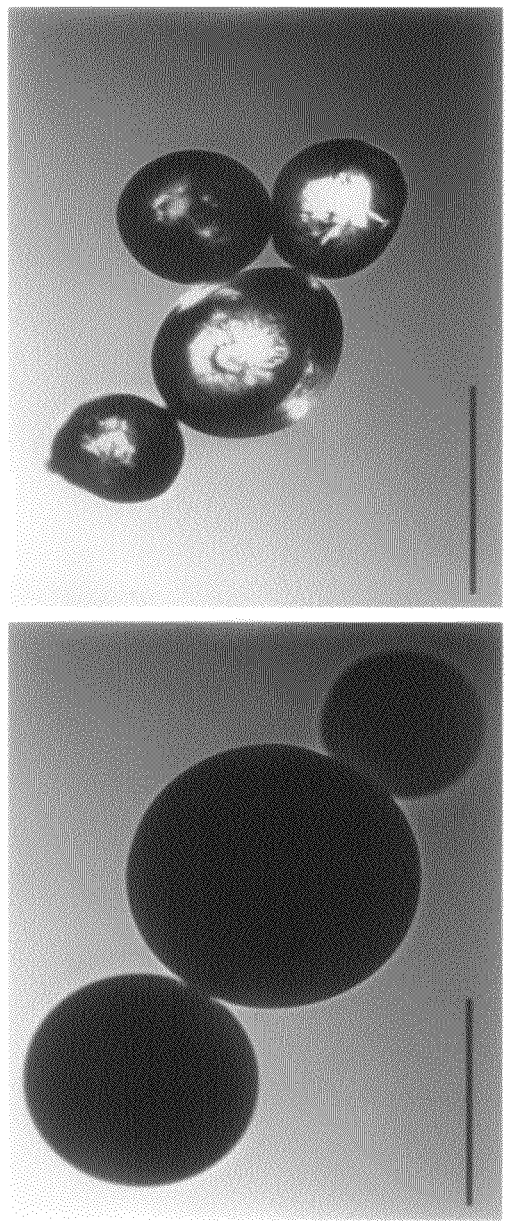
FIG. 4 is a pair of microscope images of commercially available Novozym 435 (left) and B-immobilized lipase beads (right). The scale is equivalent to 300 μm in both photos.
Figure 5:
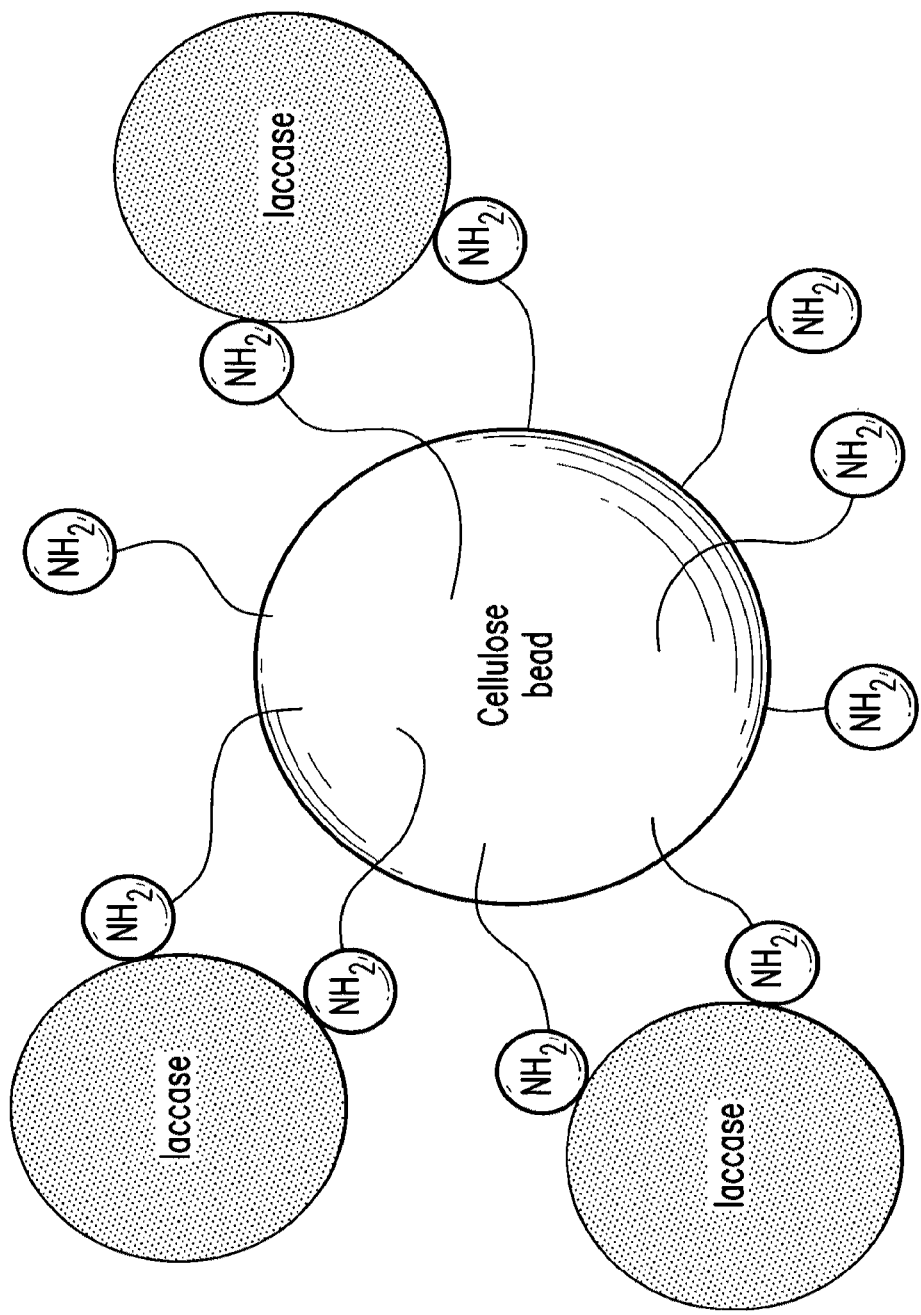
FIG. 5 is a schematic representation of a cellulose-polyamine bead with protruding primary amines and an entrapped enzyme (shown as laccase).

Based upon the laccase-catalyzed oxidation of syringaldazine, it is clear that composites B and C can be used as solid support materials. Their suitability under practical conditions was assessed by comparison with commercially available bead-immobilized enzymes. The simple transesterification of ethyl butyrate with n-butanol (Lau et al., *Green Chem* 2004, 6:483-487) was chosen to compare *Candida antartica* lipase B (CaLB) immobilized on B, prepared in a bead form, to commercially available Novozym 435 (macroporous acrylic resin immobilized *Candida antarctica* lipase) beads available through Sigma (Milwaukee, Wis.). Cellulose composite beads with diameters in the range 0.25 to 1.0 mm could be prepared easily using an ultrahigh-torque stirrer, and had comparable size and shape to the commercial product (FIG. 4).

Transesterifications were carried out in tert-butanol (5.0 mL), containing 0.06 M ethyl butyrate, 0.12 M n-butanol, 0.06 M 1,3-dimethoxybenzene (as internal standard), and 120 to 150 mg of immobilized lipase. The reaction mixtures were incubated for 24 h at 40° C. and 150 rpm before dilution in 65:35 MeOH:acetate buffer (pH 4.5) for analysis by reverse phase HPLC using a refractive index detector. Results of the study show that the commercially available Novozym 435 catalyzed 100% relative conversion of the ethyl butyrate while composite B-immobilized CaLB was responsible for an 87% relative conversion. Although these materials have been compared here as a means of determining the suitability of the materials for immobilized biotransformations, it can be noted that commercially available products have been fabricated to precise measurements after thorough characterization and optimization procedures. Such optimization procedures can also be used for the materials disclosed herein.

In the above examples, the dissolution characteristics of ILs for cellulose allowed physical encapsulation of macromolecules such as *Rhus vernificera* laccase (E.C. #1.10.3.2) in regenerated cellulose films. These methods demonstrate the compatibility of biomolecules such as enzymes with IL-cellulose environments (Turner et al., *Biomacromolecules* 2004, 5:1379-1384; U.S. Pat. No. 6,808,557). Further, while enzymatically active membranes were prepared as disclosed herein, a loss of activity of the entrapped laccase, compared to the enzyme in an aqueous environment, was observed.

This loss of activity, relative to that of the free enzyme can be attributed to either decreased conformational flexibility when constrained within the support matrix or to decreased diffusion limitations for the transport of substrates and products into and out of the cellulose films. In order to alleviate these problems and enhance activity, surface immobilization rather than bulk encapsulation can be a desired immobilization approach (Manes, *Elec J Biotechnol* 1999, 2:1-9). Both physical and chemical attachment of catalysts to support materials is possible and have been widely demonstrated (Gemeiner, In Enzyme Engineering, Gemeiner, Ed., Ellis Horwood Series in Biochemistry and Biotechnology, Ellis Horwood Limited: West Sussex, England, 1992, pp. 158-179; Froehner and Eriksson, *Acta Chem Scand B* 1975, 29:691). Physical attachment is achieved through simple adsorption or weak ionic interaction between the enzyme and the surface of the support material; however, this type of attachment is easily reversible and generally associated with enzyme leaching. Chemical attachment through covalent bonds on the other hand leads to typically more stable, nonreversible binding and is the preferred mechanism for this application due to its increased stability.

As a means of increasing affinity of the biocatalyst and stability of the attachment bonds, surface active groups on the support material can be desired. Described herein, in one aspect, is a process using a single-step dissolution and regeneration procedure (PCT Publication No. WO03/029329 A2; Swatloski et al., *J Am Chem Soc* 124:4974-4975, 2002; Swatloski et al., "Ionic Liquids for the Dissolution and Regeneration of Cellulose" In Molten Salts XIII: Proceedings of the International Symposium, Trulove, et al., Eds., The Electrochemical Society: Pennington, N.J., 2002, Vol. 2002-19, pp. 155-164), to obtain cellulose-based composite materials formed as both transparent thin films and beads containing pendant primary amine functions providing a reactive surface coating for bioconjugation. Use of such composites as immobilization materials has been demonstrated herein using a laccase catalyzed oxidation reaction as a model system.

Example 12

Embedding API IL in Cellulose Film

Figure 10:
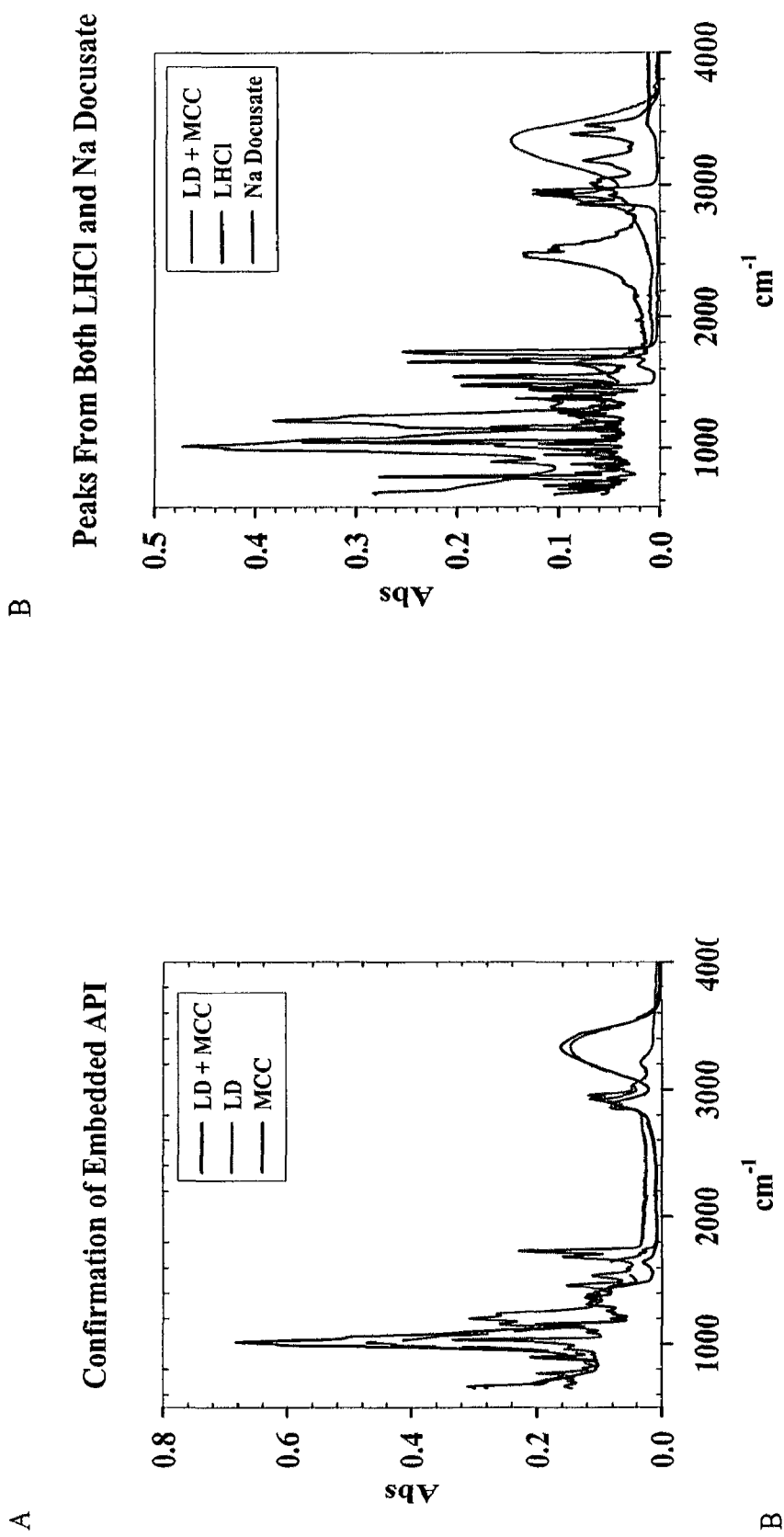
FIG. 10A is a FT-IR of a cellulose film containing the embedded active pharmaceutical ingredient ionic liquid of lidocane docusate (LD+MCC), in comparison to the starting materials, MCC and lidocane docusate (LD).
FIG. 10B is a FT-IR that shows LD embedded in the cellulose film has peaks from both starting materials, LHCl and Na Docusate.

FIG. 10A shows an active pharmaceutical ingredient (API) ionic liquid can be embedded into a cellulose film. The cellulose was dissolved in [Bmim]Cl, that had been melted at approximately 80° C. The lidocaine docusate IL (LD) was added to the above mixture and a domestic microwave was employed to ensure the solution was completely homogeneous. The hot solution was cast as a film on a glass plate and rolled with a metal rod to a desired thickness. The film was washed with DI water to remove any [Bmim]Cl. The film was placed in a water bath (DI water) overnight, where the water was changed several times during this period. The film was then allowed to dry in air over several days. The FT-IR confirmed the presence of both the LD and MCC in the film (FIG. 10A). To investigate whether only 1 ion was present in the film, while the other ion was washed into the water phase, the FT-IR of the starting materials, lidocaine hydrochloride (LHCl) and sodium docusate (Na Docusate), were also taken and compared to the LD+MCC (FIG. 10B). This shows that both ions are present in the resulting film.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A cellulose/active substance composite, comprising: a regenerated cellulose matrix; and a first active substance comprising a first or second generation polyamidoamine dendrimer, or polyoxyalkyleneamine having a molecular weight up to 5000, wherein the first active substance is crosslinked with a linker and substantially homogeneously distributed within the matrix of regenerated cellulose.

2. The composite of claim 1, wherein the regenerated cellulose has substantially the same molecular weight as a starting cellulose from which the regenerated cellulose is prepared, wherein the regenerated cellulose is substantially free of an increased amount of substituent groups relative to the starting cellulose, and wherein the regenerated cellulose is substantially free of entrapped ionic liquid degradation products.

3. The composite of claim 1, wherein the weight ratio of regenerated cellulose to first active substance is from about 1000:1 to about 1:2.

4. The composite of claim 1, wherein the loss of first active substance is less than 5 weight % of the composite when the composite is placed in excess water.

5. The composite of claim 1, wherein the linker is 1 to 20 atoms in length.

6. The composite of claim 1, wherein the linker comprises a substituted or unsubstituted, branched or unbranched, alkyl, alkenyl, or alkynyl group, ether, ester, polyether, polyester, polyalkylene, polyamines, heteroatom substituted alkyl, alkenyl, or alkynyl group, cycloalkyl group, cycloalkenyl group, heterocycloalkyl group, or heterocycloalkenyl group.

7. The composite of claim 1, wherein the linker comprises a $C_1$-$C_6$ branched or straight-chain alkyl, a $C_1$-$C_6$ branched or straight-chain alkoxyl, or a $C_2$-$C_6$ branched or straight-chain alkyl where one or more of the carbon atoms is substituted with oxygen or an amino group.

8. The composite of claim 1, wherein the linker prior to crosslinking the first active substance comprises a dialdehyde, paraformaldehyde, epoxide, a dione, a diester, or a diisocyanate.

9. The composite of claim 1, wherein the linker prior to crosslinking the first active substance comprises 1,3-phenyldiisocyanate, 1,4-phenyldiisocyanate, 1,4-cyclohexyldiisocyanate, toluene diisocyanate, or 1,6-hexane-diisocyanate.

10. The composite of claim 1, further comprising a second active substance, wherein the second active substance is bonded to the first active substance.

11. The composite of claim 10, wherein the second active substance is bonded to the first active substance with the linker.

12. The composite of claim 10, wherein the weight ratio of regenerated cellulose to second active substance is from about 1000:1 to about 1:2.

13. The composite of claim 10, wherein the second active substance comprises a biomolecule.

14. The composite of claim 13, wherein the biomolecule comprises a peptide, protein, enzyme, antibody, nucleic acid, aptamer, or ribozyme.

15. The composite of claim 10, wherein the second active substance comprises a wetting agent.

16. The composite of claim 15, wherein the wetting agent comprises oleyl alcohol or cetyl alcohol.

* * * * *